United States Patent
Wyman et al.

(10) Patent No.: US 11,663,773 B2
(45) Date of Patent: May 30, 2023

(54) USING IMPORTANCE RESAMPLING TO REDUCE THE MEMORY INCOHERENCE OF LIGHT SAMPLING

(71) Applicant: NVIDIA Corporation, Santa Clara, CA (US)

(72) Inventors: Christopher Ryan Wyman, Redmond, WA (US); Robert Anthony Alfieri, Chapel Hill, NC (US); William Parsons Newhall, Jr., Woodside, CA (US); Peter Schuyler Shirley, Salt Lake City, UT (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/184,401

(22) Filed: Feb. 24, 2021

(65) Prior Publication Data
US 2022/0058861 A1    Feb. 24, 2022

Related U.S. Application Data

(60) Provisional application No. 63/068,906, filed on Aug. 21, 2020.

(51) Int. Cl.
*G06T 15/50* (2011.01)
*G06T 1/60* (2006.01)

(52) U.S. Cl.
CPC ............. *G06T 15/50* (2013.01); *G06T 1/60* (2013.01)

(58) Field of Classification Search
CPC ....... G06T 15/506; G06T 15/50; G06T 15/55; G06T 15/60; G06T 15/80; G06T 2215/12; G06T 7/143; G06T 2207/20076; H04N 5/2351
See application file for complete search history.

(56) References Cited

U.S. PATENT DOCUMENTS

| | | | |
|---|---|---|---|
| 7,696,995 B2 | 4/2010 | McTaggart |
| 10,902,670 B1 | 1/2021 | Schied et al. |
| 2006/0251325 A1 | 11/2006 | Florin et al. |
| 2013/0120384 A1 | 5/2013 | Jarosz et al. |
| 2014/0342823 A1 | 11/2014 | Kapulkin et al. |
| 2015/0022524 A1 | 1/2015 | Ahn et al. |
| 2016/0125643 A1 | 5/2016 | Tokuyoshi |

(Continued)

FOREIGN PATENT DOCUMENTS

CN    111260766 A    6/2020

OTHER PUBLICATIONS

Boksansky et al., "Rendering Many Lights with Grid-Based Reservoirs: Next Generation Real-Time Rendering with DXR, Vulkan, and OptiX," NVIDIA, Aug. 23, 2021, 15 pages.

(Continued)

*Primary Examiner* — Hau H Nguyen
(74) *Attorney, Agent, or Firm* — Davis Wright Tremaine LLP

(57) ABSTRACT

Devices, systems, and techniques to incorporate lighting effects into computer-generated graphics. In at least one embodiment, a virtual scene comprising a plurality of lights is rendered by randomly sampling a set of lights from among the plurality of lights prior to rendering a frame of graphics. A subset of the set of lights is selected and used to render pixels within one or more portions of the frame.

23 Claims, 49 Drawing Sheets

(56) References Cited

U.S. PATENT DOCUMENTS

| | | | |
|---|---|---|---|
| 2016/0171754 A1 | 6/2016 | Ahn et al. | |
| 2016/0343161 A1* | 11/2016 | Paladini | G06T 15/506 |
| 2018/0130252 A1* | 5/2018 | Seibert | G06T 15/506 |
| 2018/0374260 A1 | 12/2018 | Koylazov et al. | |
| 2019/0325640 A1 | 10/2019 | Jiddi et al. | |

OTHER PUBLICATIONS

Boksansky et al., "Rendering of Many Lights with Grid-Based Reservoirs," ACM Siggraph Symposium on Interactive 3D Graphics and Games Online, Apr. 20-22, 2021, 1 page.

Fernandez et al., "Local Illumination Environments for Direct Lighting Acceleration," Thirteenth Eurographics Workshop on Rendering, Jan. 1, 2002, 8 pages.

International Search Report and Written Opinion for Application No. PCT/US2021/046785, dated Nov. 24, 2021, filed Aug. 19, 2021, 18 pages.

Lin et al., "Real-Time Stochastic Lightcuts," Proceedings of the ACM on Computer Graphics and Interactive Techniques, 3(1): Apr. 18, 2020, 18 pages.

Moreau et al., "Importance Sampling of Many Lights on the GPU," NVIDIA, Jan. 1, 2019, 29 pages.

Vogels et al., "Denoising with Kernel Prediction and Asymmetric Loss Functions," ACM Transactions on Graph, 37(4): Article 124, 2018, 15 pages.

Vorba et al., "On-Line Learning of Parametric Mixture Models for Light Transport Simulation," ACM Transactions on Graphics, 33(4): Aug. 2014, 11 pages.

Vévoda et al., "Bayesian Online Regression for Adaptive Direct Illumination Sampling," ACM Transactions on Graphics, 37(4): Jul. 2018, 12 pages.

Walker, "New Fast Method for Generating Discrete Random Numbers with Arbitrary Frequency Distributions," Electronics Letters, 10(8): Feb. 26, 1974, 2 pages.

Walter et al., "Lightcuts: A Scalable Approach to Illumination," ACM SIGGRAPH, 24(3): Aug. 2005, 10 pages.

Walter et al., "Multidimensional Lightcuts," ACM Transactions on Graphics, 25(3): Jul. 2006, 8 pages.

Ward et al., "A Ray Tracing Solution for Diffuse Interreflection," Proc. SIGGRAPH 22(4): Aug. 1988, 8 pages.

Ward et al., "Irradiance Gradients," CE_EGWR93, 1992, 17 pages.

Ward, "Adaptive Shadow Testing for Ray Tracing," Eurographics Workshop on Rendering (Focus on Computer Graphics), 1994, 16 pages.

Winkelmann, "Short Films by Beeple," retrieved from https://www.beeple-crap.com/films, 2015, 6 pages.

Worthley, "Unbiased Ratio-Type Estimators," Masters Thesis, 1967, 53 pages.

Wyman et al., "Introduction to DirectX Raytracing," ACM SIGGRAPH Courses, 2018, 4 pages.

Wyman, "Exploring and Expanding the Continuum of OIT Algorithms," High Performance Graphics, 2016, 11 pages.

Xu et al., "A New Way to Re-Using Paths," ICCSA, 2007, vol. 4706, 10 pages.

Yuksel, "Stochastic Lightcuts," High Performance Graphics, 2019, 6 pages.

Zwicker et al., "Recent Advances in Adaptive Sampling and Reconstruction for Monte Carlo Rendering," Computer Graphics Forum, Proceedings of Eurographics State of the Art Reports, 34(2): May 2015, 15 pages.

Koskela et al., "Blockwise Multi-Order Feature Regression for Real-Time Path-Tracing Reconstruction," ACM Transactions on Graphics, 38(5): Jun. 2019, 14 pages.

Krivánek et al., "Making Radiance and Irradiance Caching Practical: Adaptive Caching and Neighbor Clamping," Eurographics Symposium on Rendering, 2006, 12 pages.

Krivánek et al., "Radiance Caching for Efficient Global Illumination Computation," IEEE Transactions on Visiualization and Computer Graphics, 11(5): 2005, 12 pages.

Lafortune et al., "Bi-Directional Path Tracing," International Conference on Computational Graphics and Visualization Techniques Compugraphics, vol. 93, 1993, 8 pages.

Lai et al., "Photorealistic Image Rendering with Population Monte Carlo Energy Redistribution," Eurographics Symposium on Rendering Techniques, 1981, 9 pages.

Lehtinen et al., "Gradient-Domain Metropolis Light Transport," ACM Transactions on Graphics, 32(4): Jul. 2013, 11 pages.

Lehtinen et al., "Reconstructing the Indirect Light Field for Global Illumination," ACM Transactions on Graphics, 31(4): Jul. 2012, 10 pages.

Lehtinen et al., "Temporal Light Field Reconstruction for Rendering Distribution Effects," SIGGRAPH, 30(4): Jul. 2011, 12 pages.

Li et al., "Anisotropic Gaussian Mutations for Metropolis Light Transport through Hessian-Hamiltonian Dynamics," SIGGRAPH Asia, 34(6): Oct. 2015, 13 pages.

Lin et al., "Real-Time Rendering with Lighting Grid Hierarchy," Proceedings of I3D, 2(1): Jun. 2019, 10 pages.

Mara et al., "An Efficient Denoising Algorithm for Global Illumination," Proceedingd of HPG, Jul. 28-30, 2017, 7 pages.

Mickey, "Some Finite Population Unbiased Ratio and Regression Estimators," Journal of the American Statistical Association, 54, 287 Sep. 1959, 19 pages.

Moon et al., "Adaptive Polynomial Rendering," ACM SIGGRAPH, 35(4): Jul. 2016, 10 pages.

Moon et al., "Adaptive Rendering Based on Weighted Local Regression," ACM Transactions on Graphics, 33(5): Sep. 2014, 13 pages.

Moon et al., "Adaptive Rendering with Linear Predictions," SIGGRAPH 34(4): Jul. 2015, 11 pages.

Moreau et al., "Dynamic Many-Light Sampling for Real-Time Ray Tracing," Proceedings of High-Performance Graphics, 2019, 6 pages.

Müller et al., "Practical Path Guiding for Efficient Light-Transport Simulation," Eurographics Symposium on Rendering, 36(4): Jun. 2017, 10 pages.

NVIDIA Research, "NVIDIA OptiX AI-Accelerated Denoiser," 2017, 11 pages.

Olsson et al., "Tiled Shading," Journal of Graphics, GPU, Tools, 15(4): 2011, 16 pages.

Otsu et al., "Geometry-Aware Metropolis Light Transport," Proceedings of SIGGRAPH Asia, 37(6): 2018, 11 pages.

Otto et al., "Unbiased Ratio Estimators," Nature, vol. 174, Issue 4423, Aug. 1954, pp. 270-271.

Ou et al., "LightSlice: Matrix Slice Sampling for the Many-Lights Problem," SIGGRAPH Asia, 30(6): Dec. 2011, 8 pages.

Pajot et al., "Combinatorial Bidirectional Path-Tracing for Efficient Hybrid CPU/GPU Rendering," Eurographics, 30(2): 2011, 10 pages.

Parker et al., "OptiX: A General Purpose Ray Tracing Engine," ACM Transactions on Graphics, 29(4): Jul. 2010, 13 pages.

Pegoraro et al., "Sequential Monte Carlo Adaptation in Low-Anisotropy Participating Media," Eurographics Symposium on Rendering, 27(4): 2008, 8 pages.

Popov et al., "Probabilistic Connections for Bidirectional Path Tracing," Eurographics Symposium on Rendering, 34(4): 2015, 12 pages.

Powell et al., "Weighted Uniform Sampling—a Monte Carlo Technique for Reducing Variance," IMA Journal of Applied Mathematics, 2(3): Sep. 1966, 9 pages.

Rao et al., A Monte Carlo Study of Some Ratio Estimators, Sankhya: The Indian Journal of Statistics, 1967, 11 pages.

Rousselle et al., "Adaptive Rendering with Non-Local Means Filtering," ACM Transactions on Graphics, 31(6) Nov. 2012, 12 pages.

Rousselle et al., "Adaptive Sampling and Reconstruction Using Greedy Error Minimization," ACM Transactions on Graphics, 30(6): Dec. 2011, 11 pages.

Rousselle et al., "Image-Space Control Variates for Rendering," ACM Transactions on Graphics, 35(6): Nov. 2016, 12 pages.

(56) References Cited

OTHER PUBLICATIONS

Rousselle et al., "Robust Denoising Using Feature and Color Information," Proceedings of Pacific Graphics, 32(7): Oct. 2013, 10 pages.
Rubin, "Comment," Journal of the American Statistical Association 82, 398 Jun. 1987, pp. 543-546.
Sbert et al., "Real-Time Light Animation," Eurographics, 23(3): 2004, 9 pages.
Schied et al., "Gradient Estimation for Real-Time Adaptive Temporal Filtering," Proceedings of the ACM on Computer Graphics and Interactive Techniques, 1(2): Aug. 2018, 16 pages.
Schied et al., "Spatiotemporal Variance-Guided Filtering: Real-Time Reconstruction for Path-Traced Global Illumination," In Proceedings of HPG, 2017, 12 pages.
Schied, "Video Series: Path Tracing for Quake II in Two Months," retrieved from https://devblogs.nvidia.com/path-tracing-quake-ii/, 2019, 15 pages.
Schwarzhaupt et al., "Practical Hessian-Based Error Control for Irradiance Caching," ACM Transactions on Graphics, 31(6): Nov. 2012, 10 pages.
Spanier et al., "Quasi-Random Methods for Estimating Integrals Using Relatively Small Samples," SIAM Review, 36(1): 1994, 27 pages.
Spanier, "A New Family of Estimators for Random Walk Problems," Journal of Applied Mathematics 23(1): Jan. 1979, 31 pages.
Stachowiak, "Stochastic Screen-Space Reflections," Advances in Real-Time Rendering in Games, Part I, ACM SIGGRAPH Courses, Aug. 2015, 47 pages.
Talbot et al., "Importance Resampling for Global Illumination," Eurographics Symposium on Rendering, 2005, 8 pages.
Talbot, "Importance Resampling for Global Illumination," Masters Thesis, Brigham Young University, Sep. 16, 2005, 88 pages.
Tokuyoshi et al., "Hierarchical Russian Roulette for Vertex Connections," ACM Transactions on Graphics, 38(4): Jul. 2019, 12 pages.
Tokuyoshi et al., "Stochastic Light Culling," Journal of Computer Graphics Techniques, 5(1): 2016, 26 pages.
Tomasi et al., "Bilateral Filtering for Gray and Color Images," International Conference on Computer Vision, 1998, 8 pages.
Veach et al., "Bidirectional Estimators for Light Transport," Eurographics Workshop on Rendering, 1995, 20 pages.
Veach et al., "Metropolis Light Transport," SIGGRAPH, vol. 31, 1997, 12 pages.
Veach et al., "Optimally Combining Sampling Techniques for Monte Carlo Rendering," ACM Transactions on Graphics, vol. 29, 1995, 10 pages.
Vitter, "Random Sampling with a Reservoir," ACM Transanctions om Mathematical Software, 11(1): 1985, 21 pages.
Bauszat et al., "Gradient-Domain Path Reusing," Process SIGGRAPH Asia, 36(6): Nov. 2017, 9 pages.
Bauszat et al., "Guided Image Filtering for Interactive High-Quality Global Illumination," Eurographics Symposium on Rendering 30(4): Jun. 2011, 8 pages.
Bekaert et al., "Accelerating Path Tracing by Re-Using Paths," Eurographics Workshop on Rendering, 2002, 10 pages.
Bekaert et al., "Weighted Importance Sampling Techniques for Monte Carlo Radiosity," Eurographics Workshop on Rendering, Jun. 2000, 13 pages.
Benty et al., "The Falcor Rendering Framework," retrieved from https://github.com/NVIDIAGameWorks/Falcor, 2019, 4 pages.
Binder et al., "Massively Parallel Path Space Filtering," Feb. 15, 2019, 6 pages.
Bitterli et al., "Nonlinearly Weighted First-Order Regression for Denoising Monte Carlo Renderings," 35(4): Jun. 2016, 11 pages.
Bitterli et al., "Selectively Metropolised Monte Carlo Light Transport Simulation," ACM Transactions on Graphics, 38(6): Nov. 2019, 10 pages.
Bitterli et al., "Spatiotemporal Reservoir Resampling for Real-Time Ray Tracing with Dynamic Direct Lighting," ACM Transactions on Graphics, Jul. 2020, 17 pages.
Buades et al., "A Review of Image Denoising Algorithms, with a New One," Multiscale Modeling & Simulation, 4(2): Jan. 2005, pp. 490-530.
Burke et al., "Bidirectional Importance Sampling for Direct Illumination," Eurographics Symposium on Rendering, 2005, 11 pages.
Burke et al., "Bidirectional Importance Sampling for Illumination from Environment Maps," In ACM SIGGRAPH Sketches, Oct. 22, 2004, 79 pages.
Castro et al., "Efficient Reuse of Paths for Random Walk Radiosity," Computers & Graphics, 32(1): Feb. 2008, 8 pages.
Chaitanya et al., "Interactive Reconstruction of Monte Carlo Image Sequences Using a Recurrent Denoising Autoencoder," ACM Trans. Graph. 36, 4, Article 98, 2017, 12 pages.
Chakravarty et al., "Matrix Bidirectional Path Tracing," Eurographics Symposium on Rendering—Experimental Ideas & Implementations, 2018, 10 pages.
Chao, "A General Purpose Unequal Probability Sampling Plan," Biometrika 69(3): Dec. 1982, pp. 653-656.
Christensen et al., "The Path to Path-Traced Movies," Foundations and TrendsR in Computer Graphics and Vision 10(2): Oct. 2016, 76 pages.
Cline et al., "Energy Redistribution Path Tracing," SIGGRAPH 24(3): Jul. 2005, 10 pages.
Cook, Stochastic Sampling in Computer Graphics, ACM Transactions on Graphics, 5(1): Jan. 1986, 22 pages.
Dachsbacher et al., "Scalable Realistic Rendering with Many-Light Methods," Eurographics 33(1): Feb. 2014, 16 pages.
Dammertz et al., Edge-Avoiding Å-Trous Wavelet Transform for Fast Global Illumination Filtering, HPG, Eurographics Association, Saarbrucken, Germany, 2010, 9 pages.
Davidovic et al., "Combining Global and Local Virtual Lights for Detailed Glossy Illumination," SIGGRAPH Asia, 29(6): Dec. 2010, 8 pages.
Deng et al., "Photon Surfaces for Robust, Unbiased Volumetric Density Estimation," SIGGRAPH, 38(4): Jul. 2019, 12 pages.
Donikian et al., "Accurate Direct Illumination Using Iterative Adaptive Sampling," IEEE Transactions on Visiualization Graphics, 12(3): May 2006, pp. 353-364.
Efraimidis et al., "Weighted Random Sampling with a Reservoir," Information Processing Letters, 97(5): Mar. 2006, pp. 181-185.
Efraimidis, "Weighted Random Sampling over Data Streams," Jul. 28, 2015, 14 pages.
Estevez et al., "Importance Sampling of Many Lights with Adaptive Tree Splitting," ACM on Computer Graphics and Interactive Techniques, 1(2): Aug. 2018, 17 pages.
Georgiev et al., "Blue-Noise Dithered Sampling," ACM SIGGRAPH Talks, ACM Press, Jul. 24-28, 2016, 1 page.
Ghosh et al., "Sequential Sampling for Dynamic Environment Map Illumination," Eurographics Symposium on Rendering, 2006, 12 pages.
Hachisuka et al., "Multidimensional Adaptive Sampling and Reconstruction for Ray Tracing," SIGGRAPH, 27(3): Aug. 2008, 10 pages.
Hachisuka et al., "Multiplexed Metropolis Light Transport," SIGGRAPH, 33(4): Jul. 2014, 10 pages.
Handscomb, "Remarks on a Monte Carlo Integration Method," Numer. Math, 6(1): Dec. 1964, pp. 261-268.
He et al., "Guided Image Filtering," European Conference on Computer Vision, 2010, 14 pages.
Heitz et al., "A Low-Discrepancy Sampler That Distributes Monte Carlo Errors as a Blue Noise in Screen Space," ACM SIGGRAPH, 2019, 2 pages.
Heitz et al., "Combining Analytic Direct Illumination and Stochastic Shadows," ACM Press, 2018, 10 pages.
Heitz et al., "Distributing Monte Carlo Errors as a Blue Noise in Screen Space by Permuting Pixel Seeds between Frames," Eurographics Symposium on Rendering, 38(4): 2019, 10 pages.
Hey et al., "Importance Sampling with Hemispherical Particle Footprints," Spring Conference on Computer Graphics, 2002, 11 pages.
IEEE, "IEEE Standard 754-2008 (Revision of IEEE Standard 754-1985): IEEE Standard for Floating-Point Arithmetic," Aug. 29, 2008, 70 pages.

(56) References Cited

OTHER PUBLICATIONS

Jarosz et al., "A Comprehensive Theory of Volumetric Radiance Estimation Using Photon Points and Beams," ACM Transactions on Graphics 30(1): Jan. 2011, 19 pages.
Jarosz et al., "Irradiance Gradients in the Presence of Participating Media and Occlusions," Eurographics Symposium on Rendering, 27(4): Jun. 2008, 10 pages.
Jarosz et al., "Radiance Caching for Participating Media," ACM Transactions on Graphics 27(1): Mar. 2008, 29 pages.
Jarosz et al., "The Beam Radiance Estimate for Volumetric Photon Mapping," Eurographics, 27(2): Apr. 2008, 10 pages.
Jarosz et al., Theory, Analysis and Applications of 2D Global Illumination. ACM Transactions on Graphics 31(5): Aug. 2012, 21 pages.
Jensen, "Global Illumination Using Photon Maps," Eurographics Workshop on Rendering, 1996, 17 pages.
Jensen, "Importance Driven Path Tracing Using the Photon Map," Eurographics Workshop on Rendering, 1995, 11 pages.
Jensen, "Realistic Image Synthesis Using Photon Mapping," A K Peters Ltd, 2001, 183 pages.
Kalantari et al., "A Machine Learning Approach for Filtering Monte Carlo Noise," SIGGRAPH, 34(4): Jul. 2015, 12 pages.
Kelemen et al., "A Simple and Robust Mutation Strategy for the Metropolis Light Transport Algorithm," Eurographics, 21(3): Sep. 2002, 11 pages.
Keller, "Instant Radiosity," SIGGRAPH, ACM Press, 1997, 8 pages.
Kondapaneni et al., "Optimal Multiple Importance Sampling," ACM Transactions on Graphics, 38(4): Jul. 2019, 14 pages.

\* cited by examiner

USING IMPORTANCE RESAMPLING TO REDUCE THE MEMORY INCOHERENCE OF LIGHT SAMPLING

CLAIM OF PRIORITY

This application claims the benefit of U.S. Provisional Application No. 63/068,906 titled "RESAMPLING TECHNIQUE FOR RESERVOIR-BASED LIGHTING," filed Aug. 21, 2020, the entire contents of which is incorporated herein by reference.

FIELD

At least one embodiment pertains to computer graphics. For example, at least one embodiment pertains to processors or computing systems used to render graphical images using various novel techniques described herein.

BACKGROUND

The handling of lights in computer graphics can consume significant amounts of time, memory, processing power, and other computing resources. This is particularly true for techniques, which may include but are not limited ray tracing, that are intended to produce good visual quality, and for cases where many lights are included in a scene that is to be rendered. Techniques for handling lights in computer graphics may therefore be improved.

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

In at least one embodiment, an embodiment of a method for rendering computing graphics, incorporating reservoir-based lighting techniques such as reservoir-based spatiotemporal importance resampling (ReSTIR), comprises adaptations which optimize usage of computer hardware and memory, including issues such as memory access latency, cache coherence, cache utilization, thrashing, and so forth.

Embodiments disclosed herein may be used in a variety of applications, devices, and circumstances, including those described herein. Techniques described herein may be utilized to render complex graphical scenes, such as those that may be generated in videogames, special effects, computer animation, computer-aided design, and so forth.

In various embodiments, techniques described herein are used to render graphical scenes in cases where high rendering speed is desired. For example, some of the operations and techniques described herein are capable of being performed prior to rendering a frame of computer graphics, or with periodicity that is less than per-frame, to improve the per-frame efficiency of rendering.

In various embodiments, techniques described herein are useful to non-graphical applications and problem spaces that share characteristics similar to rendering or ray-tracing. For example, embodiments described herein may be adapted for use in simulating effects of acoustic or electromagnetic transmissions involving many emitters.

Figure 1:
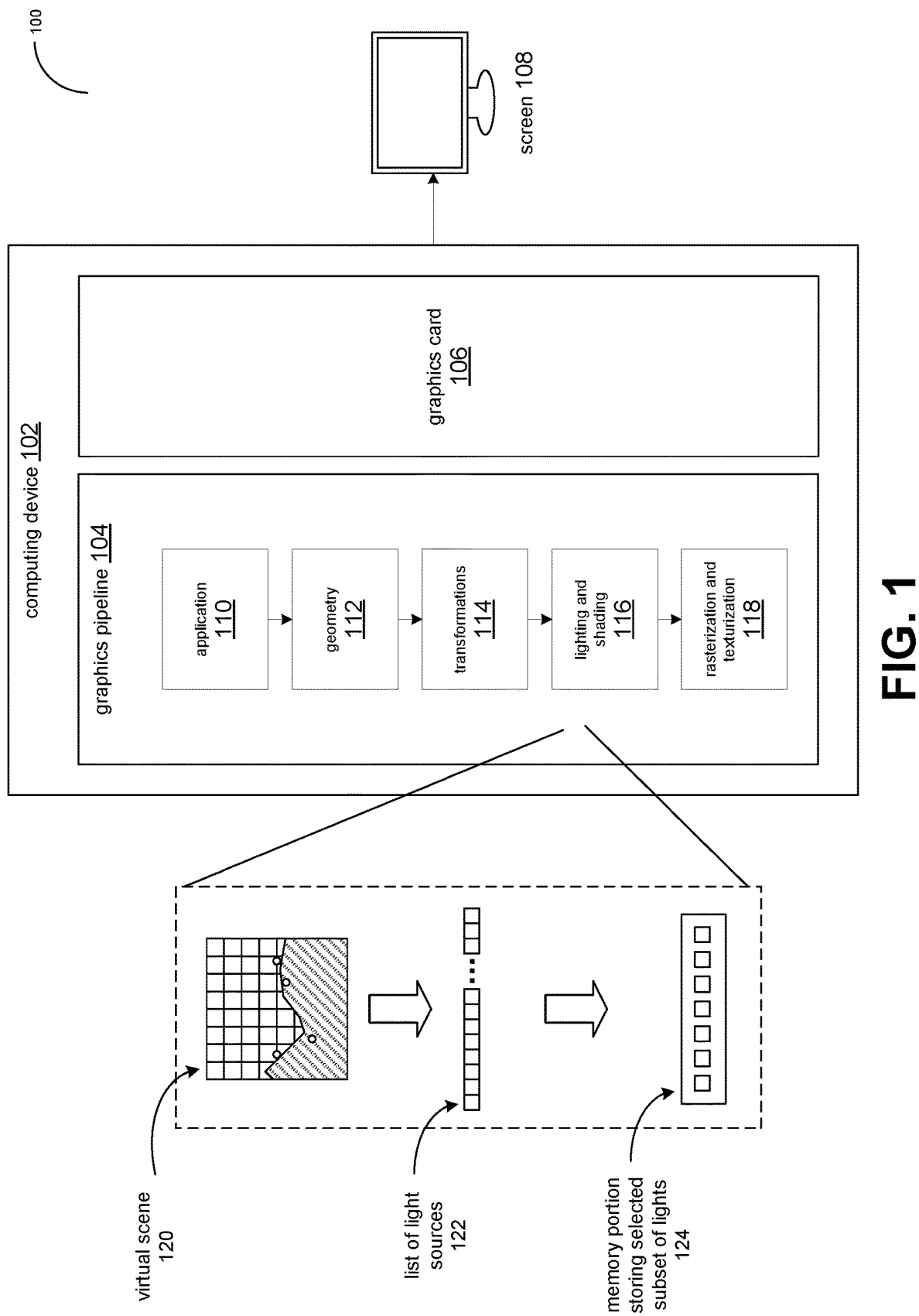
FIG. 1 illustrates an example of a system employing light resampling to render a virtual scene, in accordance with at least one embodiment.

FIG. 1 illustrates an example of a system employing light resampling to render a virtual scene, in accordance with at least one embodiment. In the example 100 of FIG. 1, a computing device 102 generates graphical output to drive a display on screen 108.

In at least one embodiment, computing device 102 generates graphical output using a graphics pipeline 104 and a graphics card 106. In at least one embodiment, a graphics card 106 comprises one or more processors, such as graphics processing units. In at least one embodiment, graphics pipeline 104 comprises software, hardware, or combinations of software and hardware to generate graphical output. A graphics pipeline 104 may generate graphical output according to a multi-process process, such as a process comprising the stages 110-118 depicted within graphics pipeline 104 in FIG. 1. Although the stages 110-118 are depicted in FIG. 1 as a sequence, embodiments may omit some of the depicted stages 110-118, perform some of the operations 110-118 in an order other than what is depicted, such as in parallel, or include stages in addition to those depicted in FIG. 1. Accordingly, the order depicted in FIG. 1 should not be construed in a manner which would limit potential embodiments to only those that conform to the depicted order.

In at least one embodiment, a graphics pipeline 104 comprises software, hardware, or a combination of hardware and software to implement a multiple-stage process for converting application data to graphical data suitable (with or without certain post-pipeline steps) for display by screen 108. For example, graphics pipeline 104 may generate a frame of video data that can then be converted to a signal to drive the display of the frame on screen 108. In at least one embodiment, these stages may include an application stage 110, geometry stage 112, transformation stage 114, lighting and shading stage 116, and rasterization and texturization stage 118.

In at least one embodiment, one or more of the stages 110-118 utilize a light sampling algorithm, including but not necessarily limited to ReSTIR, to incorporate lighting effects into the rendering of a virtual scene.

In at least one embodiment, a virtual scene 120 comprises a simulated or computer-generated environment, such as a landscape, building, playing field, or other area. A virtual scene 120 may sometimes be referred to, or comprise, a virtual environment. A virtual environment may be associated with data structures, graphical assets, and other data that define the contents and structure of the virtual environment. For example, in at least one embodiment, a virtual scene is based on a virtual environment which comprises a wireframe model of a landscape, various textures and objects residing within the scene, and so forth. The virtual environment may further comprise lights placed at various positions within the scene.

In some cases, a large number of such lights may be present, which can present a number of challenges when rendering depictions of the virtual scene 120. Handling many lights is a difficult problem in computer graphics, particularly for algorithms that are based on ray tracing. For example, one approach to rendering a virtual scene would be to evaluate all light sources in the scene for each shaded point. However, increasing the light count may also increases the number and complexity of rays that are to be traced, and thereby may also increase the time, computing resources, and complexity of the rendering process.

In at least one embodiment, a subset of lights is selected from a list 122 of all of the lights in the virtual scene 120. The subset is selected based on an at least partially random process, and the selected subset is stored in a portion of memory 124. In at least one embodiment, the selected subset is stored in a record of a data structure that corresponds to a subdivision, or cell, of a virtual scene. In other embodiments, the selected subset is not tied to or associated with any particular region of the virtual scene. In other embodiments, lights are stochastically selected according to a probability that is proportional to the lights intensity or overall importance to the scene. In other embodiments, lights are stochastically selected according to a probability that is proportional to the importance of a given light's contribution to a subdivision of the virtual scene. Stochastic techniques or processes, which may sometimes be referred to as random techniques or processes, generally refer to techniques which include factors that are random, pseudo-random, or quasi-random. Examples of stochastic factors, or random, factors, may include, but are not necessarily limited to, pseudo-random number generators, Monte Carlo sequences, and deterministic hashing.

Once stored in the portion of memory 124, the selected subset of lights may be used to render pixels in a depiction of the virtual scene. However, the process of selecting lights from the list of lights 122 may cause various impediments to efficient rendering. As noted, the light selection process is at least partially random, and as such access to the list of lights 122 may also be at least partially random, and involve access to widely separated regions of memory. The list 122 may also be very large, potentially include thousands, tens of thousands, or even millions of lights. Accordingly, accessing the selected lights within the list can cause various inefficiencies, such as those that involve memory access latency, cache coherence, cache utilization, thrashing, and so forth.

In at least one embodiment, a light refers to a virtual source of illumination. In at least one embodiment, this may include sources which emit or reflect light. A light may be associated with properties including a position of the light within a virtual scene and an intensity value. For example, a light may be associated with an x, y, z value indicating the light's position within the virtual scene, and a value indicating how bright the light is. A light may also be associated with additional properties, such as parameters that describe intensity, color, diffusion pattern, and so forth. As used herein, the term light generally refers to data which describes the light, such as those representing properties and parameters such as these.

In at least one embodiment, stages 110-118 of graphics pipeline 104 utilize lights stored in the memory portion 124 to render portions of the virtual scene. In at least one embodiment, the computing device 102 renders a frame of graphics by first randomly selecting a subset of lights from the list of lights 122 and storing the subset in the memory portion 124. This is done, in at least one embodiment, prior to rendering a frame. During rendering of the frame, the computing device 102 renders a pixel by randomly selecting one or more lights from the memory portion 124. Note that the randomly sampling of lights refers to using one or more stochastic processes to select lights from a pool of lights. A stochastic process includes, in at least one embodiment, any technique for selecting a light from a pool that incorporates at least some element of randomness, pseudo-randomness, or quasi-randomness. In at least one embodiment, a stochastic process selects a light based on probabilities that are proportional to the intensity of the light, such that brighter lights are more likely to be selected than dimmer lights. A pool of lights refers to lights that are candidates for selection.

Figure 2:
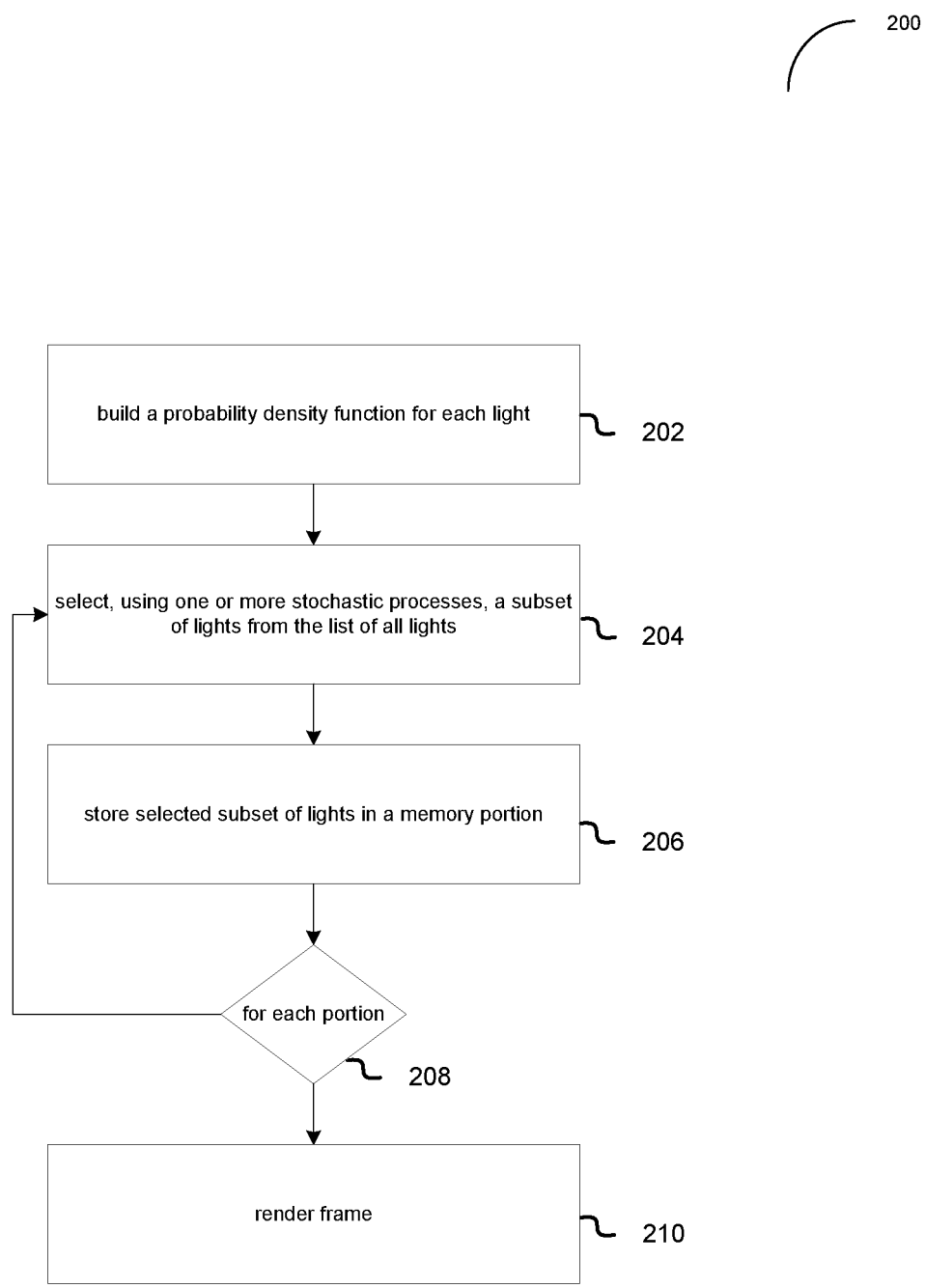
FIG. 2 illustrates an example of a process of rendering a frame of a virtual scene by at least sampling from a list of scene lights and resampling from memory portions, in accordance with at least one embodiment.

FIG. 2 illustrates an example of a process of rendering a frame of a virtual scene by sampling from a list of scene lights and resampling from memory portions, in accordance with at least one embodiment.

Although the example process 200 is depicted as a sequence of operations, it will be appreciated that, in embodiments, the depicted operations may be altered in various ways, and that some operations may be omitted, reordered, or performed in parallel with other operations, except where an order is explicitly stated or logically implied, such as when the input from one operation depends upon the output of another operation.

The operations depicted by FIG. 2 may be performed by a system, such as the system 100 depicted in FIG. 1, comprising at least one processor and a memory with stored instructions that, in response to being executed by the at least one processor, cause the system to perform the depicted operations. In at least one embodiment, the operations are performed by a combination of hardware and software, where said hardware includes one or more APUs, CPUs, GPUs, PPUs, GPGPUs, parallel processors, processing clusters, graphics processors, multiprocessors, and so forth as depicted by the various FIGS. herein. In at least one embodiment, said software comprises libraries such as any of CUDA, OpenGL, OpenLC, ROCm, and may also include operating system software.

At 202, in at least one embodiment, the system builds a probability density function for one or more lights in the list of lights 122. In at least one embodiment, the probability density function indicates a likelihood of selecting a given light. In at least one embodiment, the probability density function incorporates the effects of various parameters, such as light intensity, color, distance from a point to be rendered, and so forth, so that some lights (e.g., those most likely to significantly contribute to lighting) are more likely to be selected than others.

In at least one embodiment, an alternative to a probability density function is used. In at least one embodiment, lights are selected randomly, with equal odds of selecting a given light. In at least one embodiment, a random number may, for such cases, be used to generate an index into the list of lights. Various structures, such as trees or arrays, may be used to store the list, and may be used to facilitate selection of a light in conjunction with one or more stochastic processes, which may in some embodiments include the use of a random number generator.

At 204, in at least one embodiment, the system selects a subset of lights from the list of lights. The lights, in at least one embodiment, are selected using one or more stochastic processes, such as those just described in relation to a probability density function. The number of lights selected for the subset may vary, between embodiments, based on factors such as the size of the portions to be rendered, the size of memory structures such as processor cache, and so forth. In at least one embodiment, sets of lights, and subsets of those lights, are chosen so that lighting information may be stored in one or more levels of processor caches.

At 206, in at least one embodiment, the system stores the subset of lights in a memory portion. The memory portion may be a portion of computer memory, such as a region of memory implemented by a random access memory ("RAM") device, or a region of virtual computer memory. In at least one embodiment, the memory portion is a contiguous region of physical or virtual computer memory. In at least one embodiment, the memory portion is memory within a processor cache. In at least one embodiment, reading or writing light information using a high-level data structure, such as an array or linked list defined in a programming language, will cause the subset of lights to be stored in a memory portion. For example, reading light information from a portion of RAM may cause the light information to also be stored in a cache memory portion.

At 208, in at least one embodiment, the system selects and stores additional subsets of lights. The number of subsets selected and loaded may vary between embodiments. In at least one embodiment, subsets are selected and loaded into memory portions such that, during rendering of a given frame, the subset can remain efficiently accessible (e.g., in-cache) for as long as it is needed. A suitable number of subsets may generally be found through experimentation, or by consideration of the memory characteristics of the particular system on which the rendering is performed, and may further depend on variations of the algorithm used to render pixels within the frame. For example, multiprocessor systems with a plurality of caches may load a sufficient number of subsets such that each cache includes a memory portion with a subset of lights.

At 210, in at least one embodiment, a frame of graphics is rendered based on lights resampled from the lights stored in the memory portion. In at least one embodiment, the frame is subdivided into tiles, and each tile is rendered using one or more lights sampled from the memory portion. In at least one embodiment, after these tiles are rendered, a different subset, loaded into a separate memory portion, is used to render other tiles. This process may then repeat until the entire frame is rendered.

Figure 3:
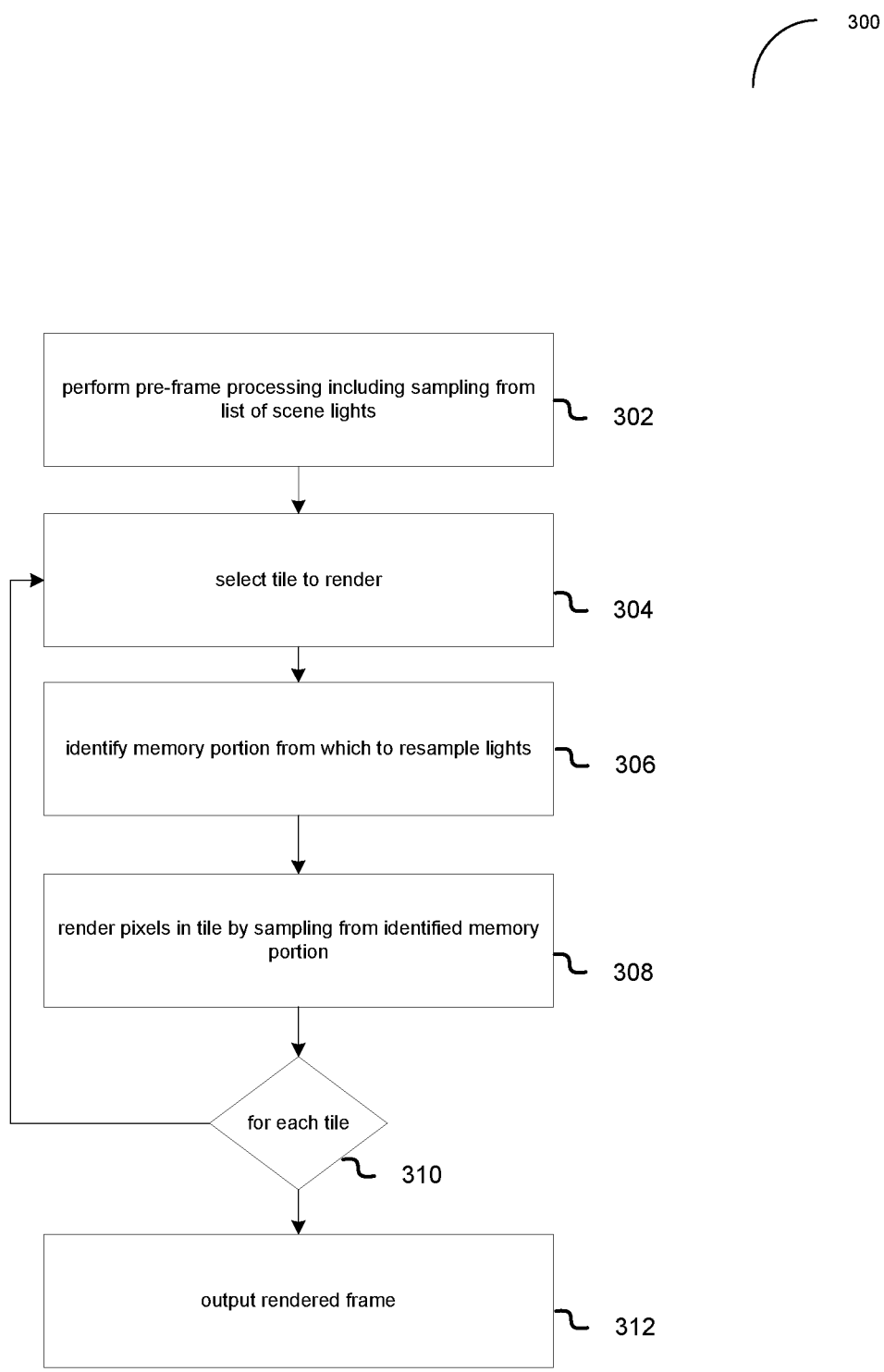
FIG. 3 illustrates an example of a process for rendering a frame of a virtual scene by resampling from a memory portion, in accordance with at least one embodiment.

FIG. 3 illustrates an example of a process for rendering a frame of a virtual scene by resampling from a memory portion, in accordance with at least one embodiment. Although the example process 300 is depicted as a sequence of operations, it will be appreciated that, in embodiments, the depicted operations may be altered in various ways, and that some operations may be omitted, reordered, or performed in parallel with other operations, except where an order is explicitly stated or logically implied, such as when the input from one operation depends upon the output of another operation.

The operations depicted by FIG. 3 may be performed by a system, such as the system 100 depicted in FIG. 1, comprising at least one processor and a memory with stored instructions that, in response to being executed by the at least one processor, cause the system to perform the depicted operations. In at least one embodiment, the operations are performed by a combination of hardware and software, where said hardware includes one or more APUs, CPUs, GPUs, PPUs, GPGPUs, parallel processors, processing clusters, graphics processors, multiprocessors, and so forth as depicted by the various FIGS. herein. In at least one embodiment, said software comprises libraries such as any of CUDA, OpenGL, OpenLC, ROCm, and may also include operating system software.

At 302, in at least one embodiment, the system performs pre-frame processing, including sampling lights from among the list of all scene lights, and storing sampled lights in one or more memory portions. In at least one embodiment, the sampling is done from among less than all scene lights, but from some pool comprising a large number of lights, such that sampling from it results in performance issues due to issues such as inefficient usage of available processor cache memory. For example, in at least one embodiment, the pool might be small enough to fit in L3 cache, but too big to fit in more efficient L2 cache.

Pre-frame processing, in at least one embodiment, refers to processing done prior to rendering an individual frame of a computer generated scene depiction. As used herein, frame generally refers to one of a series of frames generated to produce an animated sequence, but may also be used, in certain embodiments, to refer to single instances of a computer-generated image.

At 304, in at least one embodiment, the system selects a tile to render. In at least one embodiment, a frame is subdivided into tiles, each of which represents a portion of the frame. In at least one embodiment, the size or number of tiles is based, at least in part, on factors which may include the number of samples drawn from the list of lights, the number of memory portions in which those samples are stored, the number of processors, GPUs, and so forth that are available for rendering, the number of threads available, and so on.

At 306, in at least one embodiment, the system selects a memory portion from which it will resample lights. In at least one embodiment, this is done by assigning a processor or thread of execution for rendering a tile, configured such that the processor or thread draws samples from the selected memory portion.

At 308, in at least one embodiment, the system renders pixels that fall within the tile by sampling from the identified memory portion. As described in more detail herein, a pixel within a tile may be rendered, in at least one embodiment, by randomly resampling one or more lights from the samples stored in the memory portion, and using the light information stored in the memory portion to determine how to render the pixel. For example, the resampled lights may be used, in at least one embodiment, to perform ray tracing.

At 310, in at least one embodiment, the system determines whether any additional tiles need to be rendered. If so, the operations described in relation to elements 304 to 308 may be performed again. In at least one embodiment, a new memory portion is used for each tile rendered. In at least one embodiment, a given memory portion is reused among a first set of tiles, a new memory portion is selected for use with a second set, and so on. In at least one embodiment, multiple sets of tiles are rendered in parallel, and each may use, in at least one embodiment, a different memory portion.

At 312, in at least one embodiment, the system outputs the rendered frame. In at least one embodiment, this comprises providing data for the completed frame to another component within the system, such as a component that drives a display.

In at least one embodiment, rendering pixels near edges of a tile is adjusted by using additional stochastic factors, including random, pseudo-random, quasi-random factors, and/or determinative factors, to reduce or prevent artifacts in the rendered image. For example, a dithering process may be used in conjunction with element 308 above, so that for a pixel near a tile border, the set of memory portions from which lights are selected is made to vary based on some randomized element or noise.

Figure 4:
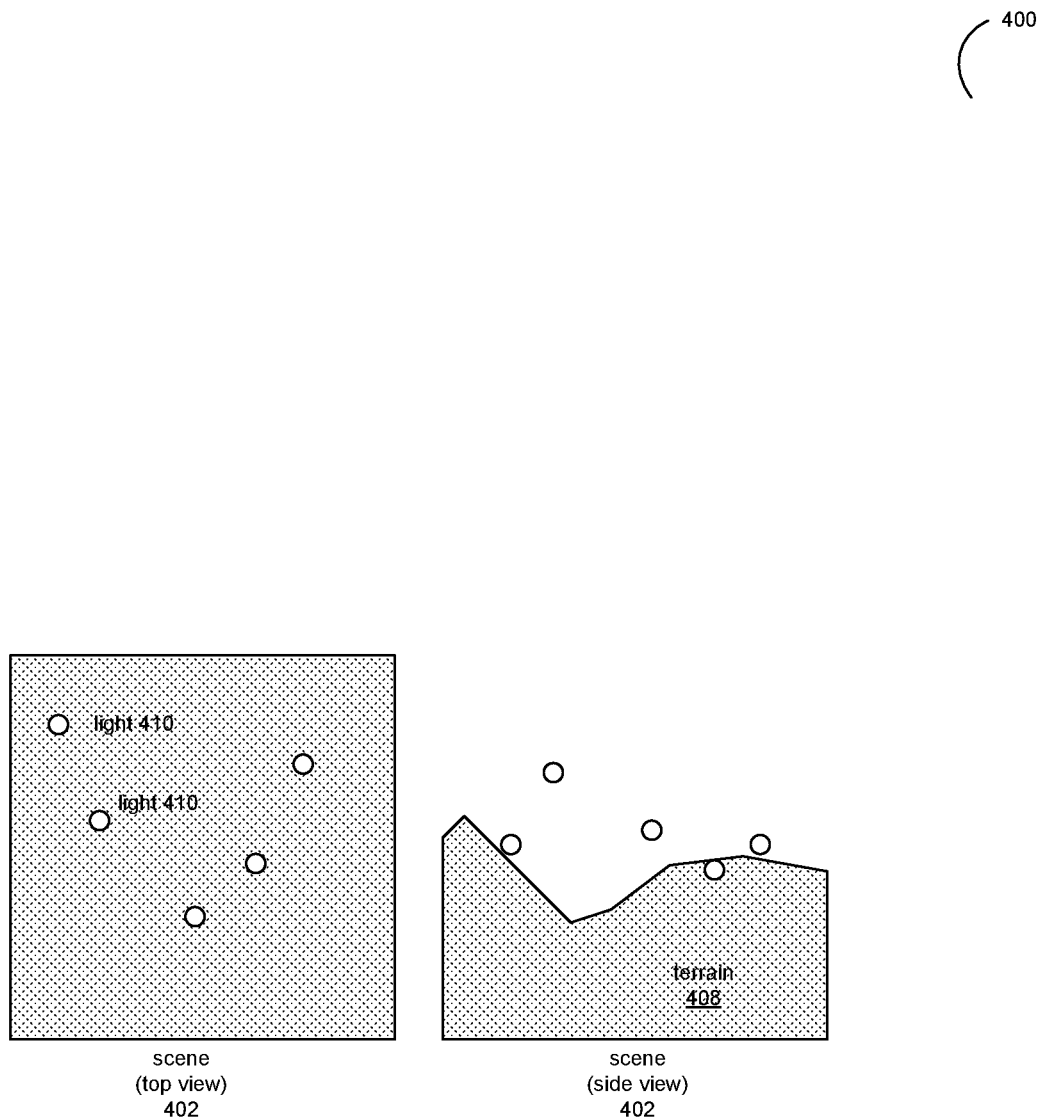
FIG. 4 illustrates an example of lights in a virtual are, in accordance with at least one embodiment.

FIG. 4 illustrates an example of lights in a virtual area, in accordance with at least one embodiment. In the example 400 of FIG. 4, a virtual area 402 is a three-dimensional area depicted from a top view and a side view. A terrain 408 is included in the depicted example of a virtual area 402, but a virtual area 402 can include or omit a variety of features, such as the depicted terrain 408, as well as other features not depicted in the FIG., such as characters, obstacles, walls, and other objects.

In at least one embodiment, lights 410 are also included in the virtual area 402, at various positions within the area 402. These lights 410 emit illumination which may be factored into the rendering of a computer-generated image based on the virtual area 402. There may be many such lights 410, potentially numbering in the hundreds, thousands, or millions. Handling lights in these quantities may be challenging or impractical with some approaches.

Figure 5:
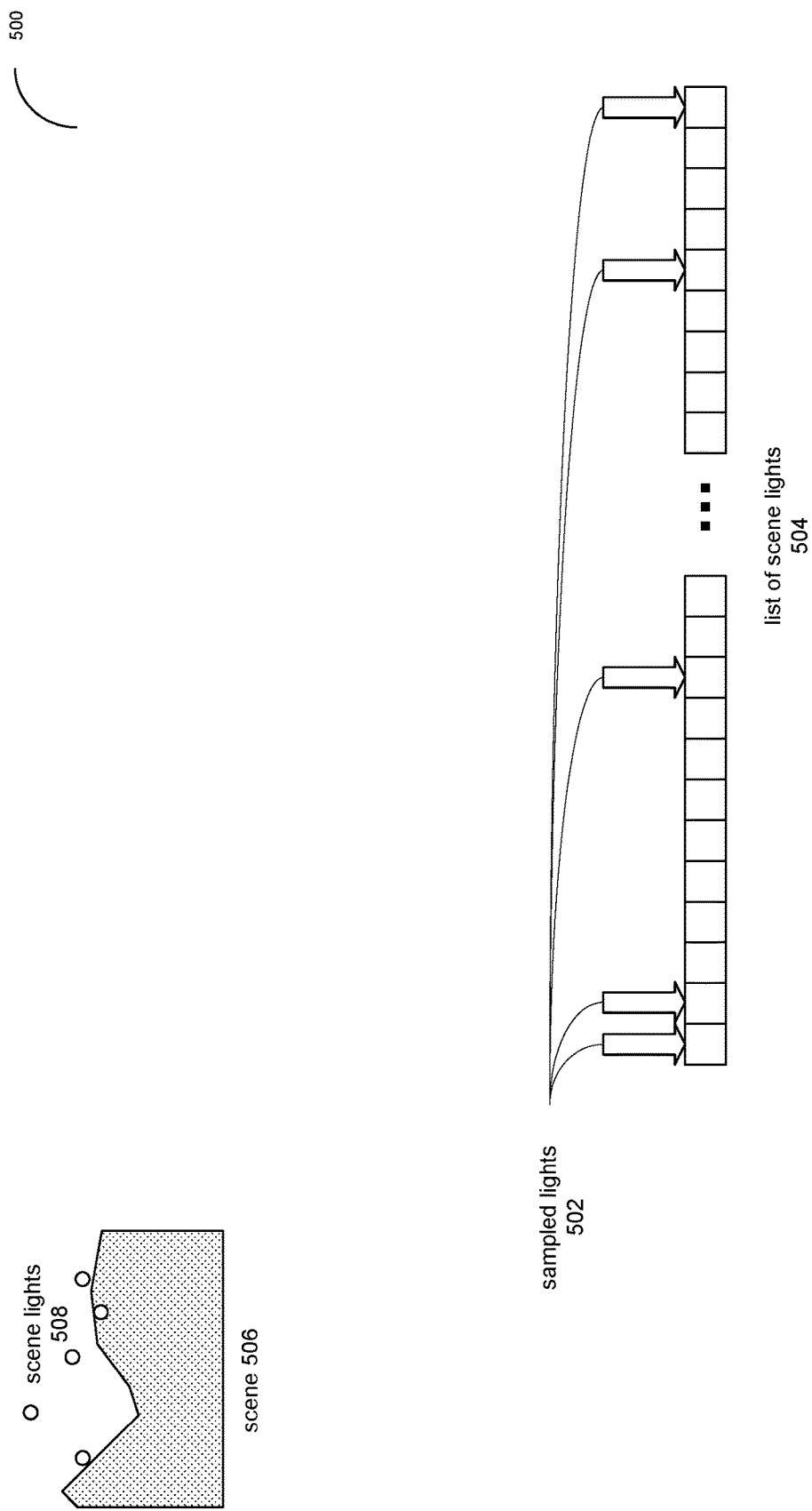
FIG. 5 depicts an example of random selection of lights from a list of scene lights, in accordance with at least one embodiment.

The FIG. 5 depicts an example of random selection of lights from a list of scene lights, in accordance with at least one embodiment. In the example 500, a scene 506 comprises a number of scene lights 508. There may be a very large number of scene lights 508, such as hundreds, thousands, or millions of lights. These lights may be stored in memory or storage as a list of scene lights 504.

In at least one embodiment, a list of scene lights 504 comprises one or more arrays of memory in which information describing the scene lights 508 is stored. For descriptive purposes, information describing a scene light may be referred to herein as light information, light data, or as a light. In at least one embodiment, a list of scene lights comprises a data structure such as array, linked list, tree, B-Tree, and so forth. A list of scene lights 504 may be stored in random access memory ("RAM"), on long-term storage such as a solid-state or mechanical disk drive, or in some other structure. It will be appreciated that these examples are intended to be illustrative, and as such should not be construed in a manner which would limit potential embodiments to only those that incorporate the specific examples provided.

In at least one embodiment, sampled lights 502 are identified from the list of scene lights 504 based on one or more processes that are at least partially stochastic, which may include various random, quasi-random or pseudo-random factors. For example, in at least one embodiment, the list of scene lights 504 has N lights stored in an array A with N storage locations. A stochastic process, in this example embodiment, may generate a random number between 0 and N−1 and obtain access to the light stored at A[N]. As depicted in the example 500, each access may be to a different portion of the list of scene lights 504. As depicted in the example 500, each access to the list of scene lights 504 may be in a different, random location. It will be appreciated that these examples are intended to be illustrative, and as such should not be construed in a manner which would limit potential embodiments to only those that incorporate the specific examples provided.

In at least one embodiment, a ReSTIR algorithm relies on randomization to generate images in which there are many lights, but in some cases this randomization may lead to poor performance. However, as described herein, the use of pre-randomization of samples may address these performance issues. For example, a techniques described herein uses a per-frame preprocessing technique to permute or perturb samples sufficiently to maintain (unbiased) image convergence. These pre-randomized samples, in at least one embodiment, are stored in a data structure that can be accessed in a manner which avoids inefficient usage of cache memory. For example, by appropriate sizing, an array or other structure can be stored within a processor cache. Pre-randomizing samples can provide efficiency gains by moving incoherent memory accesses to a pre-processing stage, rather than causing incoherent memory accesses during per-pixel rendering. Additional performance can be gained if this pre-processing stage is shorter or uses less memory than other per-pixel candidate generation technique.

A rendering technique such as ReSTIR may use iterative applications of resampled importance resampling (RIS) to decouple compute frequencies:

$$\int f_0(x)f_1(x)f_2(x)dx \approx \frac{1}{N_0}\sum\left[f_0(x_i)\frac{1}{N_1}\sum\left[f_1(x_j)\frac{1}{N_2}\sum\frac{f_2(x_k)}{p(x_k)}\right]\right]$$

This pulls apart the integral ∫f₀(x)f₁(x)f₂(x)dx into a sum over terms evaluated at different frequencies. Some implementations of this may cause incoherence issues and poor performance. For example, in embodiments that employ techniques such as ReSTIR, incoherence issues may result from the samples $x_k$ being distributed sparsely over a list that may potentially be very long. However, in at least one embodiment, resampled importance sampling ("RIS") may be applied again, prior to selecting the set of samples $\{x_k\}$, to reduce incoherence.

The techniques described herein may be further understood by examining two degenerate forms of RIS. Assume a standard RIS estimator:

$$\int f(x)dx \approx \frac{1}{N}\sum\left[\frac{f(x_i)}{\hat{p}(x_i)}\frac{1}{M}\sum\frac{\hat{p}(x_j)}{q(x_j)}\right]$$

And then examine the two degenerate cases, (i.e., $\hat{p}(x)=f(x)$, and $p(x)=\hat{p}(x)$):

$$\int f(x)dx \approx \frac{1}{N}\sum\left[\frac{f(x_i)}{f(x_i)}\frac{1}{M}\sum\frac{f(x_j)}{p(x_j)}\right] = \frac{1}{N}\sum\left[\frac{1}{M}\sum\frac{f(x_j)}{p(x_j)}\right]$$

$$\int f(x)dx \approx \frac{1}{N}\sum\left[\frac{f(x_i)}{\hat{p}(x_i)}\frac{1}{M}\sum\frac{\hat{p}(x_j)}{\hat{p}(x_j)}\right] = \frac{1}{N}\sum\left[\frac{f(x_i)}{\hat{p}(x_i)}\frac{1}{M}\sum 1\right]$$

The first appears to be like a stratified sampling, over random strata. In the second, RIS is still being applied, by first choosing M samples, then selecting a subset N of them. However, it gives the same estimator as if sampling the N items directly. Note that the element $$\frac{1}{M}\sum 1$$

could be crossed out.

Again, a technique such as ReSTIR may take something like the following form:

$$\int f_0(x)f_1(x)f_2(x)dx \approx \frac{1}{N_0}\sum\left[f_0(x_i)\frac{1}{N_1}\sum\left[f_1(x_j)\frac{1}{N_2}\sum\frac{f_2(x_k)}{p(x_k)}\right]\right]$$

This uses an incoherent list of lights {L}, and samples it first into a smaller subset $\{x_k\}$ of size $N_2$, then subsamples this set into an (even) smaller subset $\{x_j\}$ of size $N_1$, then subsamples this into a subset $\{x_i\}$ of size $N_0$.

In at least one embodiment, pre-randomization may still use samples distributed according to p(x), but from a smaller and more coherent set in memory:

$$\int f_0(x)f_1(x)f_2(x)dx \approx$$

$$\frac{1}{N_0}\sum\left[f_0(x_i)\frac{1}{N_1}\sum\left[f_1(x_j)\frac{1}{N_2}\sum\left[\frac{f_2(x_k)}{p(x_k)}\frac{1}{N_3}\sum\frac{p(x_l)}{p(x_l)}\right]\right]\right]$$

This subsamples {L} into four subsets: {L}→{x₁}→{$x_k$}→{$x_j$}→{$x_i$}. The inner sum is degenerate:

$$\frac{1}{N_3}\sum\frac{p(x_l)}{p(x_l)} \equiv 1$$

In at least one embodiment, this numerical estimate:

$$\int f_0(x) f_1(x) f_2(x) dx \approx$$

$$\frac{1}{N_0} \sum \left[ f_0(x_i) \frac{1}{N_1} \sum \left[ f_1(x_j) \frac{1}{N_2} \sum \left[ \frac{f_2(x_k)}{p(x_k)} \frac{1}{N_3} \sum \frac{p(x_l)}{\hat{p}(x_l)} \right] \right] \right]$$

may be computed by taking the domain $\{L\}$, where in at least one embodiment $\{L\}$ is a set of emissive triangles corresponding to the scene lights. In at least one embodiment, $N_3$ samples are then drawn from $\{L\}$, according to the distribution $p(x)$, to get $\{x_l\}$. Since insertion into $\{x_l\}$ is according to $p(x)$, samples in $\{x_l\}$ are already distributed according to $p(x)$. This means $N_2$ samples are drawn uniformly from $\{x_i\}$ to get $\{x_k\}$. Then, embodiments continue to sample $\{x_j\}$ and $\{x_i\}$ from this set of samples $\{x_k\}$.

Forms of resampling may be classified as stratified and unstratified. The form with nested sums, as described above, is a stratified approach:

$$\int f(x) dx \approx \frac{1}{N} \sum_{i=1}^{N} \left( \frac{f(x_i)}{\hat{p}(x_i)} \left( \frac{1}{M} \sum_{j=1}^{M} \frac{\hat{p}(x_j)}{p(x_j)} \right) \right)$$

This uses M*N candidates $x_{ij}$.
The unstratified form can be formulated as:

$$\int f(x) dx \approx \left( \frac{1}{N} \sum_{i=1}^{N} \left( \frac{f(x_i)}{\hat{p}(x_i)} \left( \frac{1}{M} \sum_{j=1}^{M} \frac{\hat{p}(x_j)}{p(x_j)} \right) \right) \right)$$

This may only require M candidates $x_j$ and can reuse these candidates to draw all N samples. In this pre-randomized form of RIS:

$$\int f_0(x) f_1(x) f_2(x) dx \approx$$

$$\frac{1}{N_0} \sum \left[ f_0(x_i) \frac{1}{N_1} \sum \left[ f_1(x_j) \frac{1}{N_2} \sum \left[ \frac{f_2(x_k)}{p(x_k)} \frac{1}{N_3} \sum \frac{p(x_l)}{\hat{p}(x_l)} \right] \right] \right],$$

the pre-randomized set can actually be pulled out of the sum, if it is acceptable to give up some degree of stratification:

$$\int f_0(x) f_1(x) f_2(x) dx \approx$$

$$\left( \frac{1}{N_0} \sum \left[ f_0(x_i) \frac{1}{N_1} \sum \left[ f_1(x_j) \frac{1}{N_2} \sum \frac{f_2(x_k)}{p(x_k)} \right] \right] \right) \left( \frac{1}{N_3} \sum \frac{p(x_l)}{\hat{p}(x_l)} \right).$$

Since this was stratification that wouldn't be the case without the extra set of $N_3$ samples $\{x_l\}$, this may not be a significant factor in some embodiments.

In at least one embodiment, there can also be partial stratification, using multiple sets $\{x_l\}$ yet using fewer than the number necessary for full stratification (in this case, that would be $N_0 N_1 N_2$ different sets $\{x_l\}$). And the degenerate term $$\frac{1}{N_3} \sum \frac{p(x_l)}{\hat{p}(x_l)}$$

cancels away, no matter where it is put, indicating flexibility. Various embodiments may be based on how this "partial stratification" occurs in various pre-randomization algorithms, as described herein.

Figure 11:
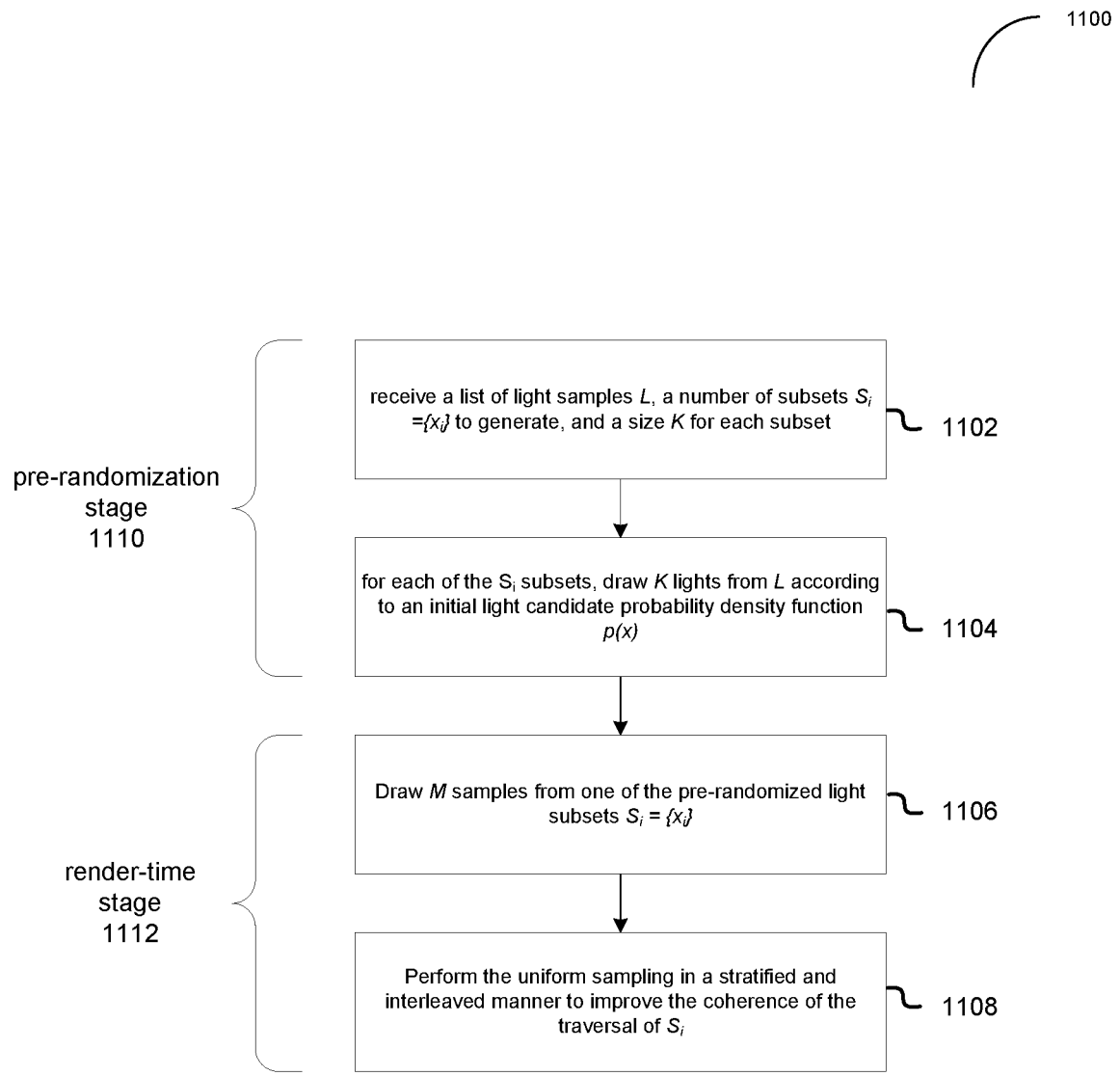
FIG. 11 is an illustration of an example process comprising pre-randomization and render-time stages, in accordance with at least one embodiment.

In an example embodiment, a pre-randomization stage and a render-time stage is performed. An example illustration of such an algorithm is depicted in FIG. 11.

A pre-randomization stage may comprise 1) Input a list of light samples L, a number of subsets $S_i = \{x_l\}$ to generate, and a size K for each subset; and 2) For each of the $S_i$ subsets, draw K lights from L according the "initial light candidate" probability density function $p(x)$. For example, $p(x) \propto L_e(x)$, i.e., each light's emitted power.

At a render-time stage, for each pixel, Instead of drawing M samples from the total list of light samples $\{L\}$ using distribution $p(x)$, M samples are drawn uniformly from one of the pre-randomized light subsets $S_i = \{x_l\}$. This uniform sampling can be done in a stratified and interleaved manner to ensure traversal of $S_i$ is maximally coherent.

Figure 6:
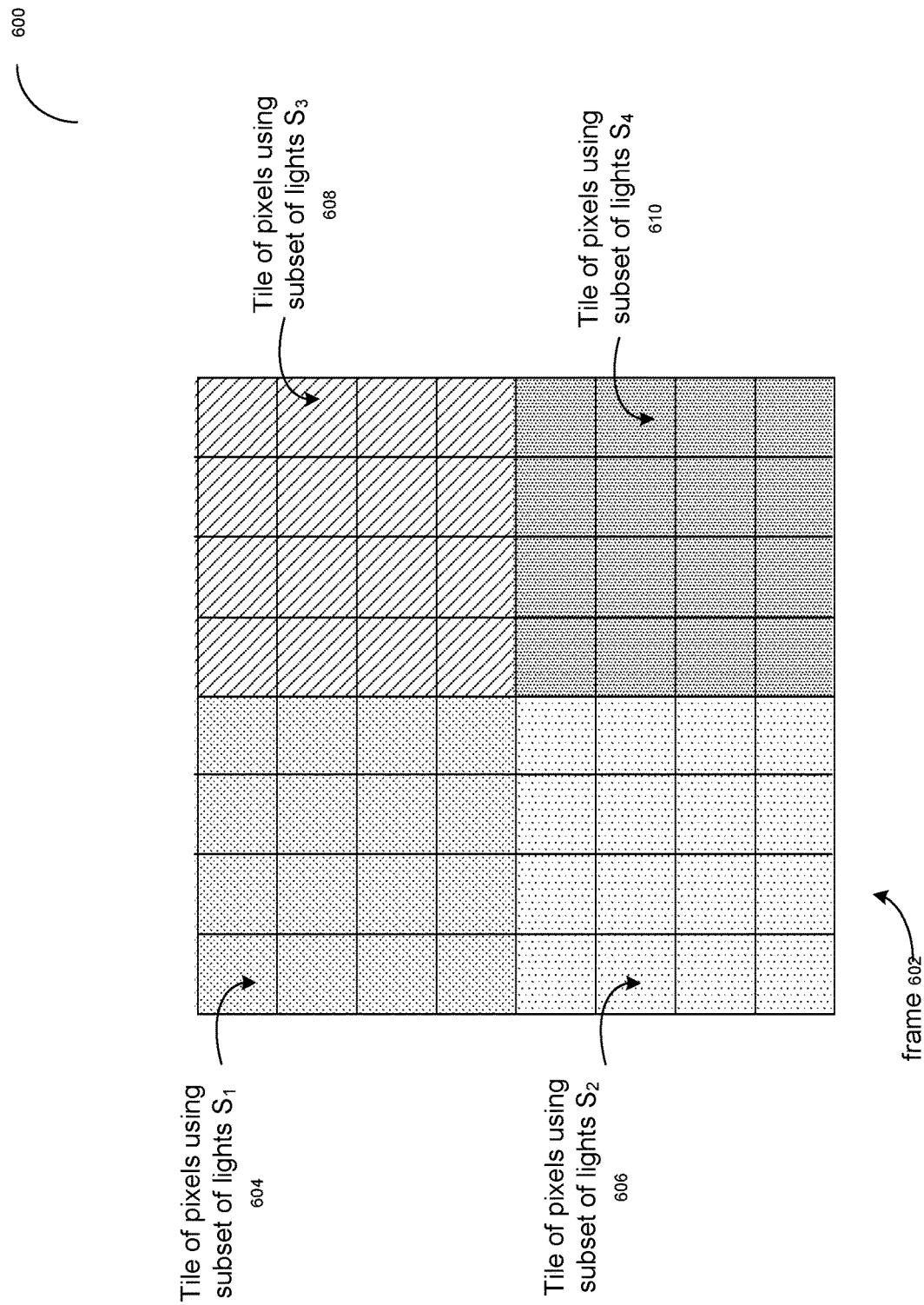
FIG. 6 depicts an example of rendering tiles based on a selection of one or more pre-sampled subsets of lights, in accordance with at least one embodiment.

FIG. 6 depicts an example of rendering tiles based on a selection of one or more pre-sampled subsets of lights, in accordance with at least one embodiment. As depicted by the example 600, a frame 602 may be subdivided into tiles, and each tile may be rendered separately. In at least one embodiment, a plurality of subsets of lights are generated during pre-frame processing. In at least one embodiment, each subset is stored in a separate data structure or memory portion. An embodiment of a rendering algorithm may incorporate a step in which a subset of lights is selected for use in rendering a tile. During rendering, each pixel resamples from some subset $S_i$ of the original light list $\{L\}$. To ensure warp coherence, active threads sharing processor cache or other memory resources should resample from the same subset $S_i$.

All pixels in some image tile may sample from the same $S_i$. For example, in the example 600, all pixels from a first tile 604 are rendered based on pixels resampled from the subset $S_1$, pixels from a second tile 606 are rendered using pixels resampled from $S_2$, pixels from a third tile 608 are rendered using pixels resampled from $S_3$, and pixels from a fourth tile 610 are rendered using pixels resampled from $S_4$.

In at least one embodiment, target tile size is configured based on hardware configuration. Experiments have shown that, in some embodiments, 8×8 and 16×16 tiles may result in good performance. In these embodiments, larger tiles introduced artifacts, while using 4×4 image tiles increased incoherence and thereby reduced performance.

Figure 7:
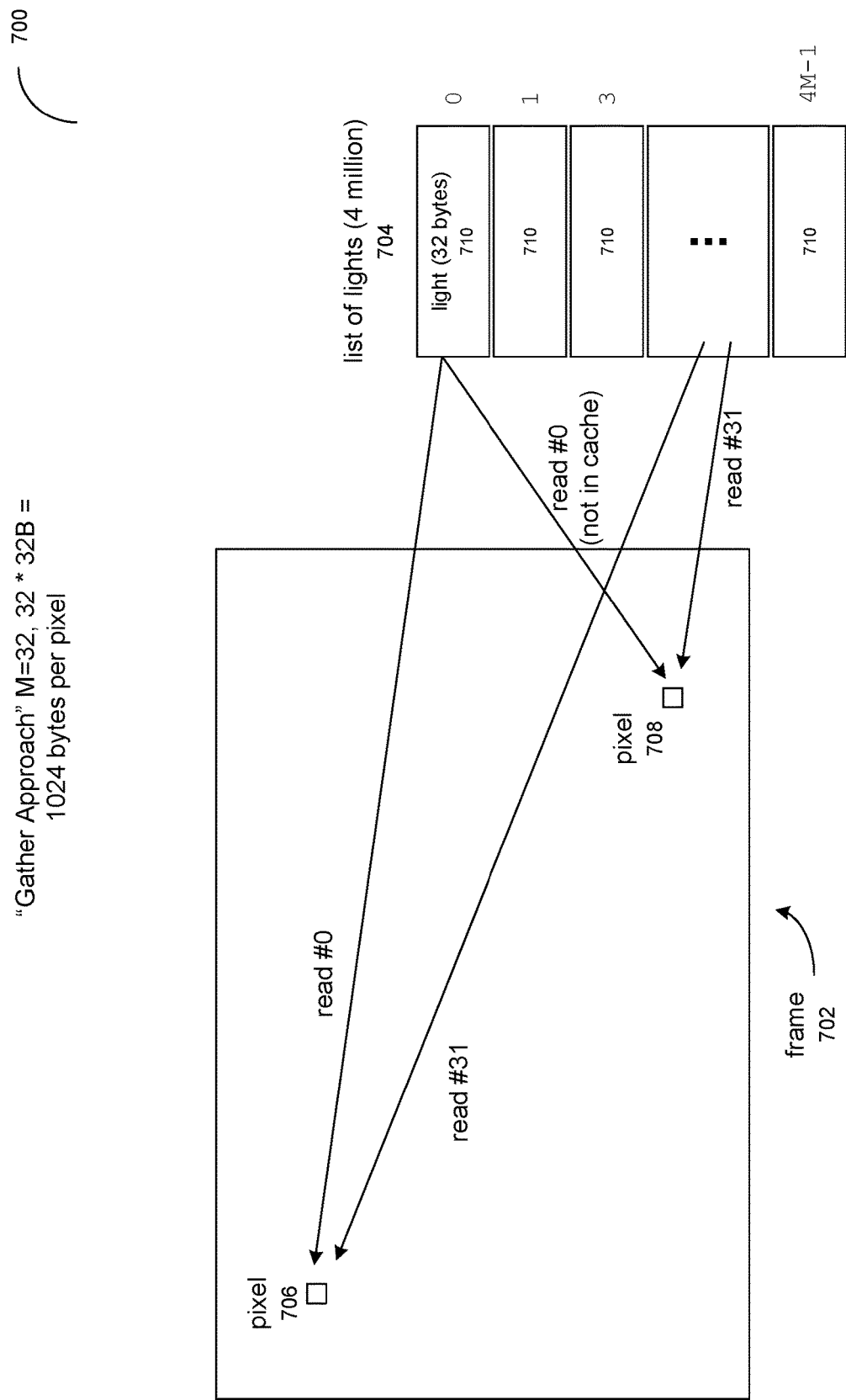
FIG. 7 is an illustration of reservoir-based spatiotemporal importance resampling ("ReSTIR") candidate selection using a gather approach, in accordance with at least one embodiment.

FIG. 7 is an illustration of a possible approach to candidate selection for a sampling technique such as ReSTIR. In the example 700, a gather approach is used. As depicted in the example 700, a frame 702 consists of various pixels 706, 708 that are each rendered based on a subset of lights drawn randomly from a list of lights 402. In this example, it is assumed that the subset is identified prior to rendering the frame, and re-used for various pixels within the frame 702. To render a pixel 706, thirty two reads, from #1 to #32, are performed from the list of lights 704, to obtain information from lights 710 in the identified subset, but stored in the list of lights 704 comprising all scene lights (in this example, four million scene lights). Subsequently, when another pixel 708 is rendered, using the same subset of lights, the system may again perform reads #1 to #32 to access the same subset of lights from the list of lights 704. However, because other pixels may have been rendered using different lights (e.g., lights from another subset), the lights from the original subset are no longer in cache. As such, this approach that may have problematic performance characteristics.

Figure 8:
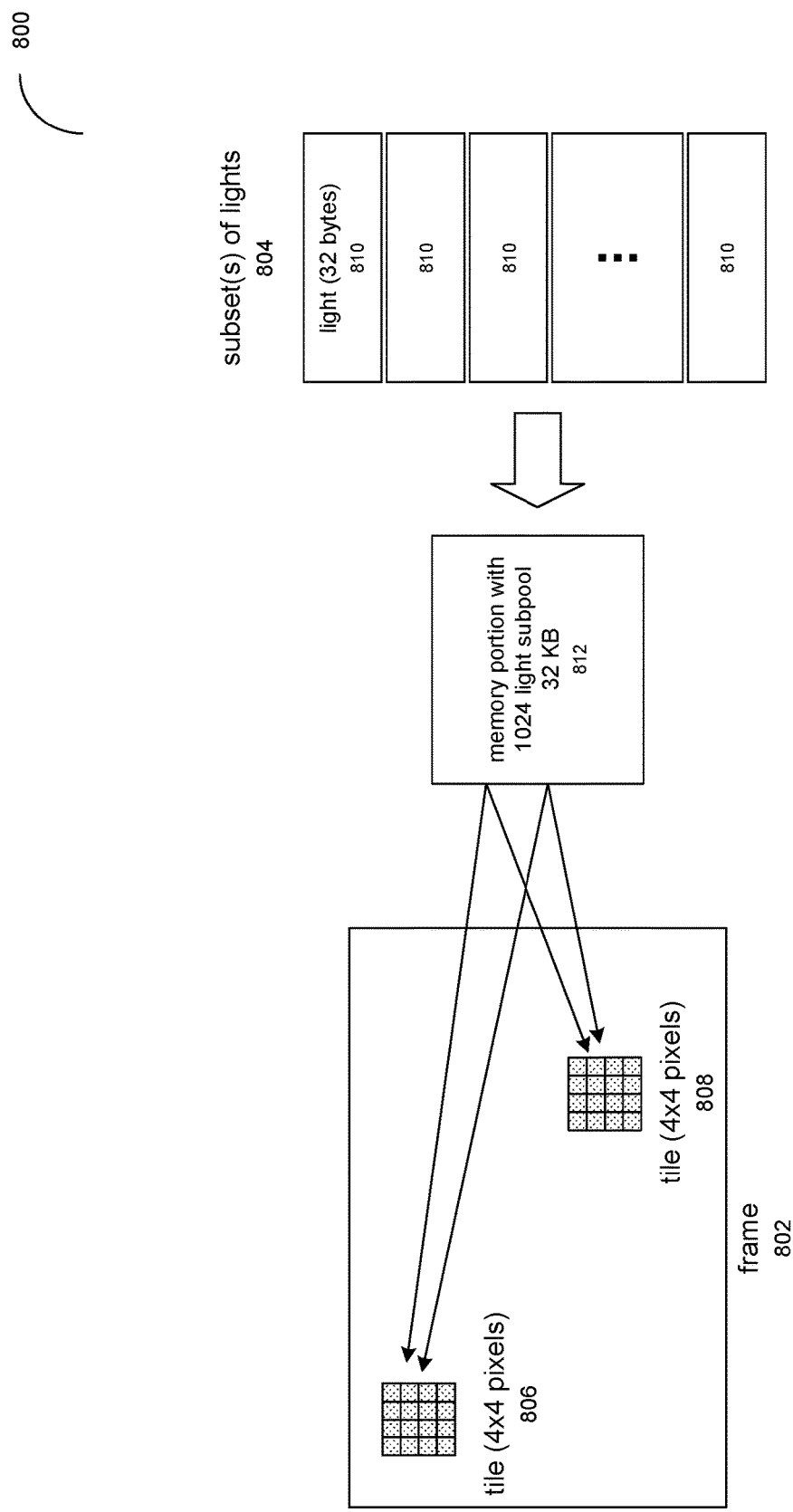
FIG. 8 is an illustration of ReSTIR candidate selection using a scatter approach, in accordance with at least one embodiment.

FIG. 8 is an illustration of ReSTIR candidate selection using a scatter approach, in accordance with at least one embodiment. As described herein, lights can be pre-randomized into "subpools" $S_i$, as visualized in the example 800. In addition, the example 800 also shows that embodiments may vary how subpools get distributed over the screen. In at least one embodiment, a screen tile may grab from one subpool or from multiple subpools. In at least one embodiment, this is defined by reuse parameters. For example, in at least one embodiment, each light in a subpool is reused some predetermined number of times, as indicated by a reuse parameter. In at least one embodiment, tile size varies dynamically based on the indicated reuse parameters.

In at least one embodiment, one or more subsets of lights 804 is generated from a list of all scene lights. The list of all scene lights may be very large, such as, in one example, four million lights. The number and size of the one or more subsets of lights 804 may vary depending on configuration. In one example, the one or more subsets of lights comprises multiple subpools each including 1024 lights.

In at least one embodiment, the one or more subsets of lights 804 are generated by sampling or shuffling lights 810 from among all scene lights. In at least one embodiment, one or more stochastic processes, such as random number generation, are used in the sampling or shuffling.

In at least one embodiment, some or all of the one or more subsets are stored in a memory portion 812. For example, in at least one embodiment, a subpool comprising 1024 lights is stored, as depicted in FIG. 8, in a memory portion 812. This subpool may then be used to render pixels within various tiles 806, 808 of frame 802, by drawing pre-randomized samples from the subpool in the memory portion 812.

Figure 9:
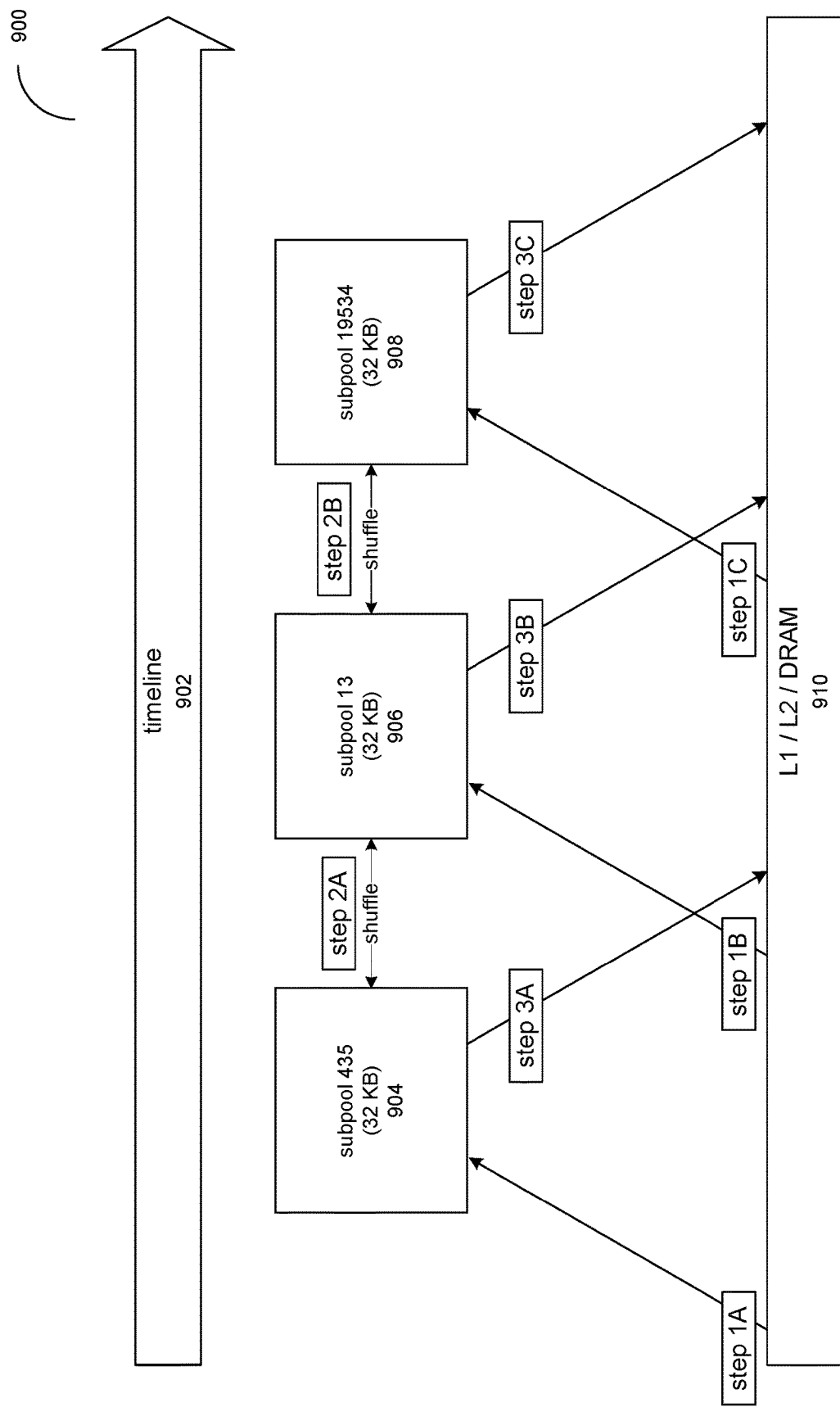
FIG. 9 is an illustration of subpool reshuffling, in accordance with at least one embodiment.

In at least one embodiment, this pre-randomization approach provides various advantages. For example, if care is taken to promote consistent statistical distribution of light samples in subpools $S_i$..., there can be flexibility regarding how the subpools are created. The subpools may, for example, be created in cheaper ways such as shuffling between light subpools, as depicted in FIG. 9. This avoids incoherent memory reads into the global light list {L} (in this example, 4 million entries long).

FIG. 9 is an illustration of subpool reshuffling, in accordance with at least one embodiment. In at least one embodiment, multiple subpools 904-908 are loaded into one or more memory portions, such as one or more portions of L1/L2/DRAM 910. These subpools may be read, at steps 1A, 1B, and 1C, and used to render tiles of a frame. At steps 2A and 2B, lights in the subpools 904, 906, 908 are shuffled. For example, in at least one embodiment, some of the lights in a subpool 904 are swapped, based on one or more stochastic processes, with some of the lights in another subpool 906. As depicted in the example 900, the shuffling may occur over time. In at least one embodiment, reads and write-back operations to L1/L2/DRAM 910 may overlap, as depicted by the overlapping of read steps 1A, 1B, 1C and write steps 3A, 3B, 3C, along a timeline 902.

Figure 10:
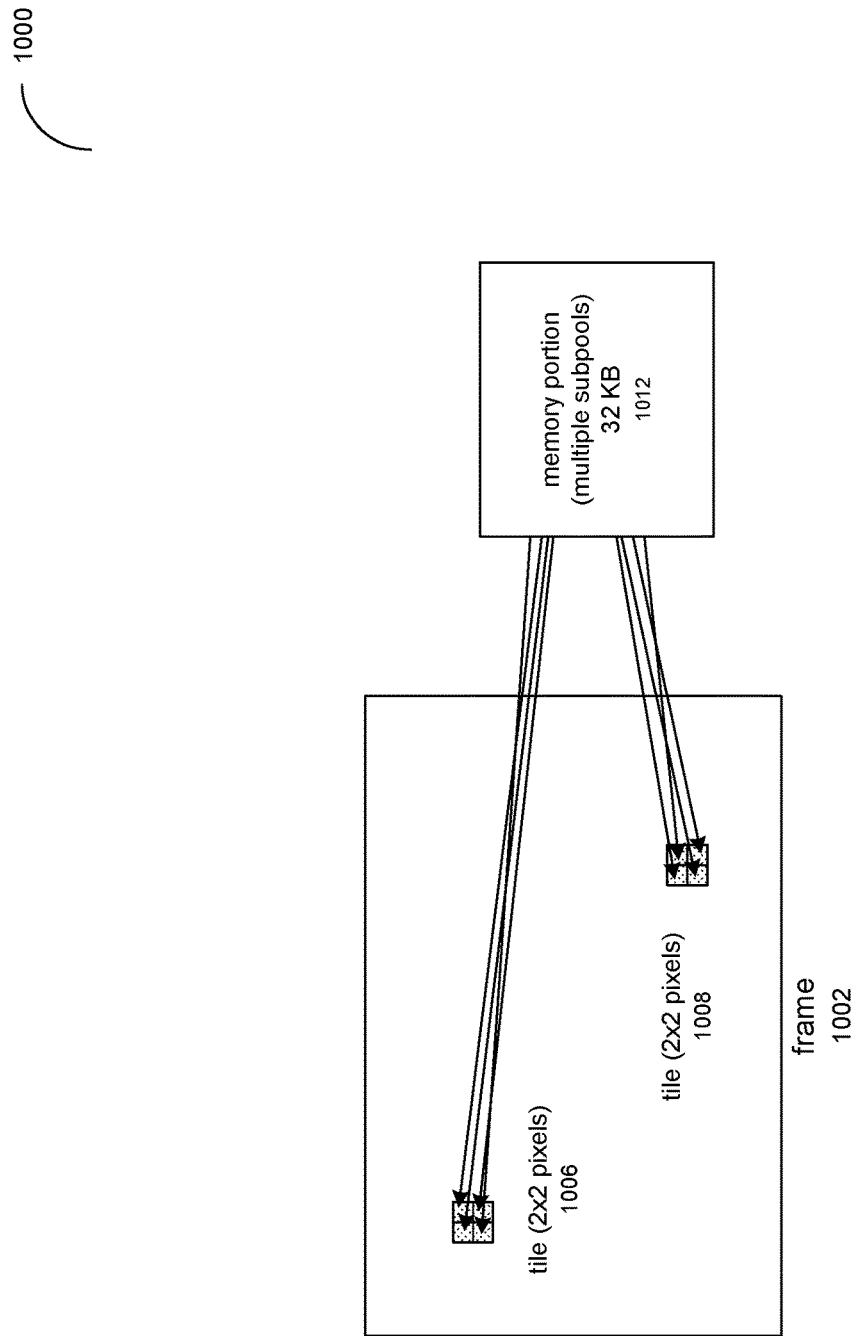
FIG. 10 is an illustration of rendering a frame using multiple open tiles, in accordance with at least one embodiment.

FIG. 10 is an illustration 1000 of rendering a frame using multiple opened tiles, in accordance with at least one embodiment. An opened tile may refer to tiles for which at least one subset of lights has been sampled from among a larger number of scene lights. This subset is made available for use in rendering by having been loaded into a memory portion separate from the memory or storage in which the scene lights are kept. When multiple tiles are open, they may share a single subpool or, alternatively, rely on multiple subpools that have been loaded into a memory portion.

In at least one embodiment, multiple tiles are opened at once and there is cycling between multiple subpools. For example, as depicted in FIG. 10, a frame 1002 may be divided into T=16 tiles, of 2×2 pixel per tile, 1006, 1008, using four samples per pixel. A current subpool might then be used for one sample from each of the T=16 tiles. In this example, it would take 16 subpools loaded into memory portion 1012 to finish all 16 tiles, because each tile uses 2×2×4=16 samples. In at least one embodiment, each subpool services two samples per pixel, thereby using 32 subpools. In at least one embodiment, the number of tiles is increased to T=32, also using 32 subpools. It will be appreciated that these examples are intended to be illustrative, and as such should not be construed in a manner which would limit the scope of potential embodiments to only those that incorporate the specific examples provided. These parameters may be adjusted, in various embodiments, to values that best utilize available hardware. In general, suitable values may be determined through experimentation and consideration of hardware characteristics, potentially including the sizes of processor caches, such as L1, L2, and L3 processor caches.

In at least one embodiment, the pre-randomization techniques described herein provide various additional advantages. Sampling lights can be an expensive operation, especially with a heterogeneous set of light types, such as emissive triangles, spheres, meshes, planes, cylinders, and so forth. Control flow divergence on SIMD processors can also be a significant cause or performance slowdown. By pre-randomization, this expensive divergence is moved outside the performance-sensitive inner rendering loop. Instead it occurs before rendering, many fewer times per frame. Different light types may be split into different light pools $S_i$, or lights may be sampled using a coherent SIMD control flows, then randomized into subpools as a second step.

In at least one embodiment, the pre-randomization techniques described herein increase efficiency in handling dynamic lights. When lights move around the scene and change intensity, there may be a need to update the current positions of the lights, update the intensity of the lights, and potentially update the sampling distribution used to select the lights. By pre-randomizing lights, these updates can be done over a fewer number of lights. For example, in at least one embodiment, only those inside lights that are in the frame's selected subpools $S_i$ are fully updated.

In at least one embodiment, the pre-randomization techniques described herein increase allow greater flexibility. For example, the use of tiles allows flexibly changing the shape and domain of the light sampling.

FIG. 11 is an illustration of an example process comprising pre-randomization and render-time stages, in accordance with at least one embodiment. Although the example process 1100 is depicted as a sequence of operations, it will be appreciated that, in embodiments, the depicted operations may be altered in various ways, and that some operations may be omitted, reordered, or performed in parallel with other operations, except where an order is explicitly stated or logically implied, such as when the input from one operation depends upon the output of another operation.

The operations depicted by FIG. 11 may be performed by a system, such as the system 100 depicted in FIG. 1, comprising at least one processor and a memory with stored instructions that, in response to being executed by the at least one processor, cause the system to perform the depicted operations. In at least one embodiment, the operations are performed by a combination of hardware and software, where said hardware includes one or more APUs, CPUs, GPUs, PPUs, GPGPUs, parallel processors, processing clusters, graphics processors, multiprocessors, and so forth as depicted by the various FIGS. herein. In at least one embodiment, said software comprises libraries such as any of CUDA, OpenGL, OpenLC, ROCm, and may also include operating system software.

At 1102, in at least one embodiment, the system receives a list of light samples L, a number of subsets $S_i=\{x_i\}$ to be generated, and a size K for each subset.

At 1104, in at least one embodiment, the system draws, for each of the $S_i$ subsets, K lights from L according to an initial light candidate probability function p(x).

In at least one embodiment, the preceding operations 1102, 1104 are performed during a pre-randomization stage 1110 in which the subsets $S_i$ are drawn from the list of lights L. During second render-time stage 1112 comprising operations 1106 and 1108, the subsets are used to render a frame of graphics.

At 1106, in at least one embodiment, the system draws M samples uniformly from one of the pre-randomized light subsets $S_i=\{x_i\}$. As illustrated in 1108, the system may perform the uniform sampling in a stratified and interleaved manner to improve cache coherence during the traversal of $S_i$. FIG. 9 depicts an example of sampling performed in a stratified and interleaved manner.

Light subpools may be associated with specific groups of pixels, texels, or voxels. Light subpools may be used to select even smaller subpools. This may correspond to a hierarchical reduction in incoherence, essentially building a stochastic data structure from random, pseudo-random, or quasi-random selection of lights. In at least one embodiment, this stochastic data structure comprises hierarchical levels of samples, with each level comprising samples selected, by processes that are at least partially random, from the level below it. Light subpools may be resized dynamically for performance and quality tradeoffs, if using subpools and screen tiles leads to banding artifacts in certain cases. The number and size of subpools may be varied across user devices to control performance, memory usage, and quality over a variety of hardware types of varying capability.

Data Center

Figure 12:
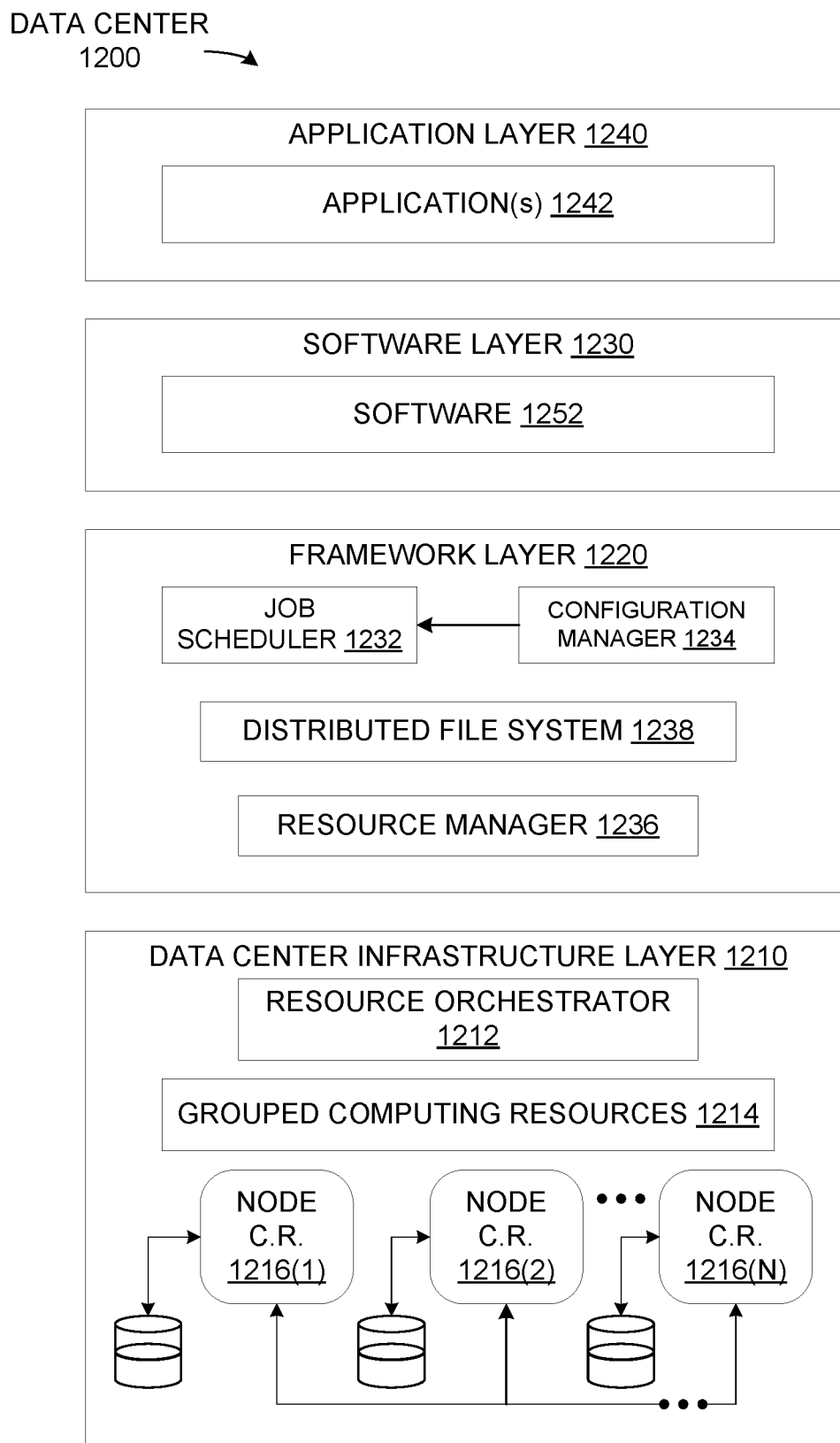
FIG. 12 illustrates an exemplary data center, in accordance with at least one embodiment.

FIG. 12 illustrates an exemplary data center 1200, in accordance with at least one embodiment. In at least one embodiment, data center 1200 includes, without limitation, a data center infrastructure layer 1210, a framework layer 1220, a software layer 1230 and an application layer 1240.

In at least one embodiment, as shown in FIG. 12, data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1216(1)-1216(N) may be a server having one or more of above-mentioned computing resources.

In at least one embodiment, grouped computing resources 1214 may include separate groupings of node C.R.s housed within one or more racks (not shown), or many racks housed in data centers at various geographical locations (also not shown). Separate groupings of node C.R.s within grouped computing resources 1214 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1212 may configure or otherwise control one or more node C.R.s 1216(1)-1216(N) and/or grouped computing resources 1214. In at least one embodiment, resource orchestrator 1212 may include a software design infrastructure ("SDI") management entity for data center 1200. In at least one embodiment, resource orchestrator 1212 may include hardware, software or some combination thereof.

In at least one embodiment, as shown in FIG. 12, framework layer 1220 includes, without limitation, a job scheduler 1232, a configuration manager 1234, a resource manager 1236 and a distributed file system 1238. In at least one embodiment, framework layer 1220 may include a framework to support software 1252 of software layer 1230 and/or one or more application(s) 1242 of application layer 1240. In at least one embodiment, software 1252 or application(s) 1242 may respectively include web-based service software or applications, such as those provided by Amazon Web Services, Google Cloud and Microsoft Azure. In at least one embodiment, framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1232 may include a Spark driver to facilitate scheduling of workloads supported by various layers of data center 1200. In at least one embodiment, configuration manager 1234 may be capable of configuring different layers such as software layer 1230 and framework layer 1220, including Spark and distributed file system 1238 for supporting large-scale data processing. In at least one embodiment, resource manager 1236 may be capable of managing clustered or grouped computing resources mapped to or allocated for support of distributed file system 1238 and job scheduler 1232. In at least one embodiment, clustered or grouped computing resources may include grouped computing resource 1214 at data center infrastructure layer 1210. In at least one embodiment, resource manager 1236 may coordinate with resource orchestrator 1212 to manage these mapped or allocated computing resources.

In at least one embodiment, software 1252 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216(1)-1216(N), grouped computing resources 1214, and/ or distributed file system 1238 of framework layer 1220. In at least one or more types of applications may include, without limitation, CUDA applications.

In at least one embodiment, any of configuration manager 1234, resource manager 1236, and resource orchestrator 1212 may implement any number and type of self-modifying actions based on any amount and type of data acquired in any technically feasible fashion. In at least one embodiment, self-modifying actions may relieve a data center operator of data center 1200 from making possibly bad configuration decisions and possibly avoiding underutilized and/or poor performing portions of a data center.

Computer-Based Systems

The following FIGS. set forth, without limitation, exemplary computer-based systems that can be used to implement at least one embodiment.

Figure 13:
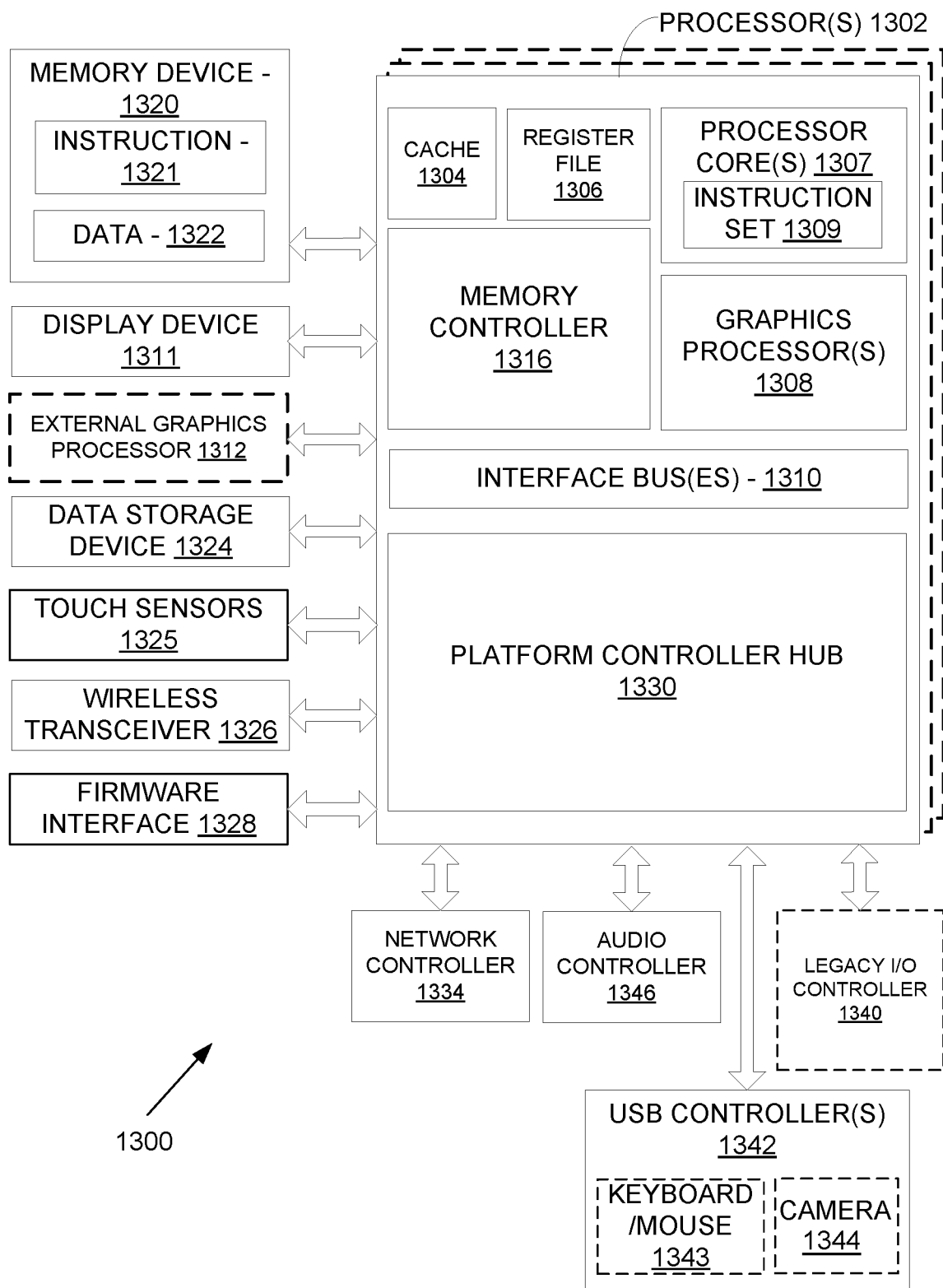
FIG. 13 illustrates a processing system, in accordance with at least one embodiment.

FIG. 13 illustrates a processing system 1300, in accordance with at least one embodiment. In at least one embodiment, processing system 1300 includes one or more processors 1302 and one or more graphics processors 1308, and may be a single processor desktop system, a multiprocessor workstation system, or a server system having a large number of processors 1302 or processor cores 1307. In at least one embodiment, processing system 1300 is a processing platform incorporated within a system-on-a-chip ("Sort") integrated circuit for use in mobile, handheld, or embedded devices.

In at least one embodiment, processing system 1300 can include, or be incorporated within a server-based gaming platform, a game console, a media console, a mobile gaming console, a handheld game console, or an online game console. In at least one embodiment, processing system 1300 is a mobile phone, smart phone, tablet computing device or mobile Internet device. In at least one embodiment, processing system 1300 can also include, couple with, or be integrated within a wearable device, such as a smart watch wearable device, smart eyewear device, augmented reality device, or virtual reality device. In at least one embodiment, processing system 1300 is a television or set top box device having one or more processors 1302 and a graphical interface generated by one or more graphics processors 1308.

In at least one embodiment, one or more processors 1302 each include one or more processor cores 1307 to process instructions which, when executed, perform operations for system and user software. In at least one embodiment, each of one or more processor cores 1307 is configured to process a specific instruction set 1309. In at least one embodiment, instruction set 1309 may facilitate Complex Instruction Set Computing ("CISC"), Reduced Instruction Set Computing ("RISC"), or computing via a Very Long Instruction Word ("VLIW"). In at least one embodiment, processor cores 1307 may each process a different instruction set 1309, which may include instructions to facilitate emulation of other instruction sets. In at least one embodiment, processor core 1307 may also include other processing devices, such as a digital signal processor ("DSP").

In at least one embodiment, processor 1302 includes cache memory ('cache") 1304. In at least one embodiment, processor 1302 can have a single internal cache or multiple levels of internal cache. In at least one embodiment, cache memory is shared among various components of processor 1302. In at least one embodiment, processor 1302 also uses an external cache (e.g., a Level 3 ("L3") cache or Last Level Cache ("LLC")) (not shown), which may be shared among processor cores 1307 using known cache coherency techniques. In at least one embodiment, register file 1306 is additionally included in processor 1302 which may include different types of registers for storing different types of data (e.g., integer registers, floating point registers, status registers, and an instruction pointer register). In at least one embodiment, register file 1306 may include general-purpose registers or other registers.

In at least one embodiment, one or more processor(s) 1302 are coupled with one or more interface bus(es) 1310 to transmit communication signals such as address, data, or control signals between processor 1302 and other components in processing system 1300. In at least one embodiment interface bus 1310, in one embodiment, can be a processor bus, such as a version of a Direct Media Interface ("DMI") bus. In at least one embodiment, interface bus 1310 is not limited to a DMI bus, and may include one or more Peripheral Component Interconnect buses (e.g., "PCI," PCI Express ("PCIe")), memory buses, or other types of interface buses. In at least one embodiment processor(s) 1302 include an integrated memory controller 1316 and a platform controller hub 1330. In at least one embodiment, memory controller 1316 facilitates communication between a memory device and other components of processing system 1300, while platform controller hub ("PCH") 1330 provides connections to Input/Output ("I/O") devices via a local I/O bus.

In at least one embodiment, memory device 1320 can be a dynamic random access memory ("DRAM") device, a static random access memory ("SRAM") device, flash memory device, phase-change memory device, or some other memory device having suitable performance to serve as processor memory. In at least one embodiment memory device 1320 can operate as system memory for processing system 1300, to store data 1322 and instructions 1321 for use when one or more processors 1302 executes an application or process. In at least one embodiment, memory controller 1316 also couples with an optional external graphics processor 1312, which may communicate with one or more graphics processors 1308 in processors 1302 to perform graphics and media operations. In at least one embodiment, a display device 1311 can connect to processor(s) 1302. In at least one embodiment display device 1311 can include one or more of an internal display device, as in a mobile electronic device or a laptop device or an external display device attached via a display interface (e.g., DisplayPort, etc.). In at least one embodiment, display device 1311 can include a head mounted display ("HMD") such as a stereoscopic display device for use in virtual reality ("VR") applications or augmented reality ("AR") applications.

In at least one embodiment, platform controller hub 1330 enables peripherals to connect to memory device 1320 and processor 1302 via a high-speed I/O bus. In at least one embodiment, I/O peripherals include, but are not limited to, an audio controller 1346, a network controller 1334, a firmware interface 1328, a wireless transceiver 1326, touch sensors 1325, a data storage device 1324 (e.g., hard disk drive, flash memory, etc.). In at least one embodiment, data storage device 1324 can connect via a storage interface (e.g., SATA) or via a peripheral bus, such as PCI, or PCIe. In at least one embodiment, touch sensors 1325 can include touch screen sensors, pressure sensors, or fingerprint sensors. In at least one embodiment, wireless transceiver 1326 can be a Wi-Fi transceiver, a Bluetooth transceiver, or a mobile network transceiver such as a 3G, 4G, or Long Term Evolution ("LTE") transceiver. In at least one embodiment, firmware interface 1328 enables communication with system firmware, and can be, for example, a unified extensible firmware interface ("UEFI"). In at least one embodiment, network controller 1334 can enable a network connection to a wired network. In at least one embodiment, a high-performance network controller (not shown) couples with interface bus 1310. In at least one embodiment, audio controller 1346 is a multi-channel high definition audio controller. In at least one embodiment, processing system 1300 includes an optional legacy I/O controller 1340 for coupling legacy (e.g., Personal System 2 ("PS/2")) devices to processing system 1300. In at least one embodiment, platform controller hub 1330 can also connect to one or more Universal Serial Bus ("USB") controllers 1342 connect input devices, such as keyboard and mouse 1343 combinations, a camera 1344, or other USB input devices.

In at least one embodiment, an instance of memory controller 1316 and platform controller hub 1330 may be integrated into a discreet external graphics processor, such as external graphics processor 1312. In at least one embodiment, platform controller hub 1330 and/or memory controller 1316 may be external to one or more processor(s) 1302. For example, in at least one embodiment, processing system 1300 can include an external memory controller 1316 and platform controller hub 1330, which may be configured as a memory controller hub and peripheral controller hub within a system chipset that is in communication with processor(s) 1302.

Figure 14:
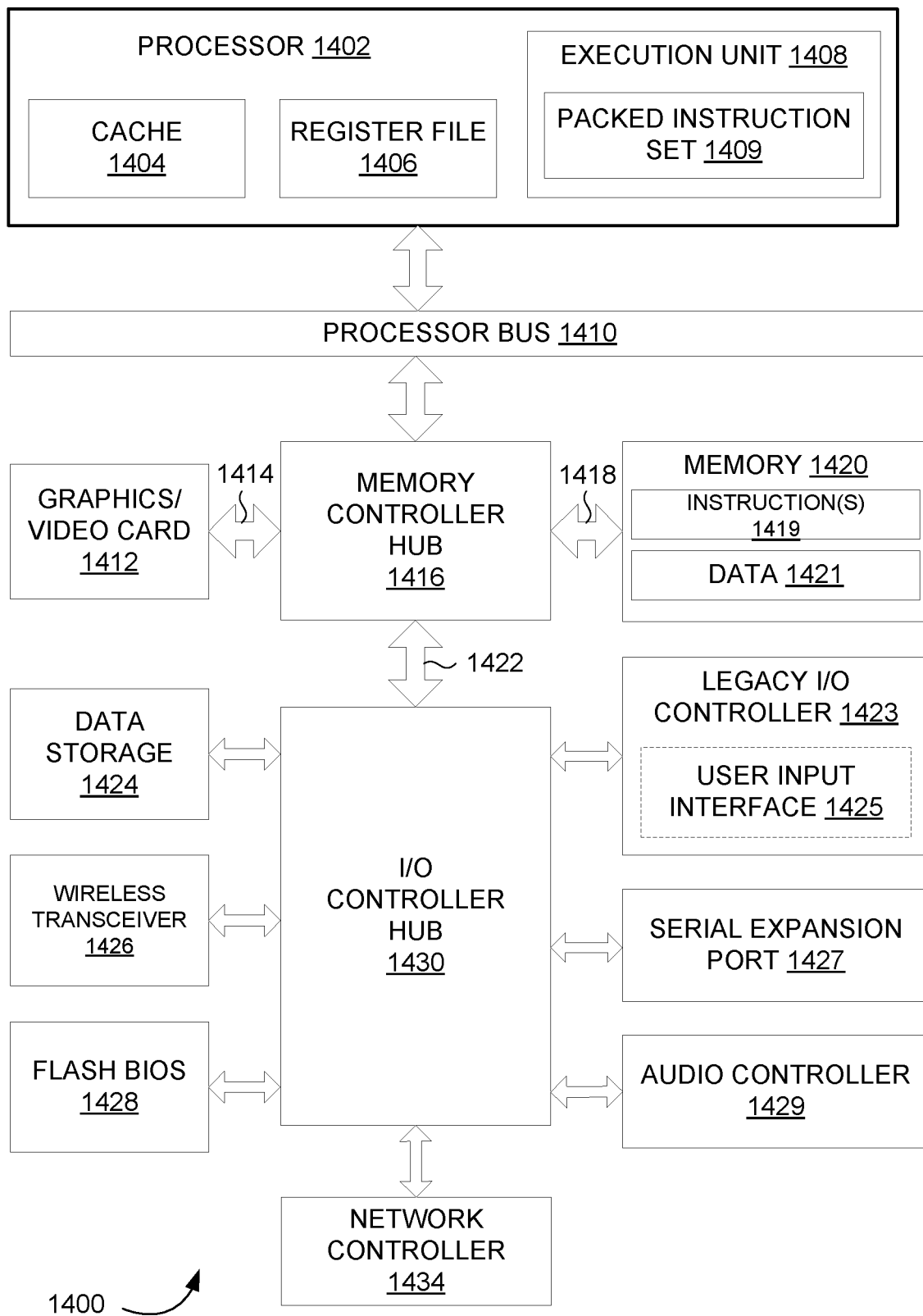
FIG. 14 illustrates a computer system, in accordance with at least one embodiment.

FIG. 14 illustrates a computer system 1400, in accordance with at least one embodiment. In at least one embodiment, computer system 1400 may be a system with interconnected devices and components, an SOC, or some combination. In at least on embodiment, computer system 1400 is formed with a processor 1402 that may include execution units to execute an instruction. In at least one embodiment, computer system 1400 may include, without limitation, a component, such as processor 1402 to employ execution units including logic to perform algorithms for processing data. In at least one embodiment, computer system 1400 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 1400 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1400 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 1400 may include, without limitation, processor 1402 that may include, without limitation, one or more execution units 1408 that may be configured to execute a Compute Unified Device Architecture ("CUDA") (CUDA® is developed by NVIDIA Corporation of Santa Clara, Calif.) program. In at least one embodiment, a CUDA program is at least a portion of a software application written in a CUDA programming language. In at least one embodiment, computer system 1400 is a single processor desktop or server system. In at least one embodiment, computer system 1400 may be a multiprocessor system. In at least one embodiment, processor 1402 may include, without limitation, a CISC microprocessor, a RISC microprocessor, a VLIW microprocessor, a processor implementing a combination of instruction sets, or any other processor device, such as a digital signal processor, for example. In at least one embodiment, processor 1402 may be coupled to a processor bus 1410 that may transmit data signals between processor 1402 and other components in computer system 1400.

In at least one embodiment, processor 1402 may include, without limitation, a Level 1 ("L1") internal cache memory ("cache") 1404. In at least one embodiment, processor 1402 may have a single internal cache or multiple levels of internal cache. In at least one embodiment, cache memory may reside external to processor 1402. In at least one embodiment, processor 1402 may also include a combination of both internal and external caches. In at least one embodiment, a register file 1406 may store different types of data in various registers including, without limitation, integer registers, floating point registers, status registers, and instruction pointer register.

In at least one embodiment, execution unit 1408, including, without limitation, logic to perform integer and floating point operations, also resides in processor 1402. Processor 1402 may also include a microcode ("ucode") read only memory ("ROM") that stores microcode for certain macro instructions. In at least one embodiment, execution unit 1408 may include logic to handle a packed instruction set 1409. In at least one embodiment, by including packed instruction set 1409 in an instruction set of a general-purpose processor 1402, along with associated circuitry to execute instructions, operations used by many multimedia applications may be performed using packed data in a general-purpose processor 1402. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1408 may also be used in microcontrollers, embedded processors, graphics devices, DSPs, and other types of logic circuits. In at least one embodiment, computer system 1400 may include, without limitation, a memory 1420. In at least one embodiment, memory 1420 may be implemented as a DRAM device, an SRAM device, flash memory device, or other memory device. Memory 1420 may store instruction(s) 1419 and/or data 1421 represented by data signals that may be executed by processor 1402.

In at least one embodiment, a system logic chip may be coupled to processor bus 1410 and memory 1420. In at least one embodiment, the system logic chip may include, without limitation, a memory controller hub ("MCH") 1416, and processor 1402 may communicate with MCH 1416 via processor bus 1410. In at least one embodiment, MCH 1416 may provide a high bandwidth memory path 1418 to memory 1420 for instruction and data storage and for storage of graphics commands, data and textures. In at least one embodiment, MCH 1416 may direct data signals between processor 1402, memory 1420, and other components in computer system 1400 and to bridge data signals between processor bus 1410, memory 1420, and a system I/O 1422. In at least one embodiment, system logic chip may provide a graphics port for coupling to a graphics controller. In at least one embodiment, MCH 1416 may be coupled to memory 1420 through high bandwidth memory path 1418 and graphics/video card 1412 may be coupled to MCH 1416 through an Accelerated Graphics Port ("AGP") interconnect 1414.

In at least one embodiment, computer system 1400 may use system I/O 1422 that is a proprietary hub interface bus to couple MCH 1416 to I/O controller hub ("ICH") 1430. In at least one embodiment, ICH 1430 may provide direct connections to some I/O devices via a local I/O bus. In at least one embodiment, local I/O bus may include, without limitation, a high-speed I/O bus for connecting peripherals to memory 1420, a chipset, and processor 1402. Examples may include, without limitation, an audio controller 1429, a firmware hub ("flash BIOS") 1428, a wireless transceiver 1426, a data storage 1424, a legacy I/O controller 1423 containing a user input interface 1425 and a keyboard interface, a serial expansion port 1427, such as a USB, and a network controller 1434. Data storage 1424 may comprise a hard disk drive, a floppy disk drive, a CD-ROM device, a flash memory device, or other mass storage device.

In at least one embodiment, FIG. 14 illustrates a system, which includes interconnected hardware devices or "chips." In at least one embodiment, FIG. 14 may illustrate an exemplary SoC. In at least one embodiment, devices illustrated in FIG. 14 may be interconnected with proprietary interconnects, standardized interconnects (e.g., PCIe), or some combination thereof. In at least one embodiment, one or more components of system 1400 are interconnected using compute express link ("CXL") interconnects.

Figure 15:
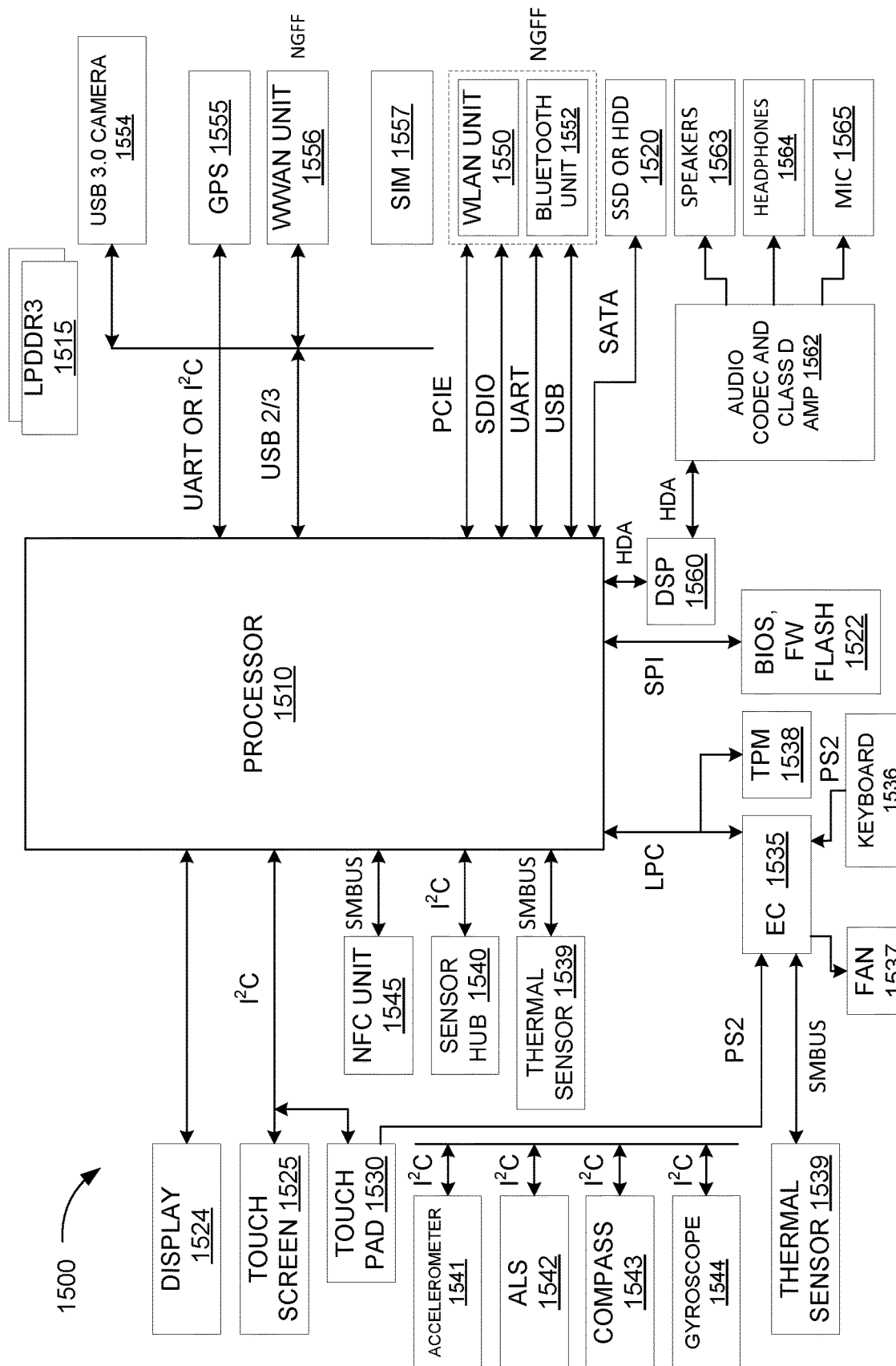
FIG. 15 illustrates a system, in accordance with at least one embodiment.

FIG. 15 illustrates a system 1500, in accordance with at least one embodiment. In at least one embodiment, system 1500 is an electronic device that utilizes a processor 1510. In at least one embodiment, system 1500 may be, for example and without limitation, a notebook, a tower server, a rack server, a blade server, a laptop, a desktop, a tablet, a mobile device, a phone, an embedded computer, or any other suitable electronic device.

In at least one embodiment, system 1500 may include, without limitation, processor 1510 communicatively coupled to any suitable number or kind of components, peripherals, modules, or devices. In at least one embodiment, processor 1510 is coupled using a bus or interface, such as an I$^2$C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 15 illustrates a system which includes interconnected hardware devices or "chips." In at least one embodiment, FIG. 15 may illustrate an exemplary SoC. In at least one embodiment, devices illustrated in FIG. 15 may be interconnected with proprietary interconnects, standardized interconnects (e.g., PCIe) or some combination thereof. In at least one embodiment, one or more components of FIG. 15 are interconnected using CXL interconnects.

In at least one embodiment, FIG. 15 may include a display 1524, a touch screen 1525, a touch pad 1530, a Near Field Communications unit ("NFC") 1545, a sensor hub 1540, a thermal sensor 1546, an Express Chipset ("EC") 1535, a Trusted Platform Module ("TPM") 1538, BIOS/firmware/flash memory ("BIOS, FW Flash") 1522, a DSP 1560, a Solid State Disk ("SSD") or Hard Disk Drive ("HDD") 1520, a wireless local area network unit ("WLAN") 1550, a Bluetooth unit 1552, a Wireless Wide Area Network unit ("WWAN") 1556, a Global Positioning System ("GPS") 1555, a camera ("USB 3.0 camera") 1554 such as a USB 3.0 camera, or a Low Power Double Data Rate ("LPDDR") memory unit ("LPDDR3") 1515 implemented in, for example, LPDDR3 standard. These components may each be implemented in any suitable manner.

In at least one embodiment, other components may be communicatively coupled to processor 1510 through components discussed above. In at least one embodiment, an accelerometer 1541, an Ambient Light Sensor ("ALS") 1542, a compass 1543, and a gyroscope 1544 may be communicatively coupled to sensor hub 1540. In at least one embodiment, a thermal sensor 1539, a fan 1537, a keyboard 1536, and a touch pad 1530 may be communicatively coupled to EC 1535. In at least one embodiment, a speaker 1563, a headphones 1564, and a microphone ("mic") 1565 may be communicatively coupled to an audio unit ("audio codec and class d amp") 1562, which may in turn be communicatively coupled to DSP 1560. In at least one embodiment, audio unit 1562 may include, for example and without limitation, an audio coder/decoder ("codec") and a class D amplifier. In at least one embodiment, a SIM card ("SIM") 1557 may be communicatively coupled to WWAN unit 1556. In at least one embodiment, components such as WLAN unit 1550 and Bluetooth unit 1552, as well as WWAN unit 1556 may be implemented in a Next Generation Form Factor ("NGFF").

Figure 16:
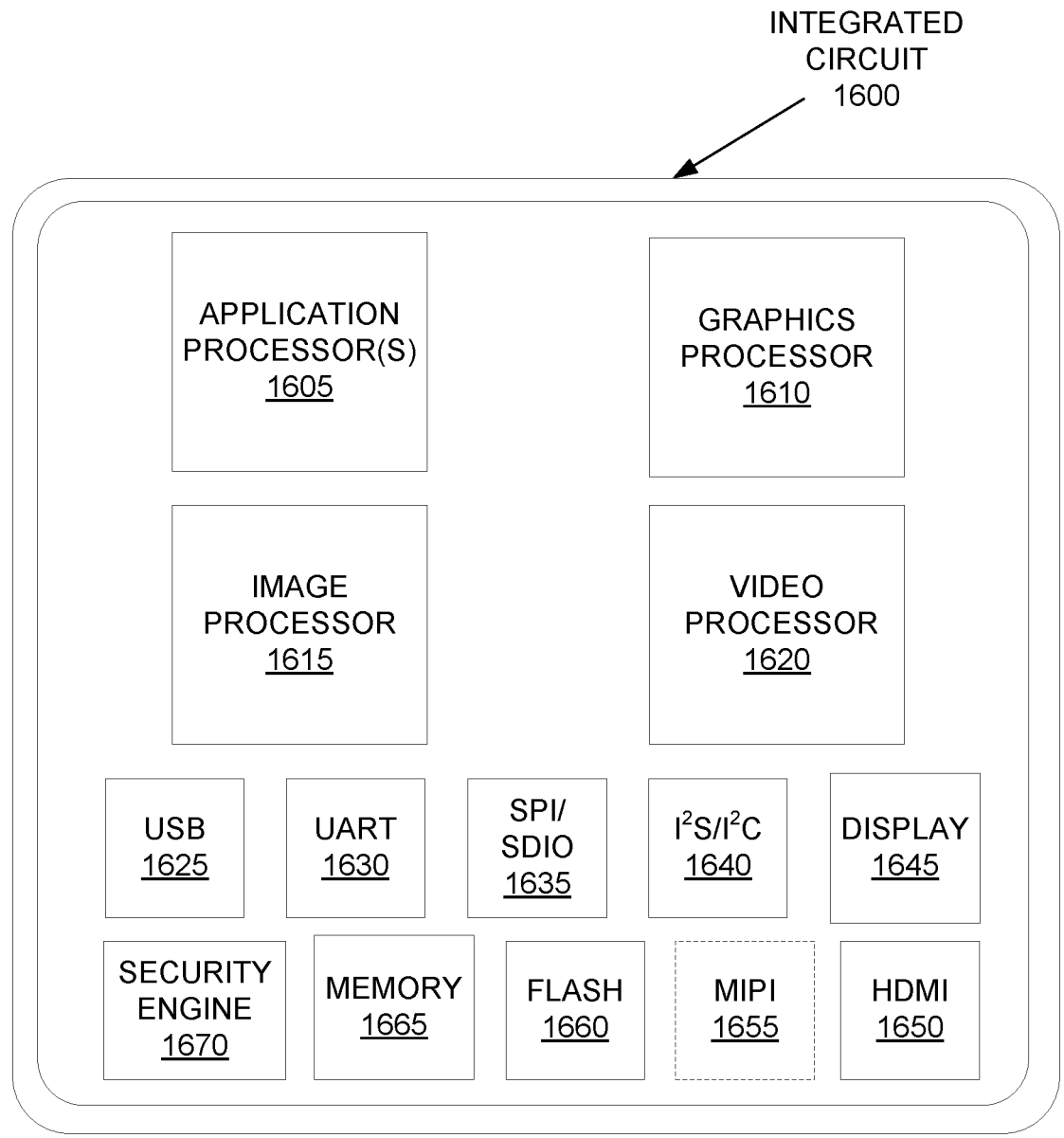
FIG. 16 illustrates an exemplary integrated circuit, in accordance with at least one embodiment.

FIG. 16 illustrates an exemplary integrated circuit 1600, in accordance with at least one embodiment. In at least one embodiment, exemplary integrated circuit 1600 is an SoC that may be fabricated using one or more IP cores. In at least one embodiment, integrated circuit 1600 includes one or more application processor(s) 1605 CPUs), at least one graphics processor 1610, and may additionally include an image processor 1615 and/or a video processor 1620, any of which may be a modular IP core. In at least one embodiment, integrated circuit 1600 includes peripheral or bus logic including a USB controller 1625, a UART controller 1630, an SPI/SDIO controller 1635, and an I$^2$S/I$^2$C controller 1640. In at least one embodiment, integrated circuit 1600 can include a display device 1645 coupled to one or more of a high-definition multimedia interface ("HDMI") controller 1650 and a mobile industry processor interface ("MIPI") display interface 1655. In at least one embodiment, storage may be provided by a flash memory subsystem 1660 including flash memory and a flash memory controller. In at least one embodiment, a memory interface may be provided via a memory controller 1665 for access to SDRAM or SRAM memory devices. In at least one embodiment, some integrated circuits additionally include an embedded security engine 1670.

Figure 17:
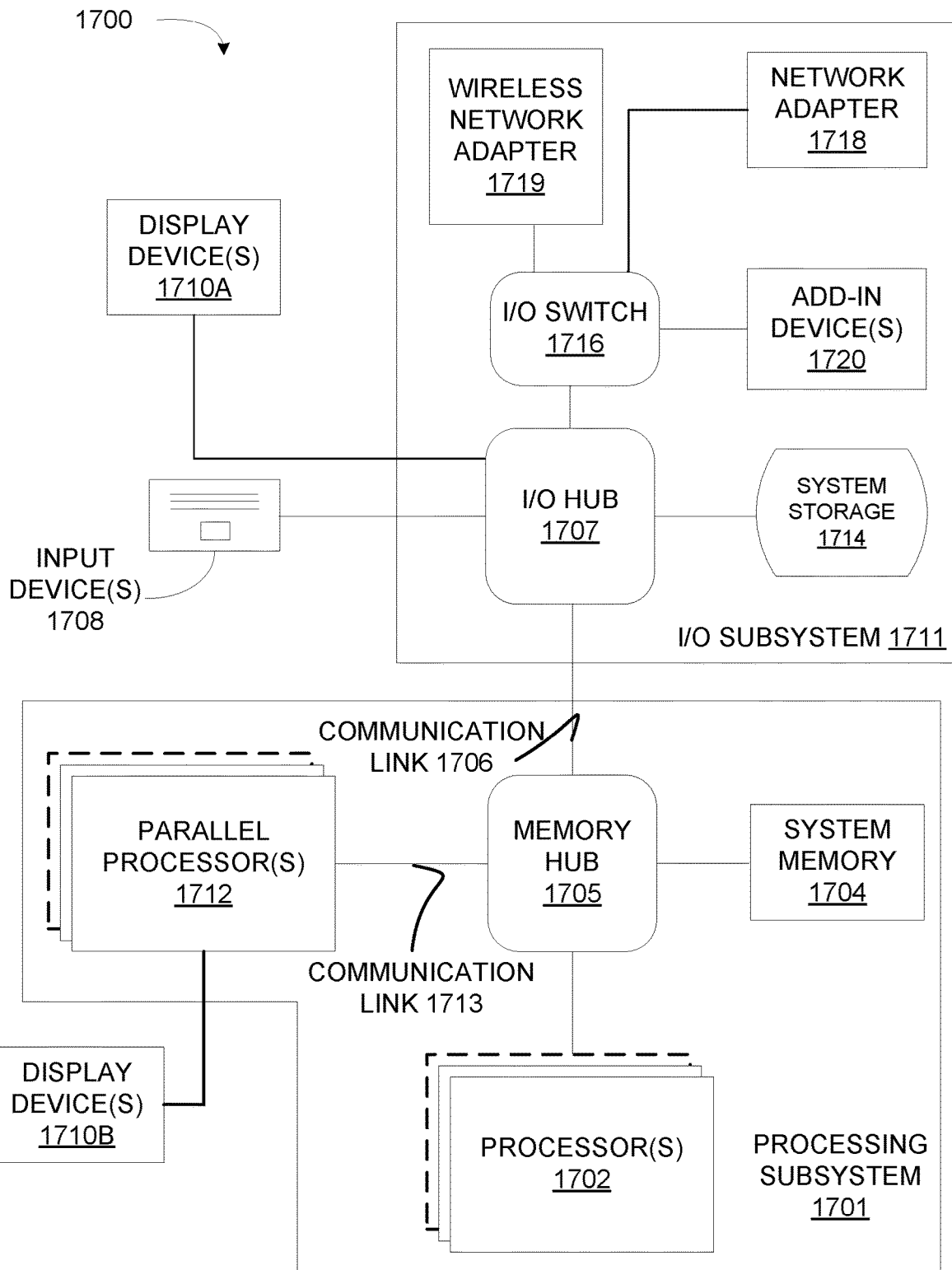
FIG. 17 illustrates a computing system, according to at least one embodiment.

FIG. 17 illustrates a computing system 1700, according to at least one embodiment; In at least one embodiment, computing system 1700 includes a processing subsystem 1701 having one or more processor(s) 1702 and a system memory 1704 communicating via an interconnection path that may include a memory hub 1705. In at least one embodiment, memory hub 1705 may be a separate component within a chipset component or may be integrated within one or more processor(s) 1702. In at least one embodiment, memory hub 1705 couples with an I/O subsystem 1711 via a communication link 1706. In at least one embodiment, I/O subsystem 1711 includes an I/O hub 1707 that can enable computing system 1700 to receive input from one or more input device(s) 1708. In at least one embodiment, I/O hub 1707 can enable a display controller, which may be included in one or more processor(s) 1702, to provide outputs to one or more display device(s) 1710A. In at least one embodiment, one or more display device(s) 1710A coupled with I/O hub 1707 can include a local, internal, or embedded display device.

In at least one embodiment, processing subsystem 1701 includes one or more parallel processor(s) 1712 coupled to memory hub 1705 via a bus or other communication link 1713. In at least one embodiment, communication link 1713 may be one of any number of standards based communication link technologies or protocols, such as, but not limited to PCIe, or may be a vendor specific communications interface or communications fabric. In at least one embodiment, one or more parallel processor(s) 1712 form a computationally focused parallel or vector processing system that can include a large number of processing cores and/or processing clusters, such as a many integrated core processor. In at least one embodiment, one or more parallel processor(s) 1712 form a graphics processing subsystem that can output pixels to one of one or more display device(s) 1710A coupled via I/O Hub 1707. In at least one embodiment, one or more parallel processor(s) 1712 can also include a display controller and display interface (not shown) to enable a direct connection to one or more display device(s) 1710B.

In at least one embodiment, a system storage unit 1714 can connect to I/O hub 1707 to provide a storage mechanism for computing system 1700. In at least one embodiment, an I/O switch 1716 can be used to provide an interface mechanism to enable connections between I/O hub 1707 and other components, such as a network adapter 1718 and/or wireless network adapter 1719 that may be integrated into a platform, and various other devices that can be added via one or more add-in device(s) 1720. In at least one embodiment, network adapter 1718 can be an Ethernet adapter or another wired network adapter. In at least one embodiment, wireless network adapter 1719 can include one or more of a Wi-Fi, Bluetooth, NFC, or other network device that includes one or more wireless radios.

In at least one embodiment, computing system 1700 can include other components not explicitly shown, including USB or other port connections, optical storage drives, video capture devices, and the like, that may also be connected to I/O hub 1707. In at least one embodiment, communication paths interconnecting various components in FIG. 17 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 1712 incorporate circuitry optimized for graphics and video processing, including, for example, video output circuitry, and constitutes a graphics processing unit ("GPU"). In at least one embodiment, one or more parallel processor(s) 1712 incorporate circuitry optimized for general purpose processing. In at least embodiment, components of computing system 1700 may be integrated with one or more other system elements on a single integrated circuit. For example, in at least one embodiment, one or more parallel processor(s) 1712, memory hub 1705, processor(s) 1702, and I/O hub 1707 can be integrated into an SoC integrated circuit. In at least one embodiment, components of computing system 1700 can be integrated into a single package to form a system in package ("SIP") configuration. In at least one embodiment, at least a portion of the components of computing system 1700 can be integrated into a multi-chip module ("MCM"), which can be interconnected with other multi-chip modules into a modular computing system. In at least one embodiment, I/O subsystem 1711 and display devices 1710B are omitted from computing system 1700.

Processing Systems

The following FIGS. set forth, without limitation, exemplary processing systems that can be used to implement at least one embodiment.

Figure 18:
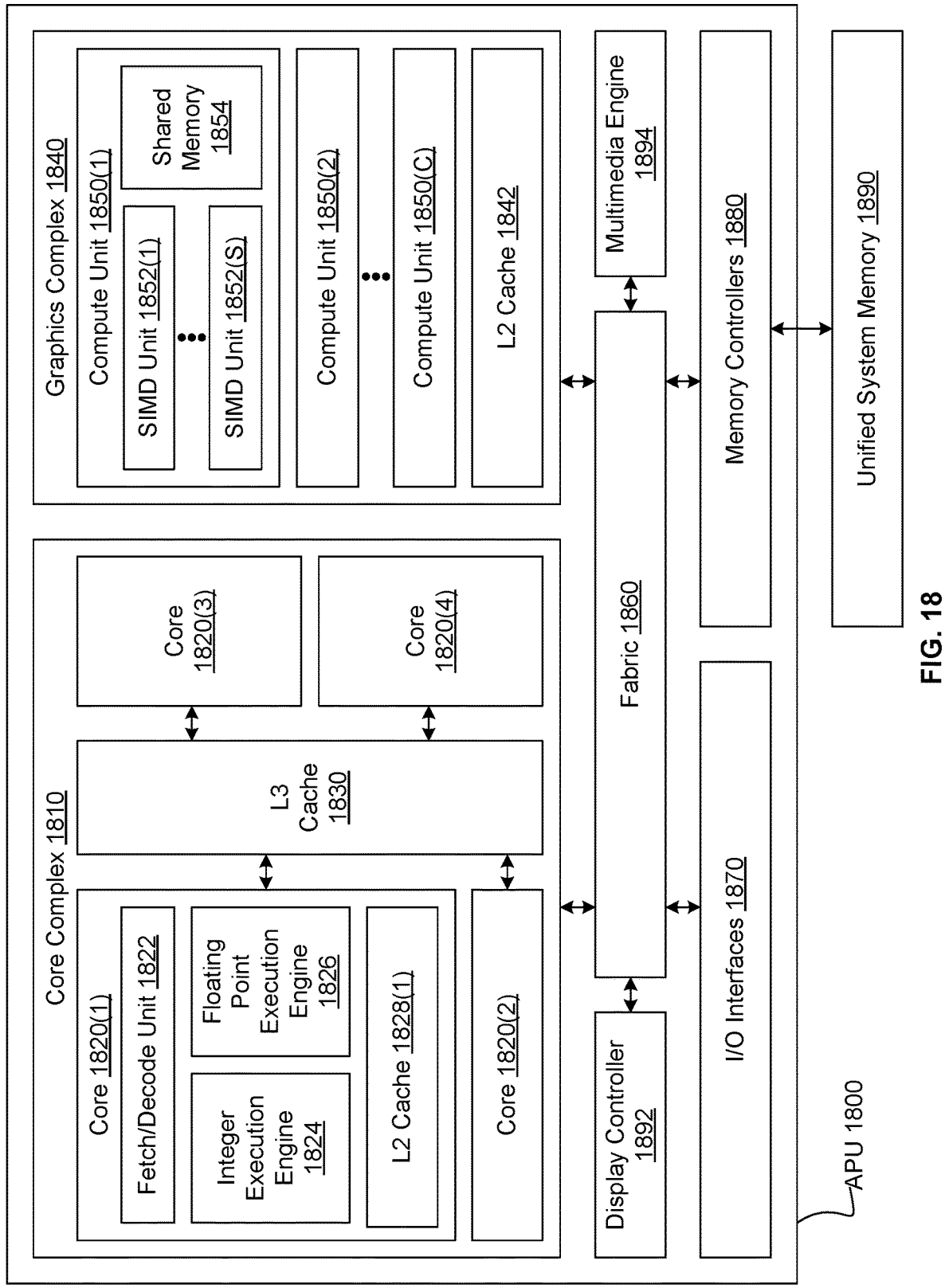
FIG. 18 illustrates an APU, in accordance with at least one embodiment.

FIG. 18 illustrates an accelerated processing unit ("APU") 1800, in accordance with at least one embodiment. In at least one embodiment, APU 1800 is developed by AMD Corporation of Santa Clara, Calif. In at least one embodiment, APU 1800 can be configured to execute an application program, such as a CUDA program. In at least one embodiment, APU 1800 includes, without limitation, a core complex 1810, a graphics complex 1840, fabric 1860, I/O interfaces 1870, memory controllers 1880, a display controller 1892, and a multimedia engine 1894. In at least one embodiment, APU 1800 may include, without limitation, any number of core complexes 1810, any number of graphics complexes 1850, any number of display controllers 1892, and any number of multimedia engines 1894 in any combination. For explanatory purposes, multiple instances of like objects are denoted herein with reference numbers identifying the object and parenthetical numbers identifying the instance where needed.

In at least one embodiment, core complex 1810 is a CPU, graphics complex 1840 is a GPU, and APU 1800 is a processing unit that integrates, without limitation, 1810 and 1840 onto a single chip. In at least one embodiment, some tasks may be assigned to core complex 1810 and other tasks may be assigned to graphics complex 1840. In at least one embodiment, core complex 1810 is configured to execute main control software associated with APU 1800, such as an operating system. In at least one embodiment, core complex 1810 is the master processor of APU 1800, controlling and coordinating operations of other processors. In at least one embodiment, core complex 1810 issues commands that control the operation of graphics complex 1840. In at least one embodiment, core complex 1810 can be configured to execute host executable code derived from CUDA source code, and graphics complex 1840 can be configured to execute device executable code derived from CUDA source code.

In at least one embodiment, core complex 1810 includes, without limitation, cores 1820(1)-1820(4) and an L3 cache 1830. In at least one embodiment, core complex 1810 may include, without limitation, any number of cores 1820 and any number and type of caches in any combination. In at least one embodiment, cores 1820 are configured to execute instructions of a particular instruction set architecture ("ISA"). In at least one embodiment, each core 1820 is a CPU core.

In at least one embodiment, each core 1820 includes, without limitation, a fetch/decode unit 1822, an integer execution engine 1824, a floating point execution engine 1826, and an L2 cache 1828. In at least one embodiment, fetch/decode unit 1822 fetches instructions, decodes such instructions, generates micro-operations, and dispatches separate micro-instructions to integer execution engine 1824 and floating point execution engine 1826. In at least one embodiment, fetch/decode unit 1822 can concurrently dispatch one micro-instruction to integer execution engine 1824 and another micro-instruction to floating point execution engine 1826. In at least one embodiment, integer execution engine 1824 executes, without limitation, integer and memory operations. In at least one embodiment, floating point engine 1826 executes, without limitation, floating point and vector operations. In at least one embodiment, fetch-decode unit 1822 dispatches micro-instructions to a single execution engine that replaces both integer execution engine 1824 and floating point execution engine 1826.

In at least one embodiment, each core 1820(*i*), where i is an integer representing a particular instance of core 1820, may access L2 cache 1828(*i*) included in core 1820(*i*). In at least one embodiment, each core 1820 included in core complex 1810(*j*), where j is an integer representing a particular instance of core complex 1810, is connected to other cores 1820 included in core complex 1810(*j*) via L3 cache 1830(*j*) included in core complex 1810(*j*). In at least one embodiment, cores 1820 included in core complex 1810(*j*), where j is an integer representing a particular instance of core complex 1810, can access all of L3 cache 1830(*j*) included in core complex 1810(*j*). In at least one embodiment, L3 cache 1830 may include, without limitation, any number of slices.

In at least one embodiment, graphics complex 1840 can be configured to perform compute operations in a highly-parallel fashion. In at least one embodiment, graphics complex 1840 is configured to execute graphics pipeline operations such as draw commands, pixel operations, geometric computations, and other operations associated with rendering an image to a display. In at least one embodiment, graphics complex 1840 is configured to execute operations unrelated to graphics. In at least one embodiment, graphics complex 1840 is configured to execute both operations related to graphics and operations unrelated to graphics.

In at least one embodiment, graphics complex 1840 includes, without limitation, any number of compute units 1850 and an L2 cache 1842. In at least one embodiment, compute units 1850 share L2 cache 1842. In at least one embodiment, L2 cache 1842 is partitioned. In at least one embodiment, graphics complex 1840 includes, without limitation, any number of compute units 1850 and any number (including zero) and type of caches. In at least one embodiment, graphics complex 1840 includes, without limitation, any amount of dedicated graphics hardware.

In at least one embodiment, each compute unit 1850 includes, without limitation, any number of SIMD units 1852 and a shared memory 1854. In at least one embodiment, each SIMD unit 1852 implements a SIMD architecture and is configured to perform operations in parallel. In at least one embodiment, each compute unit 1850 may execute any number of thread blocks, but each thread block executes on a single compute unit 1850. In at least one embodiment, a thread block includes, without limitation, any number of threads of execution. In at least one embodiment, a workgroup is a thread block. In at least one embodiment, each SIMD unit 1852 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 1854.

In at least one embodiment, fabric 1860 is a system interconnect that facilitates data and control transmissions across core complex 1810, graphics complex 1840, I/O interfaces 1870, memory controllers 1880, display controller 1892, and multimedia engine 1894. In at least one embodiment, APU 1800 may include, without limitation, any amount and type of system interconnect in addition to or instead of fabric 1860 that facilitates data and control transmissions across any number and type of directly or indirectly linked components that may be internal or external to APU 1800. In at least one embodiment, I/O interfaces 1870 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 1870 In at least one embodiment, peripheral devices that are coupled to I/O interfaces 1870 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 240 includes, without limitation, any amount and type of circuitry that is related to multimedia, such as a video decoder, a video encoder, an image signal processor, etc. In at least one embodiment, memory controllers 1880 facilitate data transfers between APU 1800 and a unified system memory 1890. In at least one embodiment, core complex 1810 and graphics complex 1840 share unified system memory 1890.

In at least one embodiment, APU 1800 implements a memory subsystem that includes, without limitation, any amount and type of memory controllers 1880 and memory devices (e.g., shared memory 1854) that may be dedicated to one component or shared among multiple components. In at least one embodiment, APU 1800 implements a cache subsystem that includes, without limitation, one or more cache memories (e.g., L2 caches 1928, L3 cache 1830, and L2 cache 1842) that may each be private to or shared between any number of components (e.g., cores 1820, core complex 1810, SIMD units 1852, compute units 1850, and graphics complex 1840).

Figure 19:
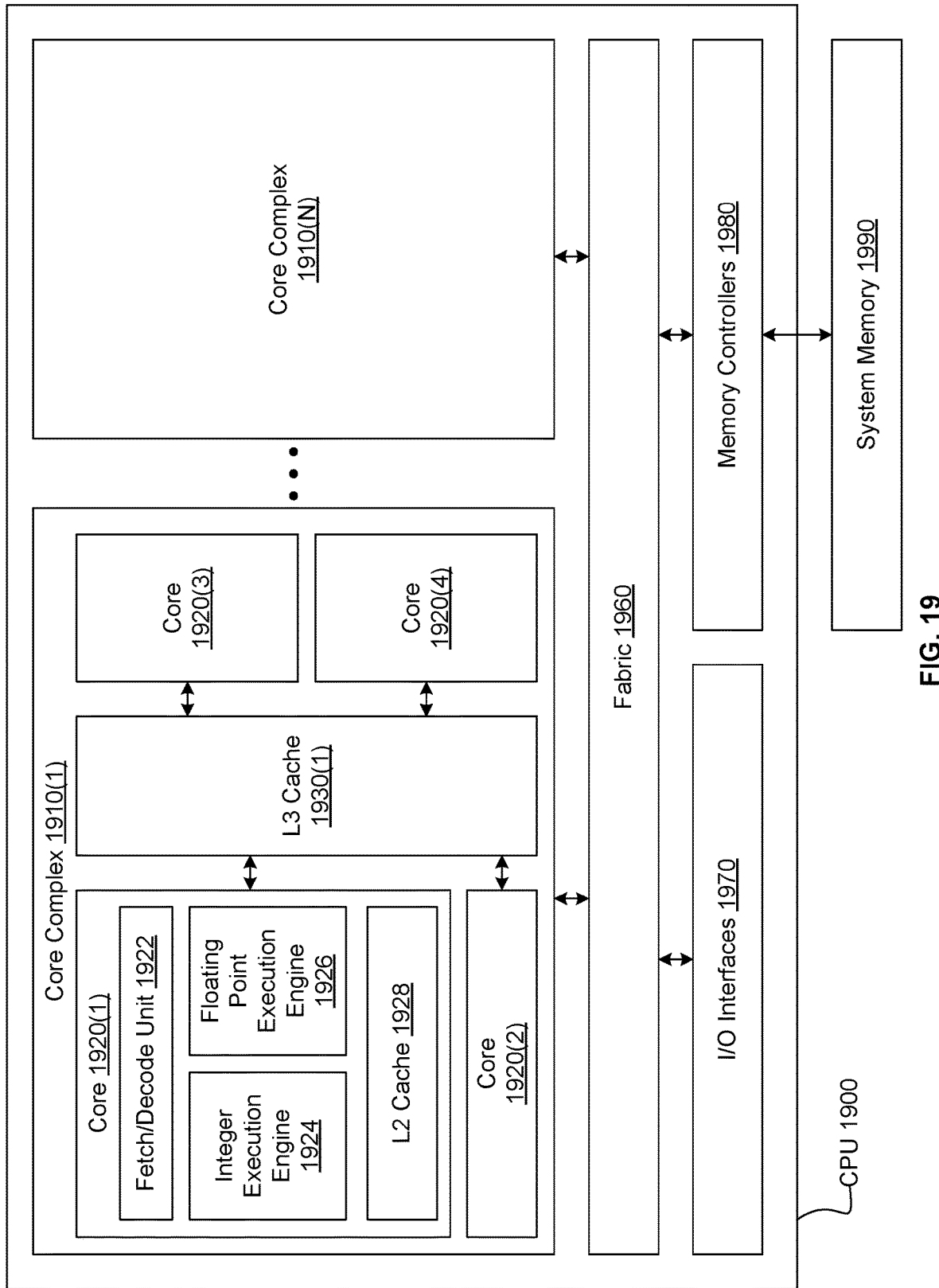
FIG. 19 illustrates a CPU, in accordance with at least one embodiment.

FIG. 19 illustrates a CPU 1900, in accordance with at least one embodiment. In at least one embodiment, CPU 1900 is developed by AMD Corporation of Santa Clara, Calif. In at least one embodiment, CPU 1900 can be configured to execute an application program. In at least one embodiment, CPU 1900 is configured to execute main control software, such as an operating system. In at least one embodiment, CPU 1900 issues commands that control the operation of an external GPU (not shown). In at least one embodiment, CPU 1900 can be configured to execute host executable code derived from CUDA source code, and an external GPU can be configured to execute device executable code derived from such CUDA source code. In at least one embodiment, CPU 1900 includes, without limitation, any number of core complexes 1910, fabric 1960, I/O interfaces 1970, and memory controllers 1980.

In at least one embodiment, core complex 1910 includes, without limitation, cores 1920(1)-1920(4) and an L3 cache 1930. In at least one embodiment, core complex 1910 may include, without limitation, any number of cores 1920 and any number and type of caches in any combination. In at least one embodiment, cores 1920 are configured to execute instructions of a particular ISA. In at least one embodiment, each core 1920 is a CPU core.

In at least one embodiment, each core 1920 includes, without limitation, a fetch/decode unit 1922, an integer execution engine 1924, a floating point execution engine 1926, and an L2 cache 1928. In at least one embodiment, fetch/decode unit 1922 fetches instructions, decodes such instructions, generates micro-operations, and dispatches separate micro-instructions to integer execution engine 1924 and floating point execution engine 1926. In at least one embodiment, fetch/decode unit 1922 can concurrently dispatch one micro-instruction to integer execution engine 1924 and another micro-instruction to floating point execution engine 1926. In at least one embodiment, integer execution engine 1924 executes, without limitation, integer and memory operations. In at least one embodiment, floating point engine 1926 executes, without limitation, floating point and vector operations. In at least one embodiment, fetch-decode unit 1922 dispatches micro-instructions to a single execution engine that replaces both integer execution engine 1924 and floating point execution engine 1926.

In at least one embodiment, each core 1920(*i*), where i is an integer representing a particular instance of core 1920, may access L2 cache 1928(*i*) included in core 1920(*i*). In at least one embodiment, each core 1920 included in core complex 1910(*j*), where j is an integer representing a particular instance of core complex 1910, is connected to other cores 1920 in core complex 1910(*j*) via L3 cache 1930(*j*) included in core complex 1910(*j*). In at least one embodiment, cores 1920 included in core complex 1910(*j*), where j is an integer representing a particular instance of core complex 1910, can access all of L3 cache 1930(*j*) included in core complex 1910(*j*). In at least one embodiment, L3 cache 1930 may include, without limitation, any number of slices.

In at least one embodiment, fabric 1960 is a system interconnect that facilitates data and control transmissions across core complexes 1910(1)-1910(N) (where N is an integer greater than zero), I/O interfaces 1970, and memory controllers 1980. In at least one embodiment, CPU 1900 may include, without limitation, any amount and type of system interconnect in addition to or instead of fabric 1960 that facilitates data and control transmissions across any number and type of directly or indirectly linked components that may be internal or external to CPU 1900. In at least one embodiment, I/O interfaces 1970 are representative of any number and type of I/O interfaces (e.g., PCI, PCI-X, PCIe, GBE, USB, etc.). In at least one embodiment, various types of peripheral devices are coupled to I/O interfaces 1970 In at least one embodiment, peripheral devices that are coupled to I/O interfaces 1970 may include, without limitation, displays, keyboards, mice, printers, scanners, joysticks or other types of game controllers, media recording devices, external storage devices, network interface cards, and so forth.

In at least one embodiment, memory controllers 1980 facilitate data transfers between CPU 1900 and a system memory 1990. In at least one embodiment, core complex 1910 and graphics complex 1940 share system memory 1990. In at least one embodiment, CPU 1900 implements a memory subsystem that includes, without limitation, any amount and type of memory controllers 1980 and memory devices that may be dedicated to one component or shared among multiple components. In at least one embodiment, CPU 1900 implements a cache subsystem that includes, without limitation, one or more cache memories (e.g., L2 caches 1928 and L3 caches 1930) that may each be private to or shared between any number of components (e.g., cores 1920 and core complexes 1910).

Figure 20:
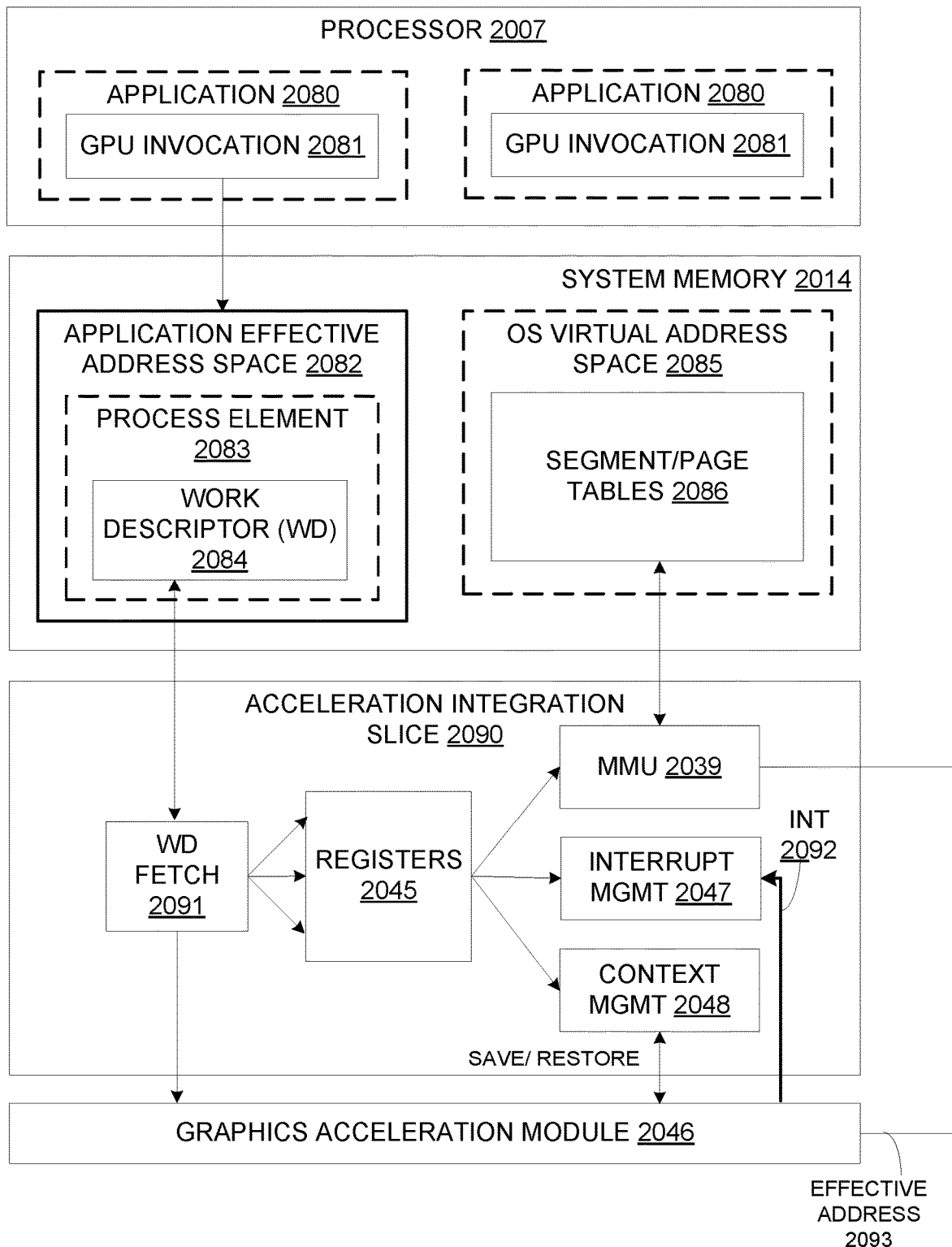
FIG. 20 illustrates an exemplary accelerator integration slice, in accordance with at least one embodiment.

FIG. 20 illustrates an exemplary accelerator integration slice 2090, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 2082 within system memory 2014 stores process elements 2083. In one embodiment, process elements 2083 are stored in response to GPU invocations 2081 from applications 2080 executed on processor 2007. A process element 2083 contains process state for corresponding application 2080. A work descriptor ("WD") 2084 contained in process element 2083 can be a single job requested by an application or may contain a pointer to a queue of jobs. In at least one embodiment, WD 2084 is a pointer to a job request queue in application effective address space 2082.

Graphics acceleration module 2046 and/or individual graphics processing engines can be shared by all or a subset of processes in a system. In at least one embodiment, an infrastructure for setting up process state and sending WD 2084 to graphics acceleration module 2046 to start a job in a virtualized environment may be included.

In at least one embodiment, a dedicated-process programming model is implementation-specific. In this model, a single process owns graphics acceleration module 2046 or an individual graphics processing engine. Because graphics acceleration module 2046 is owned by a single process, a hypervisor initializes an accelerator integration circuit for an owning partition and an operating system initializes accelerator integration circuit for an owning process when graphics acceleration module 2046 is assigned.

In operation, a WD fetch unit 2091 in accelerator integration slice 2090 fetches next WD 2084 which includes an indication of work to be done by one or more graphics processing engines of graphics acceleration module 2046. Data from WD 2084 may be stored in registers 2045 and used by a memory management unit ("MMU") 2039, interrupt management circuit 2047 and/or context management circuit 2048 as illustrated. For example, one embodiment of MMU 2039 includes segment/page walk circuitry for accessing segment/page tables 2086 within OS virtual address space 2085. Interrupt management circuit 2047 may process interrupt events ("INT") 2092 received from graphics acceleration module 2046. When performing graphics operations, an effective address 2093 generated by a graphics processing engine is translated to a real address by MMU 2039.

In one embodiment, a same set of registers 2045 are duplicated for each graphics processing engine and/or graphics acceleration module 2046 and may be initialized by a hypervisor or operating system. Each of these duplicated registers may be included in accelerator integration slice 2090. Exemplary registers that may be initialized by a hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2084 is specific to a particular graphics acceleration module 2046 and/or a particular graphics processing engine. It contains all information required by a graphics processing engine to do work or it can be a pointer to a memory location where an application has set up a command queue of work to be completed.

Figure 21A:
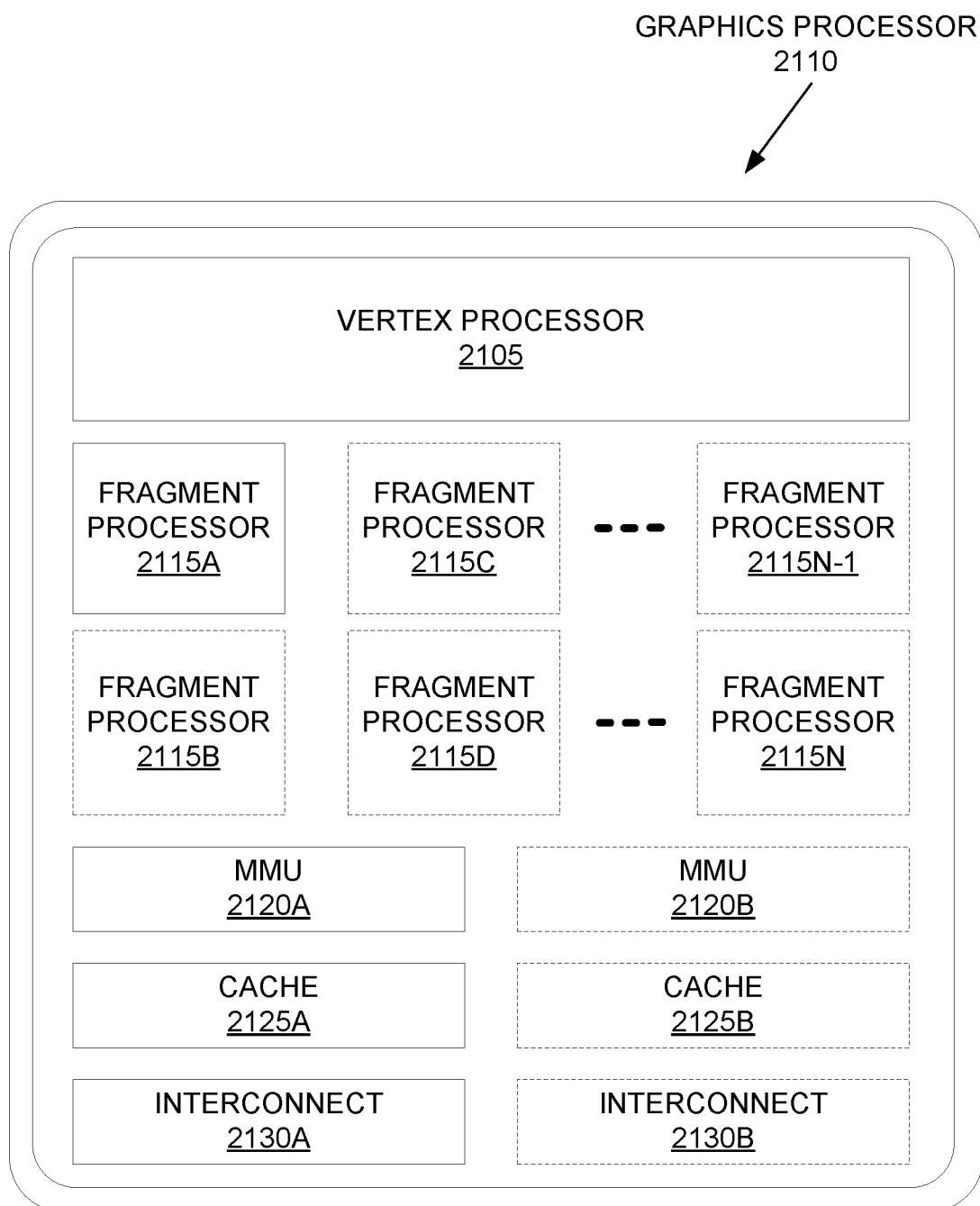
FIGS. 21A and 21B illustrate exemplary graphics processors, in accordance with at least one embodiment.
Figure 21B:
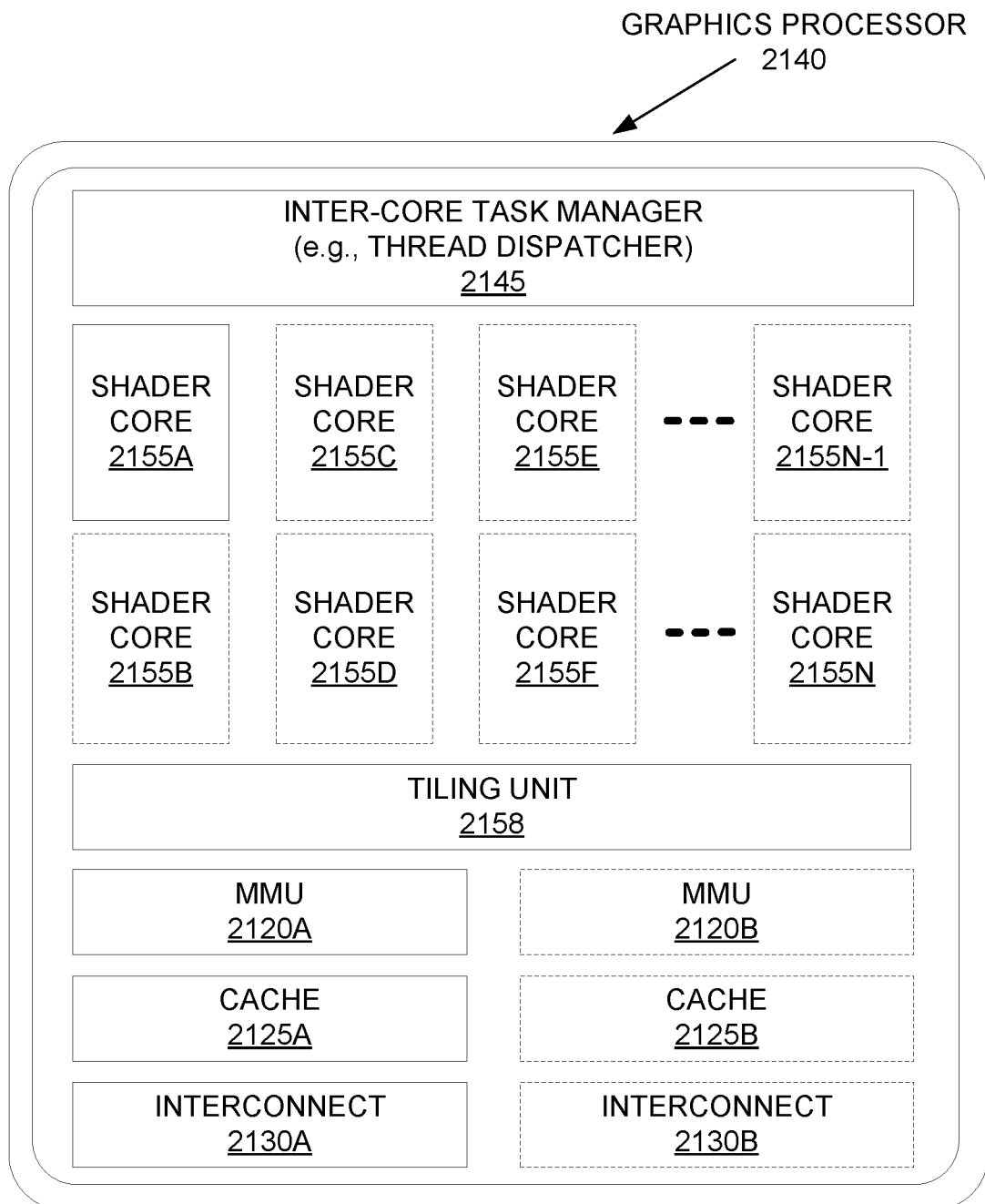

FIGS. 21A and 21B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 21A illustrates an exemplary graphics processor 2110 of an SoC integrated circuit that may be fabricated using one or more IP cores, in accordance with at least one embodiment. FIG. 21B illustrates an additional exemplary graphics processor 2140 of an SoC integrated circuit that may be fabricated using one or more IP cores, in accordance with at least one embodiment. In at least one embodiment, graphics processor 2110 of FIG. 21A is a low power graphics processor core. In at least one embodiment, graphics processor 2140 of FIG. 21B is a higher performance graphics processor core. In at least one embodiment, each of graphics processors 2110, 2140 can be variants of graphics processor 1610 of FIG. 16.

In at least one embodiment, graphics processor 2110 includes a vertex processor 2105 and one or more fragment processor(s) 2115A-2115N (e.g., 2115A, 2115B, 2115C, 2115D, through 2115N-1, and 2115N). In at least one embodiment, graphics processor 2110 can execute different shader programs via separate logic, such that vertex processor 2105 is optimized to execute operations for vertex shader programs, while one or more fragment processor(s) 2115A-2115N execute fragment (e.g., pixel) shading operations for fragment or pixel shader programs. In at least one embodiment, vertex processor 2105 performs a vertex processing stage of a 3D graphics pipeline and generates primitives and vertex data. In at least one embodiment, fragment processor(s) 2115A-2115N use primitive and vertex data generated by vertex processor 2105 to produce a framebuffer that is displayed on a display device. In at least one embodiment, fragment processor(s) 2115A-2115N are optimized to execute fragment shader programs as provided for in an OpenGL API, which may be used to perform similar operations as a pixel shader program as provided for in a Direct 3D API.

In at least one embodiment, graphics processor 2110 additionally includes one or more MMU(s) 2120A-2120B, cache(s) 2125A-2125B, and circuit interconnect(s) 2130A-2130B. In at least one embodiment, one or more MMU(s) 2120A-2120B provide for virtual to physical address mapping for graphics processor 2110, including for vertex processor 2105 and/or fragment processor(s) 2115A-2115N, which may reference vertex or image/texture data stored in memory, in addition to vertex or image/texture data stored in one or more cache(s) 2125A-2125B. In at least one embodiment, one or more MMU(s) 2120A-2120B may be synchronized with other MMUs within a system, including one or more MMUs associated with one or more application processor(s) 1605, image processors 1615, and/or video processors 1620 of FIG. 16, such that each processor 1605-1620 can participate in a shared or unified virtual memory system. In at least one embodiment, one or more circuit interconnect(s) 2130A-2130B enable graphics processor 2110 to interface with other IP cores within an SoC, either via an internal bus of the SoC or via a direct connection.

In at least one embodiment, graphics processor 2140 includes one or more MMU(s) 2120A-2120B, caches 2125A-2125B, and circuit interconnects 2130A-2130B of graphics processor 2110 of FIG. 21A. In at least one embodiment, graphics processor 2140 includes one or more shader core(s) 2155A-2155N (e.g., 2155A, 2155B, 2155C, 2155D, 2155E, 2155F, through 2155N-1, and 2155N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2140 includes an inter-core task manager 2145, which acts as a thread dispatcher to dispatch execution threads to one or more shader cores 2155A-2155N and a tiling unit 2158 to accelerate tiling operations for tile-based rendering, in which rendering operations for a scene are subdivided in image space, for example to exploit local spatial coherence within a scene or to optimize use of internal caches.

Figure 22A:
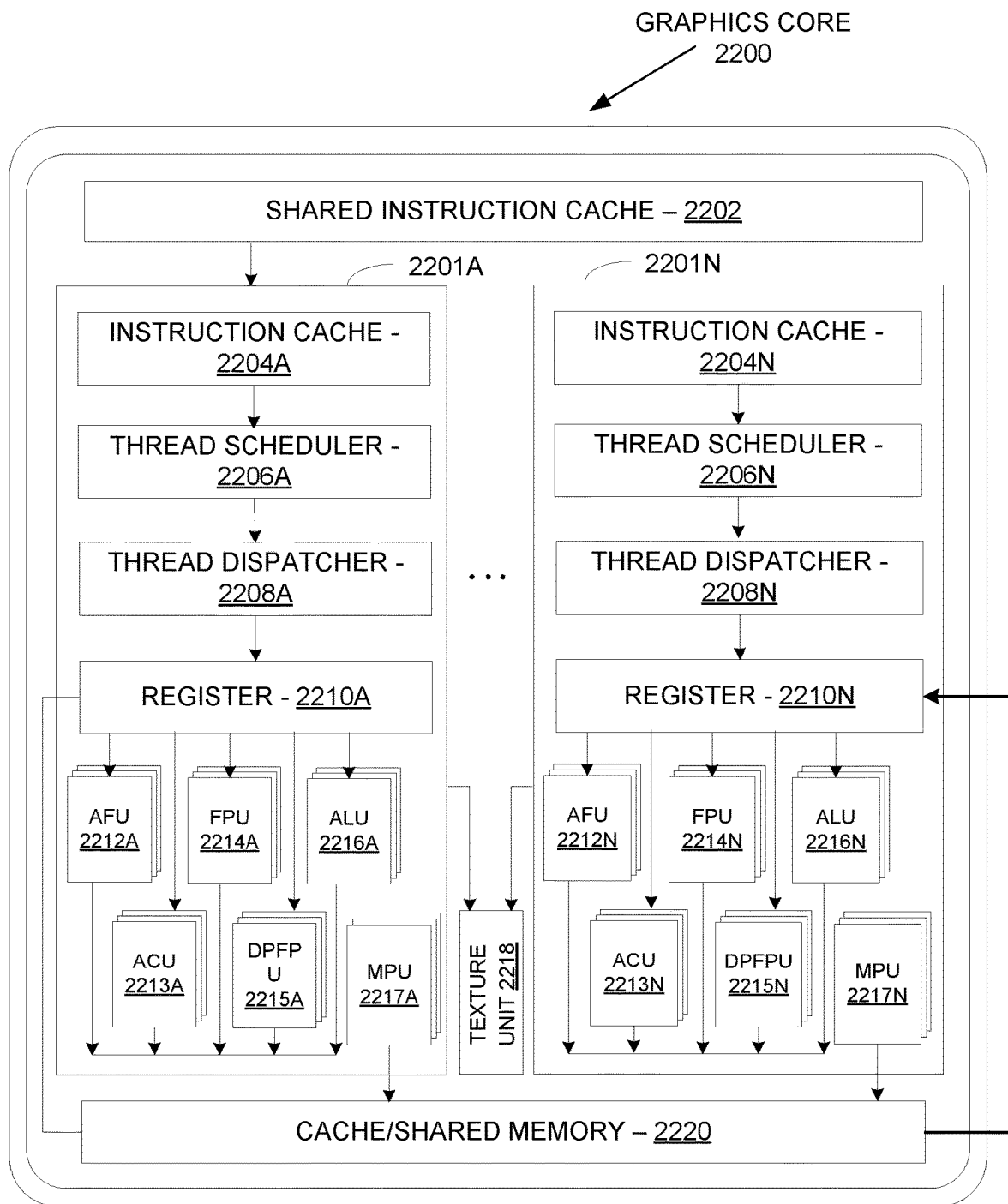
FIG. 22A illustrates a graphics core, in accordance with at least one embodiment.

FIG. 22A illustrates a graphics core 2200, in accordance with at least one embodiment. In at least one embodiment, graphics core 2200 may be included within graphics processor 1610 of FIG. 16. In at least one embodiment, graphics core 2200 may be a unified shader core 2155A-2155N as in FIG. 21B. In at least one embodiment, graphics core 2200 includes a shared instruction cache 2202, a texture unit 2218, and a cache/shared memory 2220 that are common to execution resources within graphics core 2200. In at least one embodiment, graphics core 2200 can include multiple slices 2201A-2201N or partition for each core, and a graphics processor can include multiple instances of graphics core 2200. Slices 2201A-2201N can include support logic including a local instruction cache 2204A-2204N, a thread scheduler 2206A-2206N, a thread dispatcher 2208A-2208N, and a set of registers 2210A-2210N. In at least one embodiment, slices 2201A-2201N can include a set of additional function units ("AFUs") 2212A-2212N, floating-point units ("FPUs") 2214A-2214N, integer arithmetic logic units ("ALUs") 2216-2216N, address computational units ("ACUs") 2213A-2213N, double-precision floating-point units ("DPFPUs") 2215A-2215N, and matrix processing units ("MPUs") 2217A-2217N.

In at least one embodiment, FPUs 2214A-2214N can perform single-precision (32-bit) and half-precision (16-bit) floating point operations, while DPFPUs 2215A-2215N perform double precision (64-bit) floating point operations. In at least one embodiment, ALUs 2216A-2216N can perform variable precision integer operations at 8-bit, 16-bit, and 32-bit precision, and can be configured for mixed precision operations. In at least one embodiment, MPUs 2217A-2217N can also be configured for mixed precision matrix operations, including half-precision floating point and 8-bit integer operations. In at least one embodiment, MPUs 2217-2217N can perform a variety of matrix operations to accelerate CUDA programs, including enabling support for accelerated general matrix to matrix multiplication ("GEMM"). In at least one embodiment, AFUs 2212A-2212N can perform additional logic operations not supported by floating-point or integer units, including trigonometric operations (e.g., Sine, Cosine, etc.).

Figure 22B:
FIG. 22B illustrates a GPGPU, in accordance with at least one embodiment.

FIG. 22B illustrates a general-purpose graphics processing unit ("GPGPU") 2230, in accordance with at least one embodiment. In at least one embodiment, GPGPU 2230 is highly-parallel and suitable for deployment on a multi-chip module. In at least one embodiment, GPGPU 2230 can be configured to enable highly-parallel compute operations to be performed by an array of GPUs. In at least one embodiment, GPGPU 2230 can be linked directly to other instances of GPGPU 2230 to create a multi-GPU cluster to improve execution time for CUDA programs. In at least one embodiment, GPGPU 2230 includes a host interface 2232 to enable a connection with a host processor. In at least one embodiment, host interface 2232 is a PCIe interface. In at least one embodiment, host interface 2232 can be a vendor specific communications interface or communications fabric. In at least one embodiment, GPGPU 2230 receives commands from a host processor and uses a global scheduler 2234 to distribute execution threads associated with those commands to a set of compute clusters 2236A-2236H. In at least one embodiment, compute clusters 2236A-2236H share a cache memory 2238. In at least one embodiment, cache memory 2238 can serve as a higher-level cache for cache memories within compute clusters 2236A-2236H.

In at least one embodiment, GPGPU 2230 includes memory 2244A-2244B coupled with compute clusters 2236A-2236H via a set of memory controllers 2242A-2242B. In at least one embodiment, memory 2244A-2244B can include various types of memory devices including DRAM or graphics random access memory, such as synchronous graphics random access memory ("SGRAM"), including graphics double data rate ("GDDR") memory.

In at least one embodiment, compute clusters 2236A-2236H each include a set of graphics cores, such as graphics core 2200 of FIG. 22A, which can include multiple types of integer and floating point logic units that can perform computational operations at a range of precisions including suited for computations associated with CUDA programs. For example, in at least one embodiment, at least a subset of floating point units in each of compute clusters 2236A-2236H can be configured to perform 16-bit or 32-bit floating point operations, while a different subset of floating point units can be configured to perform 64-bit floating point operations.

In at least one embodiment, multiple instances of GPGPU 2230 can be configured to operate as a compute cluster. Compute clusters 2236A-2236H may implement any technically feasible communication techniques for synchronization and data exchange. In at least one embodiment, multiple instances of GPGPU 2230 communicate over host interface 2232. In at least one embodiment, GPGPU 2230 includes an I/O hub 2239 that couples GPGPU 2230 with a GPU link 2240 that enables a direct connection to other instances of GPGPU 2230. In at least one embodiment, GPU link 2240 is coupled to a dedicated GPU-to-GPU bridge that enables communication and synchronization between multiple instances of GPGPU 2230. In at least one embodiment GPU link 2240 couples with a high speed interconnect to transmit and receive data to other GPGPUs 2230 or parallel processors. In at least one embodiment, multiple instances of GPGPU 2230 are located in separate data processing systems and communicate via a network device that is accessible via host interface 2232. In at least one embodiment GPU link 2240 can be configured to enable a connection to a host processor in addition to or as an alternative to host interface 2232. In at least one embodiment, GPGPU 2230 can be configured to execute a CUDA program.

Figure 23A:
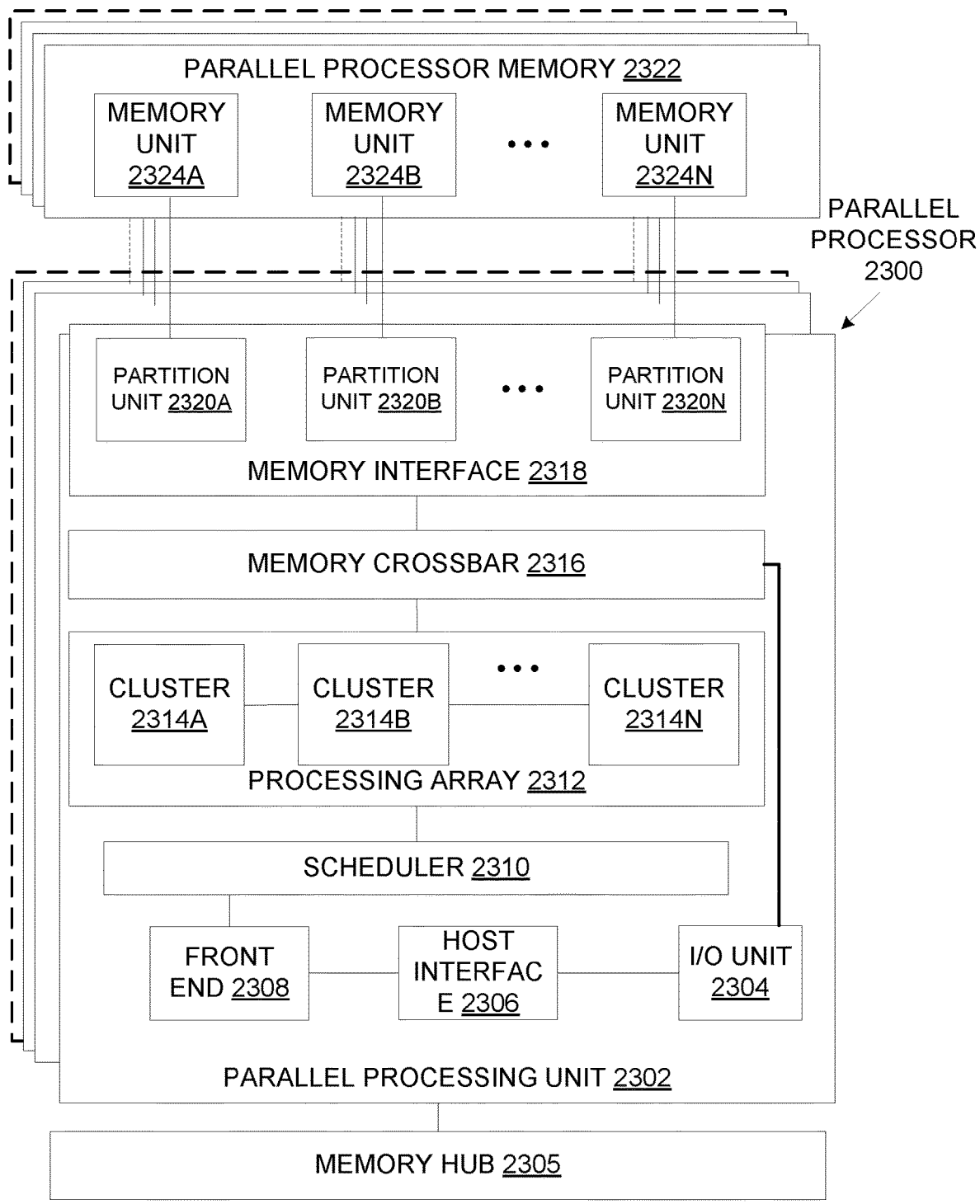
FIG. 23A illustrates a parallel processor, in accordance with at least one embodiment.

FIG. 23A illustrates a parallel processor 2300, in accordance with at least one embodiment. In at least one embodiment, various components of parallel processor 2300 may be implemented using one or more integrated circuit devices, such as programmable processors, application specific integrated circuits ("ASICs"), or FPGAs.

In at least one embodiment, parallel processor 2300 includes a parallel processing unit 2302. In at least one embodiment, parallel processing unit 2302 includes an I/O unit 2304 that enables communication with other devices, including other instances of parallel processing unit 2302. In at least one embodiment, I/O unit 2304 may be directly connected to other devices. In at least one embodiment, I/O unit 2304 connects with other devices via use of a hub or switch interface, such as memory hub 2305. In at least one embodiment, connections between memory hub 2305 and I/O unit 2304 form a communication link. In at least one embodiment, I/O unit 2304 connects with a host interface 2306 and a memory crossbar 2316, where host interface 2306 receives commands directed to performing processing operations and memory crossbar 2316 receives commands directed to performing memory operations.

In at least one embodiment, when host interface 2306 receives a command buffer via I/O unit 2304, host interface 2306 can direct work operations to perform those commands to a front end 2308. In at least one embodiment, front end 2308 couples with a scheduler 2310, which is configured to distribute commands or other work items to a processing array 2312. In at least one embodiment, scheduler 2310 ensures that processing array 2312 is properly configured and in a valid state before tasks are distributed to processing array 2312. In at least one embodiment, scheduler 2310 is implemented via firmware logic executing on a microcontroller. In at least one embodiment, microcontroller implemented scheduler 2310 is configurable to perform complex scheduling and work distribution operations at coarse and fine granularity, enabling rapid preemption and context switching of threads executing on processing array 2312. In at least one embodiment, host software can prove workloads for scheduling on processing array 2312 via one of multiple graphics processing doorbells. In at least one embodiment, workloads can then be automatically distributed across processing array 2312 by scheduler 2310 logic within a microcontroller including scheduler 2310.

In at least one embodiment, processing array 2312 can include up to "N" clusters (e.g., cluster 2314A, cluster 2314B, through cluster 2314N). In at least one embodiment, each cluster 2314A-2314N of processing array 2312 can execute a large number of concurrent threads. In at least one embodiment, scheduler 2310 can allocate work to clusters 2314A-2314N of processing array 2312 using various scheduling and/or work distribution algorithms, which may vary depending on the workload arising for each type of program or computation. In at least one embodiment, scheduling can be handled dynamically by scheduler 2310, or can be assisted in part by compiler logic during compilation of program logic configured for execution by processing array 2312. In at least one embodiment, different clusters 2314A-2314N of processing array 2312 can be allocated for processing different types of programs or for performing different types of computations.

In at least one embodiment, processing array 2312 can be configured to perform various types of parallel processing operations. In at least one embodiment, processing array 2312 is configured to perform general-purpose parallel compute operations. For example, in at least one embodiment, processing array 2312 can include logic to execute processing tasks including filtering of video and/or audio data, performing modeling operations, including physics operations, and performing data transformations.

In at least one embodiment, processing array 2312 is configured to perform parallel graphics processing operations. In at least one embodiment, processing array 2312 can include additional logic to support execution of such graphics processing operations, including, but not limited to texture sampling logic to perform texture operations, as well as tessellation logic and other vertex processing logic. In at least one embodiment, processing array 2312 can be configured to execute graphics processing related shader programs such as, but not limited to vertex shaders, tessellation shaders, geometry shaders, and pixel shaders. In at least one embodiment, parallel processing unit 2302 can transfer data from system memory via I/O unit 2304 for processing. In at least one embodiment, during processing, transferred data can be stored to on-chip memory (e.g., a parallel processor memory 2322) during processing, then written back to system memory.

In at least one embodiment, when parallel processing unit 2302 is used to perform graphics processing, scheduler 2310 can be configured to divide a processing workload into approximately equal sized tasks, to better enable distribution of graphics processing operations to multiple clusters 2314A-2314N of processing array 2312. In at least one embodiment, portions of processing array 2312 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2314A-2314N may be stored in buffers to allow intermediate data to be transmitted between clusters 2314A-2314N for further processing.

In at least one embodiment, processing array 2312 can receive processing tasks to be executed via scheduler 2310, which receives commands defining processing tasks from front end 2308. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2310 may be configured to fetch indices corresponding to tasks or may receive indices from front end 2308. In at least one embodiment, front end 2308 can be configured to ensure processing array 2312 is configured to a valid state before a workload specified by incoming command buffers batch-buffers, push buffers, etc.) is initiated.

In at least one embodiment, each of one or more instances of parallel processing unit 2302 can couple with parallel processor memory 2322. In at least one embodiment, parallel processor memory 2322 can be accessed via memory crossbar 2316, which can receive memory requests from processing array 2312 as well as I/O unit 2304. In at least one embodiment, memory crossbar 2316 can access parallel processor memory 2322 via a memory interface 2318. In at least one embodiment, memory interface 2318 can include multiple partition units (e.g., a partition unit 2320A, partition unit 2320B, through partition unit 2320N) that can each couple to a portion (e.g., memory unit) of parallel processor memory 2322. In at least one embodiment, a number of partition units 2320A-2320N is configured to be equal to a number of memory units, such that a first partition unit 2320A has a corresponding first memory unit 2324A, a second partition unit 2320B has a corresponding memory unit 2324B, and an Nth partition unit 2320N has a corresponding Nth memory unit 2324N. In at least one embodiment, a number of partition units 2320A-2320N may not be equal to a number of memory devices.

In at least one embodiment, memory units 2324A-2324N can include various types of memory devices, including DRAM or graphics random access memory, such as SGRAM, including GDDR memory. In at least one embodiment, memory units 2324A-2324N may also include 3D stacked memory, including but not limited to high bandwidth memory ("HBM"). In at least one embodiment, render targets, such as frame buffers or texture maps may be stored across memory units 2324A-2324N, allowing partition units 2320A-2320N to write portions of each render target in parallel to efficiently use available bandwidth of parallel processor memory 2322. In at least one embodiment, a local instance of parallel processor memory 2322 may be excluded in favor of a unified memory design that utilizes system memory in conjunction with local cache memory.

In at least one embodiment, any one of clusters 2314A-2314N of processing array 2312 can process data that will be written to any of memory units 2324A-2324N within parallel processor memory 2322. In at least one embodiment, memory crossbar 2316 can be configured to transfer an output of each cluster 2314A-2314N to any partition unit 2320A-2320N or to another cluster 2314A-2314N, which can perform additional processing operations on an output. In at least one embodiment, each cluster 2314A-2314N can communicate with memory interface 2318 through memory crossbar 2316 to read from or write to various external memory devices. In at least one embodiment, memory crossbar 2316 has a connection to memory interface 2318 to communicate with I/O unit 2304, as well as a connection to a local instance of parallel processor memory 2322, enabling processing units within different clusters 2314A-2314N to communicate with system memory or other memory that is not local to parallel processing unit 2302. In at least one embodiment, memory crossbar 2316 can use virtual channels to separate traffic streams between clusters 2314A-2314N and partition units 2320A-2320N.

In at least one embodiment, multiple instances of parallel processing unit 2302 can be provided on a single add-in card, or multiple add-in cards can be interconnected. In at least one embodiment, different instances of parallel processing unit 2302 can be configured to interoperate even if different instances have different numbers of processing cores, different amounts of local parallel processor memory, and/or other configuration differences. For example, in at least one embodiment, some instances of parallel processing unit 2302 can include higher precision floating point units relative to other instances. In at least one embodiment, systems incorporating one or more instances of parallel processing unit 2302 or parallel processor 2300 can be implemented in a variety of configurations and form factors, including but not limited to desktop, laptop, or handheld personal computers, servers, workstations, game consoles, and/or embedded systems.

Figure 23B:
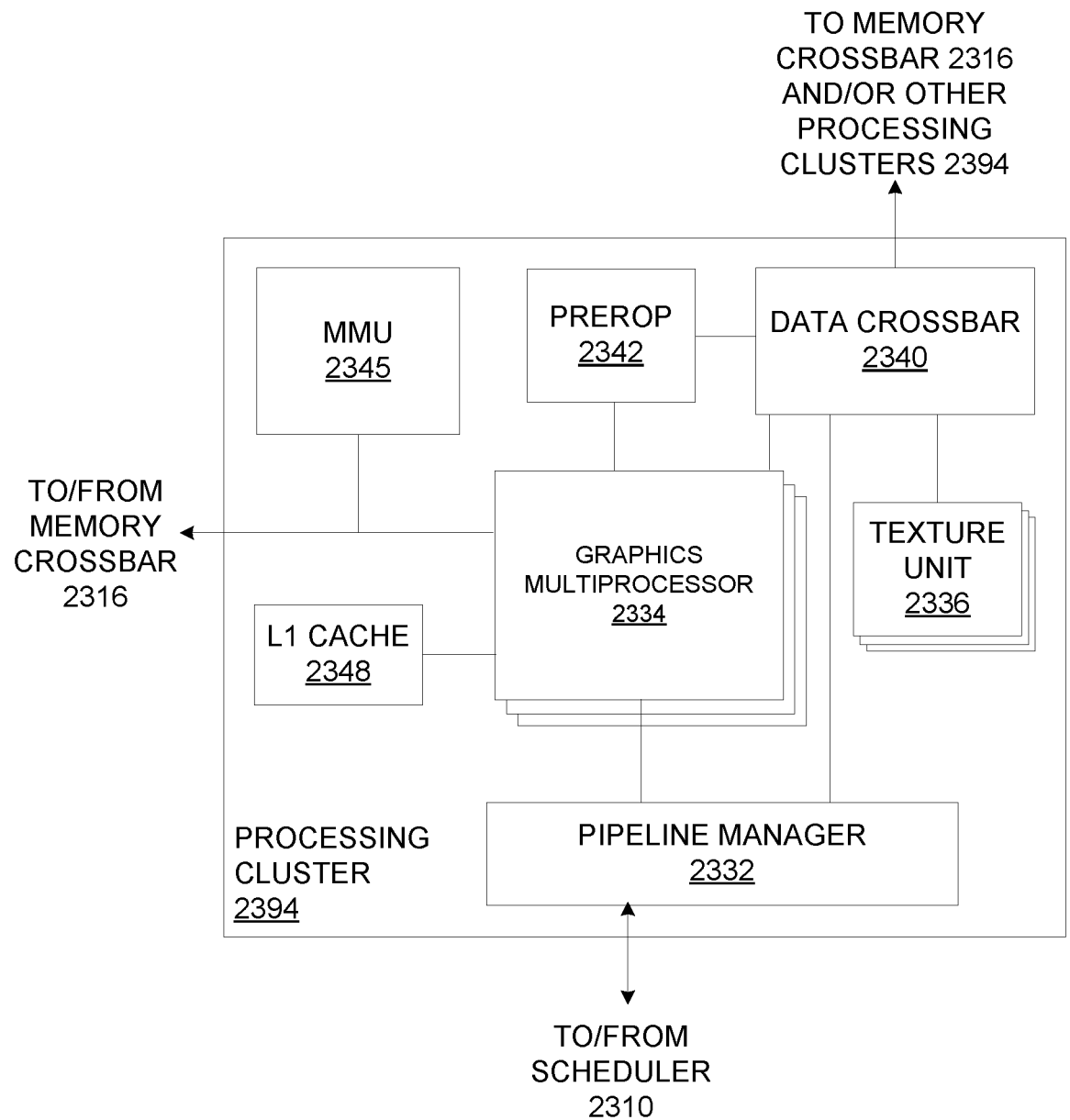
FIG. 23B illustrates a processing cluster, in accordance with at least one embodiment.

FIG. 23B illustrates a processing cluster 2394, in accordance with at least one embodiment. In at least one embodiment, processing cluster 2394 is included within a parallel processing unit. In at least one embodiment, processing cluster 2394 is one of processing clusters 2314A-2314N of FIG. 23. In at least one embodiment, processing cluster 2394 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2394.

In at least one embodiment, operation of processing cluster 2394 can be controlled via a pipeline manager 2332 that distributes processing tasks to SIMT parallel processors. In at least one embodiment, pipeline manager 2332 receives instructions from scheduler 2310 of FIG. 23 and manages execution of those instructions via a graphics multiprocessor 2334 and/or a texture unit 2336. In at least one embodiment, graphics multiprocessor 2334 is an exemplary instance of a SIMT parallel processor. However, in at least one embodiment, various types of SIMT parallel processors of differing architectures may be included within processing cluster 2394. In at least one embodiment, one or more instances of graphics multiprocessor 2334 can be included within processing cluster 2394. In at least one embodiment, graphics multiprocessor 2334 can process data and a data crossbar 2340 can be used to distribute processed data to one of multiple possible destinations, including other shader units. In at least one embodiment, pipeline manager 2332 can facilitate distribution of processed data by specifying destinations for processed data to be distributed via data crossbar 2340.

In at least one embodiment, each graphics multiprocessor 2334 within processing cluster 2394 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2394 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2334. In at least one embodiment, a thread group may include fewer threads than a number of processing engines within graphics multiprocessor 2334. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2334. In at least one embodiment, when a thread group includes more threads than the number of processing engines within graphics multiprocessor 2334, processing can be performed over consecutive clock cycles. In at least one embodiment, multiple thread groups can be executed concurrently on graphics multiprocessor 2334.

In at least one embodiment, graphics multiprocessor 2334 includes an internal cache memory to perform load and store operations. In at least one embodiment, graphics multiprocessor 2334 can forego an internal cache and use a cache memory (e.g., L1 cache 2348) within processing cluster 2394. In at least one embodiment, each graphics multiprocessor 2334 also has access to Level 2 ("L2") caches within partition units (e.g., partition units 2320A-2320N of FIG. 23A) that are shared among all processing clusters 2394 and may be used to transfer data between threads. In at least one embodiment, graphics multiprocessor 2334 may also access off-chip global memory, which can include one or more of local parallel processor memory and/or system memory. In at least one embodiment, any memory external to parallel processing unit 2302 may be used as global memory. In at least one embodiment, processing cluster 2394 includes multiple instances of graphics multiprocessor 2334 that can share common instructions and data, which may be stored in L1 cache 2348.

In at least one embodiment, each processing cluster 2394 may include an MMU 2345 that is configured to map virtual addresses into physical addresses. In at least one embodiment, one or more instances of MMU 2345 may reside within memory interface 2318 of FIG. 23. In at least one embodiment, MMU 2345 includes a set of page table entries ("PTEs") used to map a virtual address to a physical address of a tile and optionally a cache line index. In at least one embodiment, MMU 2345 may include address translation lookaside buffers ("TLBs") or caches that may reside within graphics multiprocessor 2334 or L1 cache 2348 or processing cluster 2394. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2394 may be configured such that each graphics multiprocessor 2334 is coupled to a texture unit 2336 for performing texture mapping operations, e.g., determining texture sample positions, reading texture data, and filtering texture data. In at least one embodiment, texture data is read from an internal texture L1 cache (not shown) or from an L1 cache within graphics multiprocessor 2334 and is fetched from an L2 cache, local parallel processor memory, or system memory, as needed. In at least one embodiment, each graphics multiprocessor 2334 outputs a processed task to data crossbar 2340 to provide the processed task to another processing cluster 2394 for further processing or to store the processed task in an L2 cache, a local parallel processor memory, or a system memory via memory crossbar 2316. In at least one embodiment, a pre-raster operations unit ("preROP") 2342 is configured to receive data from graphics multiprocessor 2334, direct data to ROP units, which may be located with partition units as described herein (e.g., partition units 2320A-2320N of FIG. 23). In at least one embodiment, PreROP 2342 can perform optimizations for color blending, organize pixel color data, and perform address translations.

Figure 23C:
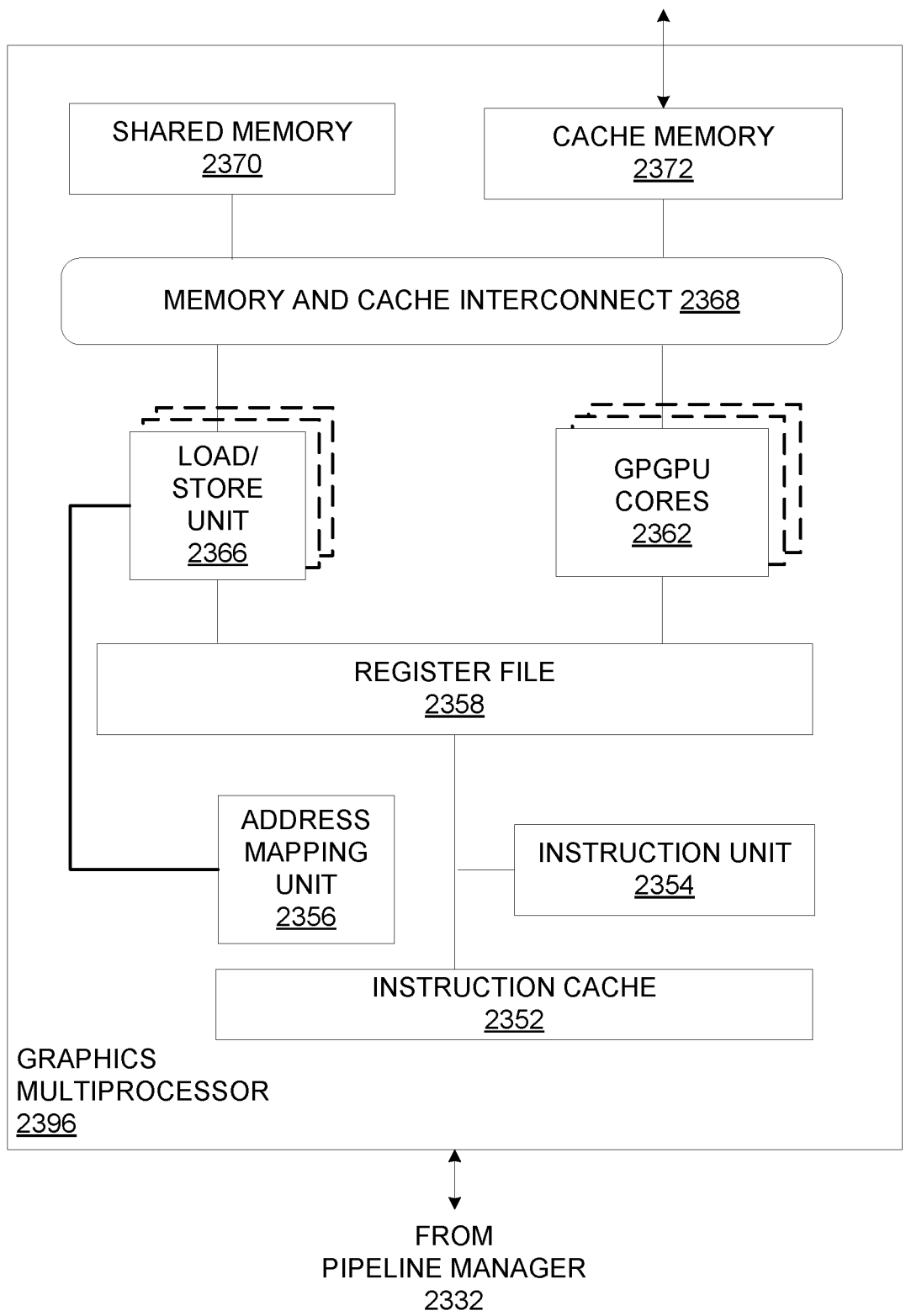
FIG. 23C illustrates a graphics multiprocessor, in accordance with at least one embodiment.

FIG. 23C illustrates a graphics multiprocessor 2396, in accordance with at least one embodiment. In at least one embodiment, graphics multiprocessor 2396 is graphics multiprocessor 2334 of FIG. 23B. In at least one embodiment, graphics multiprocessor 2396 couples with pipeline manager 2332 of processing cluster 2394. In at least one embodiment, graphics multiprocessor 2396 has an execution pipeline including but not limited to an instruction cache 2352, an instruction unit 2354, an address mapping unit 2356, a register file 2358, one or more GPGPU cores 2362, and one or more LSUs 2366. GPGPU cores 2362 and LSUs 2366 are coupled with cache memory 2372 and shared memory 2370 via a memory and cache interconnect 2368.

In at least one embodiment, instruction cache 2352 receives a stream of instructions to execute from pipeline manager 2332. In at least one embodiment, instructions are cached in instruction cache 2352 and dispatched for execution by instruction unit 2354. In at least one embodiment, instruction unit 2354 can dispatch instructions as thread groups (e.g., warps), with each thread of a thread group assigned to a different execution unit within GPGPU core 2362. In at least one embodiment, an instruction can access any of a local, shared, or global address space by specifying an address within a unified address space. In at least one embodiment, address mapping unit 2356 can be used to translate addresses in a unified address space into a distinct memory address that can be accessed by LSUs 2366.

In at least one embodiment, register file 2358 provides a set of registers for functional units of graphics multiprocessor 2396. In at least one embodiment, register file 2358 provides temporary storage for operands connected to data paths of functional units (e.g., GPGPU cores 2362, LSUs 2366) of graphics multiprocessor 2396. In at least one embodiment, register file 2358 is divided between each of functional units such that each functional unit is allocated a dedicated portion of register file 2358. In at least one embodiment, register file 2358 is divided between different thread groups being executed by graphics multiprocessor 2396.

In at least one embodiment, GPGPU cores 2362 can each include FPUs and/or integer ALUs that are used to execute instructions of graphics multiprocessor 2396. GPGPU cores 2362 can be similar in architecture or can differ in architecture. In at least one embodiment, a first portion of GPGPU cores 2362 include a single precision FPU and an integer ALU while a second portion of GPGPU cores 2362 include a double precision FPU. In at least one embodiment, FPUs can implement IEEE 754-2008 standard for floating point arithmetic or enable variable precision floating point arithmetic. In at least one embodiment, graphics multiprocessor 2396 can additionally include one or more fixed function or special function units to perform specific functions such as copy rectangle or pixel blending operations. In at least one embodiment one or more of GPGPU cores 2362 can also include fixed or special function logic.

In at least one embodiment, GPGPU cores 2362 include SIMD logic capable of performing a single instruction on multiple sets of data. In at least one embodiment GPGPU cores 2362 can physically execute SIMD4, SIMD8, and SIMD16 instructions and logically execute SIMD1, SIMD2, and SIMD32 instructions. In at least one embodiment, SIMD instructions for GPGPU cores 2362 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2368 is an interconnect network that connects each functional unit of graphics multiprocessor 2396 to register file 2358 and to shared memory 2370. In at least one embodiment, memory and cache interconnect 2368 is a crossbar interconnect that allows LSU 2366 to implement load and store operations between shared memory 2370 and register file 2358. In at least one embodiment, register file 2358 can operate at a same frequency as GPGPU cores 2362, thus data transfer between GPGPU cores 2362 and register file 2358 is very low latency. In at least one embodiment, shared memory 2370 can be used to enable communication between threads that execute on functional units within graphics multiprocessor 2396. In at least one embodiment, cache memory 2372 can be used as a data cache for example, to cache texture data communicated between functional units and texture unit 2336. In at least one embodiment, shared memory 2370 can also be used as a program managed cached. In at least one embodiment, threads executing on GPGPU cores 2362 can programmatically store data within shared memory in addition to automatically cached data that is stored within cache memory 2372.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 24:
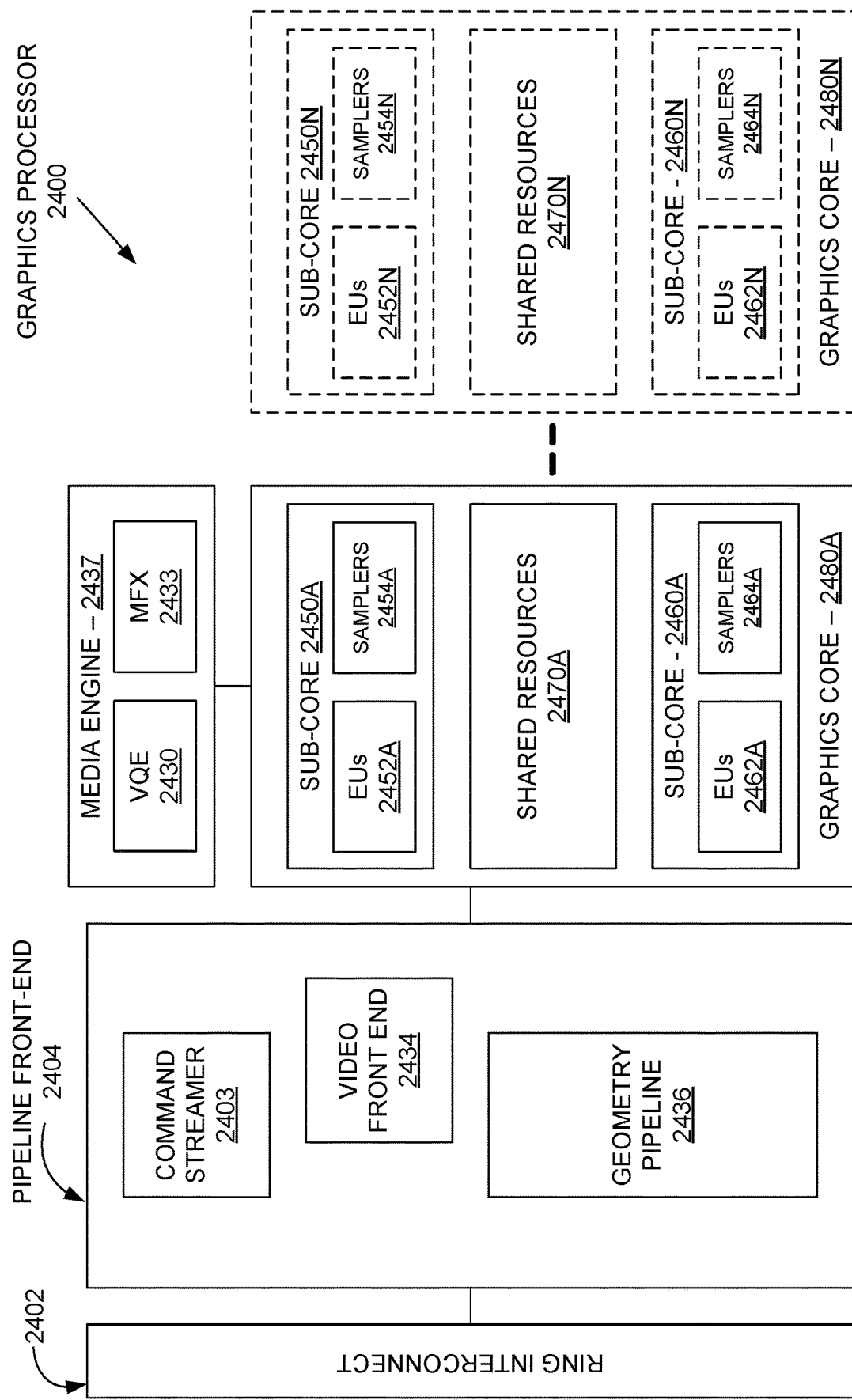
FIG. 24 illustrates a graphics processor, in accordance with at least one embodiment.

FIG. 24 illustrates a graphics processor 2400, in accordance with at least one embodiment. In at least one embodiment, graphics processor 2400 includes a ring interconnect 2402, a pipeline front-end 2404, a media engine 2437, and graphics cores 2480A-2480N. In at least one embodiment, ring interconnect 2402 couples graphics processor 2400 to other processing units, including other graphics processors or one or more general-purpose processor cores. In at least one embodiment, graphics processor 2400 is one of many processors integrated within a multi-core processing system.

In at least one embodiment, graphics processor 2400 receives batches of commands via ring interconnect 2402. In at least one embodiment, incoming commands are interpreted by a command streamer 2403 in pipeline front-end 2404. In at least one embodiment, graphics processor 2400 includes scalable execution logic to perform 3D geometry processing and media processing via graphics core(s) 2480A-2480N. In at least one embodiment, for 3D geometry processing commands, command streamer 2403 supplies commands to geometry pipeline 2436. In at least one embodiment, for at least some media processing commands, command streamer 2403 supplies commands to a video front end 2434, which couples with a media engine 2437. In at least one embodiment, media engine 2437 includes a Video Quality Engine ("VQE") 2430 for video and image post-processing and a multi-format encode/decode ("MFX") engine 2433 to provide hardware-accelerated media data encode and decode. In at least one embodiment, geometry pipeline 2436 and media engine 2437 each generate execution threads for thread execution resources provided by at least one graphics core 2480A.

In at least one embodiment, graphics processor 2400 includes scalable thread execution resources featuring modular graphics cores 2480A-2480N (sometimes referred to as core slices), each having multiple sub-cores 2450A-550N, 2460A-2460N (sometimes referred to as core sub-slices). In at least one embodiment, graphics processor 2400 can have any number of graphics cores 2480A through 2480N. In at least one embodiment, graphics processor 2400 includes a graphics core 2480A having at least a first sub-core 2450A and a second sub-core 2460A. In at least one embodiment, graphics processor 2400 is a low power processor with a single sub-core (e.g., sub-core 2450A). In at least one embodiment, graphics processor 2400 includes multiple graphics cores 2480A-2480N, each including a set of first sub-cores 2450A-2450N and a set of second sub-cores 2460A-2460N. In at least one embodiment, each sub-core in first sub-cores 2450A-2450N includes at least a first set of execution units ("EUs") 2452A-2452N and media/texture samplers 2454A-2454N. In at least one embodiment, each sub-core in second sub-cores 2460A-2460N includes at least a second set of execution units 2462A-2462N and samplers 2464A-2464N. In at least one embodiment, each sub-core 2450A-2450N, 2460A-2460N shares a set of shared resources 2470A-2470N. In at least one embodiment, shared resources 2470 include shared cache memory and pixel operation logic.

Figure 25:
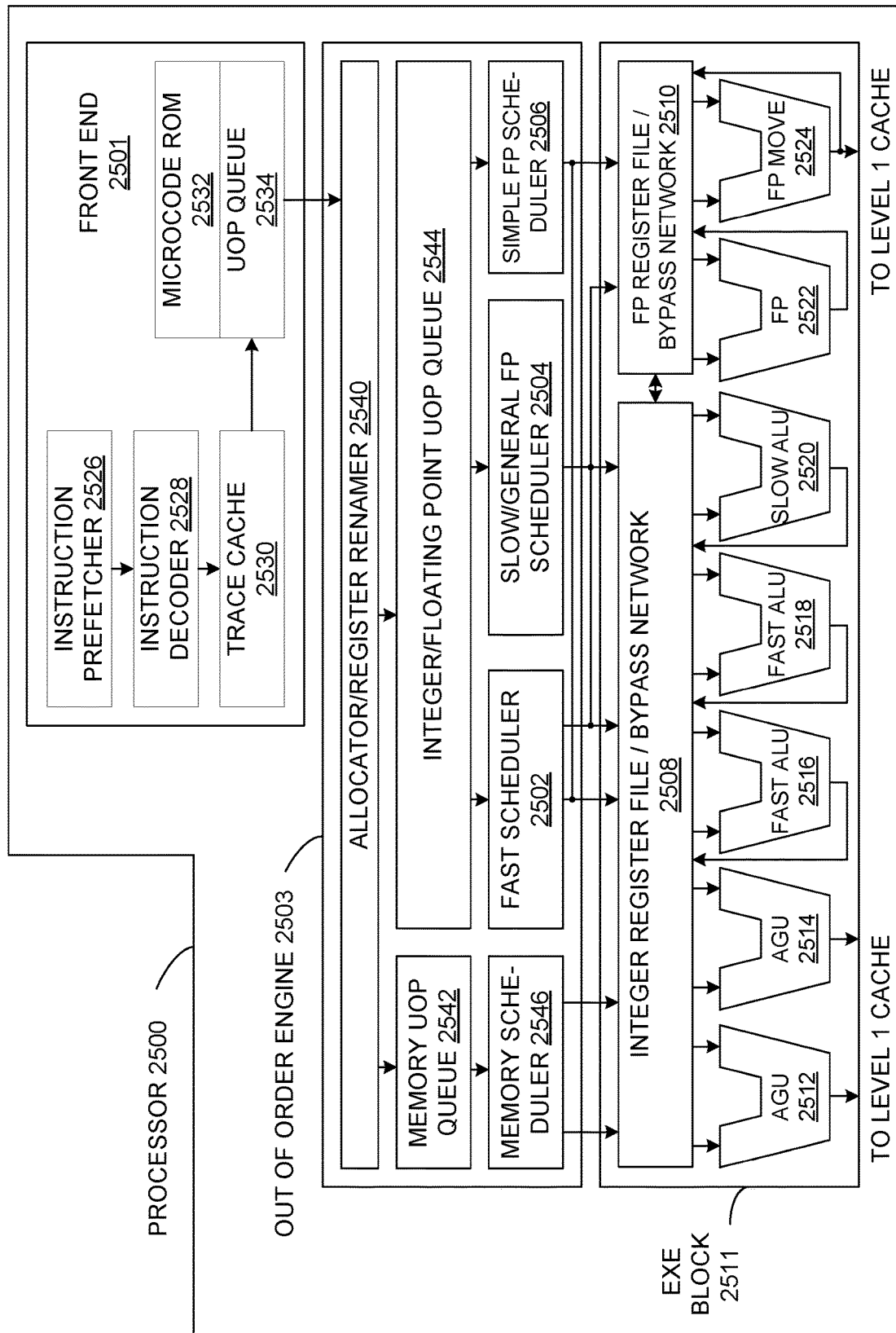
FIG. 25 illustrates a processor, in accordance with at least one embodiment.

FIG. 25 illustrates a processor 2500, in accordance with at least one embodiment. In at least one embodiment, processor 2500 may include, without limitation, logic circuits to perform instructions. In at least one embodiment, processor 2500 may perform instructions, including x86 instructions, ARM instructions, specialized instructions for ASICs, etc. In at least one embodiment, processor 2510 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2510 may perform instructions to accelerate CUDA programs.

In at least one embodiment, processor 2500 includes an in-order front end ("front end") 2501 to fetch instructions to be executed and prepare instructions to be used later in processor pipeline. In at least one embodiment, front end 2501 may include several units. In at least one embodiment, an instruction prefetcher 2526 fetches instructions from memory and feeds instructions to an instruction decoder 2528 which in turn decodes or interprets instructions. For example, in at least one embodiment, instruction decoder 2528 decodes a received instruction into one or more operations called "micro-instructions" or "micro-operations" (also called "micro ops" or "uops") for execution. In at least one embodiment, instruction decoder 2528 parses instruction into an opcode and corresponding data and control fields that may be used by micro-architecture to perform operations. In at least one embodiment, a trace cache 2530 may assemble decoded uops into program ordered sequences or traces in a uop queue 2534 for execution. In at least one embodiment, when trace cache 2530 encounters a complex instruction, a microcode ROM 2532 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2528 may access microcode ROM 2532 to perform instruction. In at least one embodiment, an instruction may be decoded into a small number of micro-ops for processing at instruction decoder 2528. In at least one embodiment, an instruction may be stored within microcode ROM 2532 should a number of micro-ops be needed to accomplish operation. In at least one embodiment, trace cache 2530 refers to an entry point programmable logic array ("PLA") to determine a correct micro-instruction pointer for reading microcode sequences to complete one or more instructions from microcode ROM 2532. In at least one embodiment, after microcode ROM 2532 finishes sequencing micro-ops for an instruction, front end 2501 of machine may resume fetching micro-ops from trace cache 2530.

In at least one embodiment, out-of-order execution engine ("out of order engine") 2503 may prepare instructions for execution. In at least one embodiment, out-of-order execution logic has a number of buffers to smooth out and re-order the flow of instructions to optimize performance as they go down a pipeline and get scheduled for execution. Out-of-order execution engine 2503 includes, without limitation, an allocator/register renamer 2540, a memory uop queue 2542, an integer/floating point uop queue 2544, a memory scheduler 2546, a fast scheduler 2502, a slow/general floating point scheduler ("slow/general FP scheduler") 2504, and a simple floating point scheduler ("simple FP scheduler") 2506. In at least one embodiment, fast schedule 2502, slow/general floating point scheduler 2504, and simple floating point scheduler 2506 are also collectively referred to herein as "uop schedulers 2502, 2504, 2506." Allocator/register renamer 2540 allocates machine buffers and resources that each uop needs in order to execute. In at least one embodiment, allocator/register renamer 2540 renames logic registers onto entries in a register file. In at least one embodiment, allocator/register renamer 2540 also allocates an entry for each uop in one of two uop queues, memory uop queue 2542 for memory operations and integer/floating point uop queue 2544 for non-memory operations, in front of memory scheduler 2546 and uop schedulers 2502, 2504, 2506. In at least one embodiment, uop schedulers 2502, 2504, 2506, determine when a uop is ready to execute based on readiness of their dependent input register operand sources and availability of execution resources uops need to complete their operation. In at least one embodiment, fast scheduler 2502 of at least one embodiment may schedule on each half of main clock cycle while slow/general floating point scheduler 2504 and simple floating point scheduler 2506 may schedule once per main processor clock cycle. In at least one embodiment, uop schedulers 2502, 2504, 2506 arbitrate for dispatch ports to schedule uops for execution.

In at least one embodiment, execution block 2511 includes, without limitation, an integer register file/bypass network 2508, a floating point register file/bypass network ("FP register file/bypass network") 2510, address generation units ("AGUs") 2512 and 2514, fast ALUs 2516 and 2518, a slow ALU 2520, a floating point ALU ("FP") 2522, and a floating point move unit ("FP move") 2524. In at least one embodiment, integer register file/bypass network 2508 and floating point register file/bypass network 2510 are also referred to herein as "register files 2508, 2510." In at least one embodiment, AGUSs 2512 and 2514, fast ALUs 2516 and 2518, slow ALU 2520, floating point ALU 2522, and floating point move unit 2524 are also referred to herein as "execution units 2512, 2514, 2516, 2518, 2520, 2522, and 2524." In at least one embodiment, an execution block may include, without limitation, any number (including zero) and type of register files, bypass networks, address generation units, and execution units, in any combination.

In at least one embodiment, register files 2508, 2510 may be arranged between uop schedulers 2502, 2504, 2506, and execution units 2512, 2514, 2516, 2518, 2520, 2522, and 2524. In at least one embodiment, integer register file/bypass network 2508 performs integer operations. In at least one embodiment, floating point register file/bypass network 2510 performs floating point operations. In at least one embodiment, each of register files 2508, 2510 may include, without limitation, a bypass network that may bypass or forward just completed results that have not yet been written into register file to new dependent uops. In at least one embodiment, register files 2508, 2510 may communicate data with each other. In at least one embodiment, integer register file/bypass network 2508 may include, without limitation, two separate register files, one register file for low-order thirty-two bits of data and a second register file for high order thirty-two bits of data. In at least one embodiment, floating point register file/bypass network 2510 may include, without limitation, 128-bit wide entries because floating point instructions typically have operands from 64 to 128 bits in width.

In at least one embodiment, execution units 2512, 2514, 2516, 2518, 2520, 2522, 2524 may execute instructions. In at least one embodiment, register files 2508, 2510 store integer and floating point data operand values that microinstructions need to execute. In at least one embodiment, processor 2500 may include, without limitation, any number and combination of execution units 2512, 2514, 2516, 2518, 2520, 2522, 2524. In at least one embodiment, floating point ALU 2522 and floating point move unit 2524 may execute floating point, MMX, SIMD, AVX and SSE, or other operations. In at least one embodiment, floating point ALU 2522 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2516, 2518. In at least one embodiment, fast ALUS 2516, 2518 may execute fast operations with an effective latency of half a clock cycle. In at least one embodiment, most complex integer operations go to slow ALU 2520 as slow ALU 2520 may include, without limitation, integer execution hardware for long-latency type of operations, such as a multiplier, shifts, flag logic, and branch processing. In at least one embodiment, memory load/store operations may be executed by AGUs 2512, 2514. In at least one embodiment, fast ALU 2516, fast ALU 2518, and slow ALU 2520 may perform integer operations on 64-bit data operands. In at least one embodiment, fast ALU 2516, fast ALU 2518, and slow ALU 2520 may be implemented to support a variety of data bit sizes including sixteen, thirty-two, 128, 256, etc. In at least one embodiment, floating point ALU 2522 and floating point move unit 2524 may be implemented to support a range of operands having bits of various widths. In at least one embodiment, floating point ALU 2522 and floating point move unit 2524 may operate on 128-bit wide packed data operands in conjunction with SIMD and multimedia instructions.

In at least one embodiment, uop schedulers 2502, 2504, 2506 dispatch dependent operations before parent load has finished executing. In at least one embodiment, as uops may be speculatively scheduled and executed in processor 2500, processor 2500 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 26:
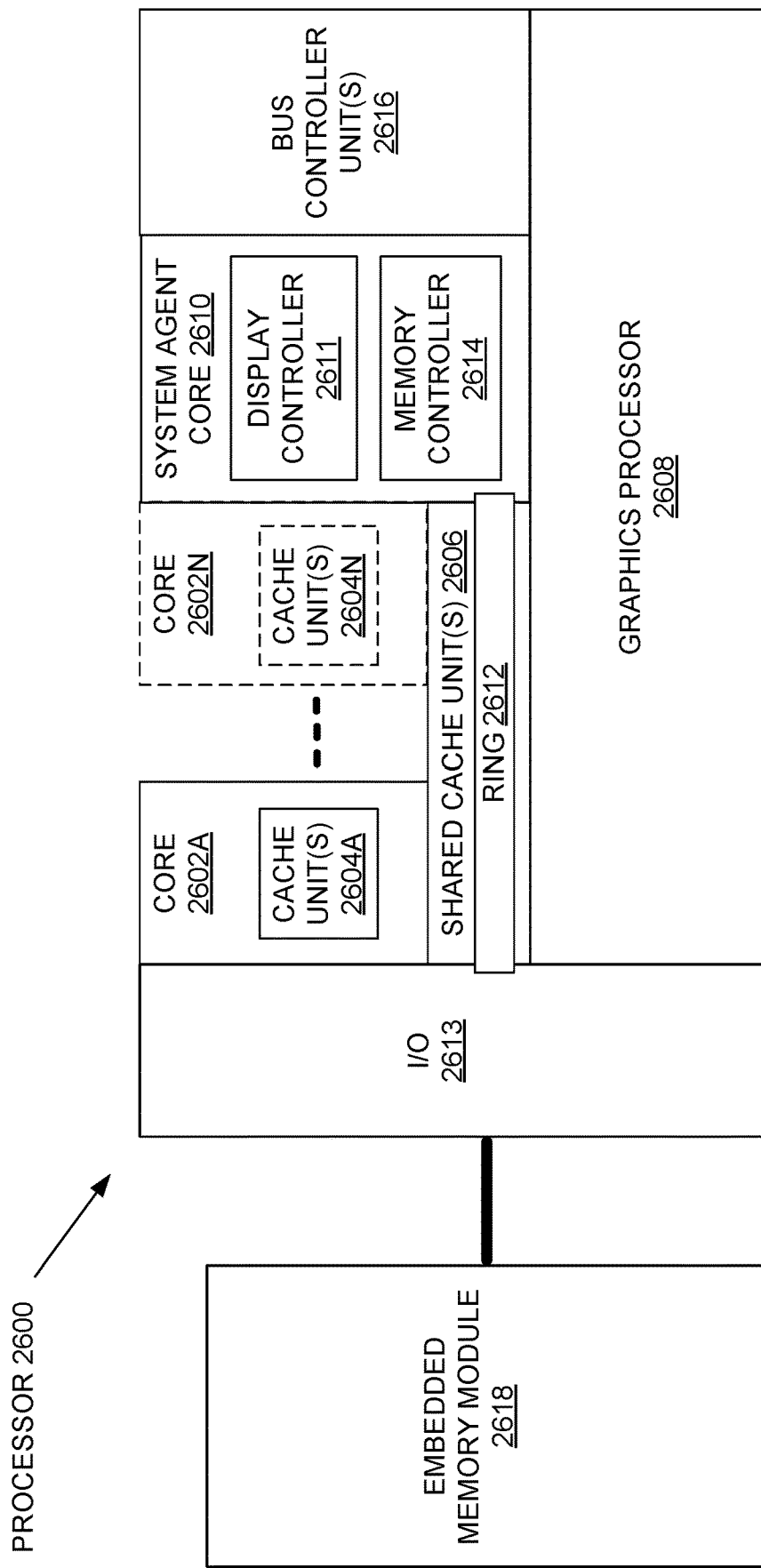
FIG. 26 illustrates a processor, in accordance with at least one embodiment.

FIG. 26 illustrates a processor 2600, in accordance with at least one embodiment. In at least one embodiment, processor 2600 includes, without limitation, one or more processor cores ("cores") 2602A-2602N, an integrated memory controller 2614, and an integrated graphics processor 2608. In at least one embodiment, processor 2600 can include additional cores up to and including additional processor core 2602N represented by dashed lined boxes. In at least one embodiment, each of processor cores 2602A-2602N includes one or more internal cache units 2604A-2604N. In at least one embodiment, each processor core also has access to one or more shared cached units 2606.

In at least one embodiment, internal cache units 2604A-2604N and shared cache units 2606 represent a cache memory hierarchy within processor 2600. In at least one embodiment, cache memory units 2604A-2604N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 2606 and 2604A-2604N.

In at least one embodiment, processor 2600 may also include a set of one or more bus controller units 2616 and a system agent core 2610. In at least one embodiment, one or more bus controller units 2616 manage a set of peripheral buses, such as one or more PCI or PCI express buses. In at least one embodiment, system agent core 2610 provides management functionality for various processor components. In at least one embodiment, system agent core 2610 includes one or more integrated memory controllers 2614 to manage access to various external memory devices (not shown).

In at least one embodiment, one or more of processor cores 2602A-2602N include support for simultaneous multi-threading. In at least one embodiment, system agent core 2610 includes components for coordinating and operating processor cores 2602A-2602N during multi-threaded processing. In at least one embodiment, system agent core 2610 may additionally include a power control unit ("PCU"), which includes logic and components to regulate one or more power states of processor cores 2602A-2602N and graphics processor 2608.

In at least one embodiment, processor 2600 additionally includes graphics processor 2608 to execute graphics processing operations. In at least one embodiment, graphics processor 2608 couples with shared cache units 2606, and system agent core 2610, including one or more integrated memory controllers 2614. In at least one embodiment, system agent core 2610 also includes a display controller 2611 to drive graphics processor output to one or more coupled displays. In at least one embodiment, display controller 2611 may also be a separate module coupled with graphics processor 2608 via at least one interconnect, or may be integrated within graphics processor 2608.

In at least one embodiment, a ring based interconnect unit 2612 is used to couple internal components of processor 2600. In at least one embodiment, an alternative interconnect unit may be used, such as a point-to-point interconnect, a switched interconnect, or other techniques. In at least one embodiment, graphics processor 2608 couples with ring interconnect 2612 via an I/O link 2613.

In at least one embodiment, I/O link 2613 represents at least one of multiple varieties of I/O interconnects, including an on package I/O interconnect which facilitates communication between various processor components and a high-performance embedded memory module 2618, such as an eDRAM module. In at least one embodiment, each of processor cores 2602A-2602N and graphics processor 2608 use embedded memory modules 2618 as a shared LLC.

In at least one embodiment, processor cores 2602A-2602N are homogeneous cores executing a common instruction set architecture. In at least one embodiment, processor cores 2602A-2602N are heterogeneous in terms of ISA, where one or more of processor cores 2602A-2602N execute a common instruction set, while one or more other cores of processor cores 2602A-26-02N executes a subset of a common instruction set or a different instruction set. In at least one embodiment, processor cores 2602A-2602N are heterogeneous in terms of microarchitecture, where one or more cores having a relatively higher power consumption couple with one or more cores having a lower power consumption. In at least one embodiment, processor 2600 can be implemented on one or more chips or as an SoC integrated circuit.

Figure 27:
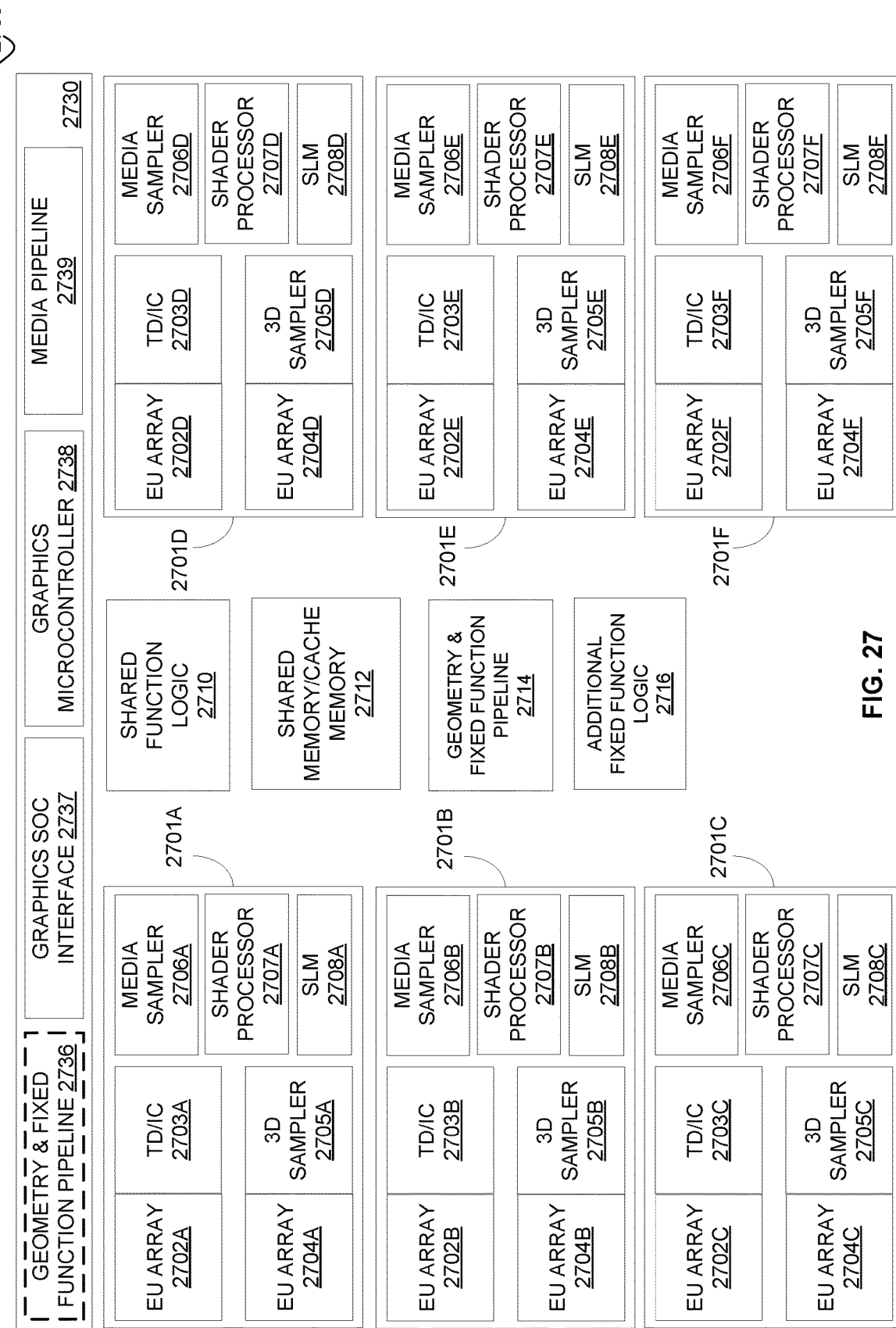
FIG. 27 illustrates a graphics processor core, in accordance with at least one embodiment.

FIG. 27 illustrates a graphics processor core 2700, in accordance with at least one embodiment described. In at least one embodiment, graphics processor core 2700 is included within a graphics core array. In at least one embodiment, graphics processor core 2700, sometimes referred to as a core slice, can be one or multiple graphics cores within a modular graphics processor. In at least one embodiment, graphics processor core 2700 is exemplary of one graphics core slice, and a graphics processor as described herein may include multiple graphics core slices based on target power and performance envelopes. In at least one embodiment, each graphics core 2700 can include a fixed function block 2730 coupled with multiple sub-cores 2701A-2701F, also referred to as sub-slices, that include modular blocks of general-purpose and fixed function logic.

In at least one embodiment, fixed function block 2730 includes a geometry/fixed function pipeline 2736 that can be shared by all sub-cores in graphics processor 2700, for example, in lower performance and/or lower power graphics processor implementations. In at least one embodiment, geometry/fixed function pipeline 2736 includes a 3D fixed function pipeline, a video front-end unit, a thread spawner and thread dispatcher, and a unified return buffer manager, which manages unified return buffers.

In at least one embodiment, fixed function block 2730 also includes a graphics SoC interface 2737, a graphics microcontroller 2738, and a media pipeline 2739. Graphics SoC interface 2737 provides an interface between graphics core 2700 and other processor cores within an SoC integrated circuit. In at least one embodiment, graphics microcontroller 2738 is a programmable sub-processor that is configurable to manage various functions of graphics processor 2700, including thread dispatch, scheduling, and pre-emption. In at least one embodiment, media pipeline 2739 includes logic to facilitate decoding, encoding, pre-processing, and/or post-processing of multimedia data, including image and video data. In at least one embodiment, media pipeline 2739 implements media operations via requests to compute or sampling logic within sub-cores 2701-2701F.

In at least one embodiment, SoC interface 2737 enables graphics core 2700 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 2737 can also enable communication with fixed function devices within an SoC, such as camera imaging pipelines, and enables use of and/or implements global memory atomics that may be shared between graphics core 2700 and CPUs within an SoC. In at least one embodiment, SoC interface 2737 can also implement power management controls for graphics core 2700 and enable an interface between a clock domain of graphic core 2700 and other clock domains within an SoC. In at least one embodiment, SoC interface 2737 enables receipt of command buffers from a command streamer and global thread dispatcher that are configured to provide commands and instructions to each of one or more graphics cores within a graphics processor. In at least one embodiment, commands and instructions can be dispatched to media pipeline 2739, when media operations are to be performed, or a geometry and fixed function pipeline (e.g., geometry and fixed function pipeline 2736, geometry and fixed function pipeline 2714) when graphics processing operations are to be performed.

In at least one embodiment, graphics microcontroller 2738 can be configured to perform various scheduling and management tasks for graphics core 2700. In at least one embodiment, graphics microcontroller 2738 can perform graphics and/or compute workload scheduling on various graphics parallel engines within execution unit (EU) arrays 2702A-2702F, 2704A-2704F within sub-cores 2701A-2701F. In at least one embodiment, host software executing on a CPU core of an SoC including graphics core 2700 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 2738 can also facilitate low-power or idle states for graphics core 2700, providing graphics core 2700 with an ability to save and restore registers within graphics core 2700 across low-power state transitions independently from an operating system and/or graphics driver software on a system.

In at least one embodiment, graphics core 2700 may have greater than or fewer than illustrated sub-cores 2701A-2701F, up to N modular sub-cores. For each set of N sub-cores, in at least one embodiment, graphics core 2700 can also include shared function logic 2710, shared and/or cache memory 2712, a geometry/fixed function pipeline 2714, as well as additional fixed function logic 2716 to accelerate various graphics and compute processing operations. In at least one embodiment, shared function logic 2710 can include logic units (e.g., sampler, math, and/or inter-thread communication logic) that can be shared by each N sub-cores within graphics core 2700. Shared and/or cache memory 2712 can be an LLC for N sub-cores 2701A-2701F within graphics core 2700 and can also serve as shared memory that is accessible by multiple sub-cores. In at least one embodiment, geometry/fixed function pipeline 2714 can be included instead of geometry/fixed function pipeline 2736 within fixed function block 2730 and can include same or similar logic units.

In at least one embodiment, graphics core 2700 includes additional fixed function logic 2716 that can include various fixed function acceleration logic for use by graphics core 2700. In at least one embodiment, additional fixed function logic 2716 includes an additional geometry pipeline for use in position only shading. In position-only shading, at least two geometry pipelines exist, whereas in a full geometry pipeline within geometry/fixed function pipeline 2716, 2736, and a cull pipeline, which is an additional geometry pipeline which may be included within additional fixed function logic 2716. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2716 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 2716 can also include general purpose processing acceleration logic, such as fixed function matrix multiplication logic, for accelerating CUDA programs.

In at least one embodiment, each graphics sub-core 2701A-2701F includes a set of execution resources that may be used to perform graphics, media, and compute operations in response to requests by graphics pipeline, media pipeline, or shader programs. In at least one embodiment, graphics sub-cores 2701A-2701F include multiple EU arrays 2702A-2702F, 2704A-2704F, thread dispatch and inter-thread communication ("TD/IC") logic 2703A-2703F, a 3D (e.g., texture) sampler 2705A-2705F, a media sampler 2706A-2706F, a shader processor 2707A-2707F, and shared local memory ("SLM") 2708A-2708F. EU arrays 2702A-2702F, 2704A-2704F each include multiple execution units, which are GPGPUs capable of performing floating-point and integer/fixed-point logic operations in service of a graphics, media, or compute operation, including graphics, media, or compute shader programs. In at least one embodiment, TD/IC logic 2703A-2703F performs local thread dispatch and thread control operations for execution units within a sub-core and facilitate communication between threads executing on execution units of a sub-core. In at least one embodiment, 3D sampler 2705A-2705F can read texture or other 3D graphics related data into memory. In at least one embodiment, 3D sampler can read texture data differently based on a configured sample state and texture format associated with a given texture. In at least one embodiment, media sampler 2706A-2706F can perform similar read operations based on a type and format associated with media data. In at least one embodiment, each graphics sub-core 2701A-2701F can alternately include a unified 3D and media sampler. In at least one embodiment, threads executing on execution units within each of sub-cores 2701A-2701F can make use of shared local memory 2708A-2708F within each sub-core, to enable threads executing within a thread group to execute using a common pool of on-chip memory.

Figure 28:
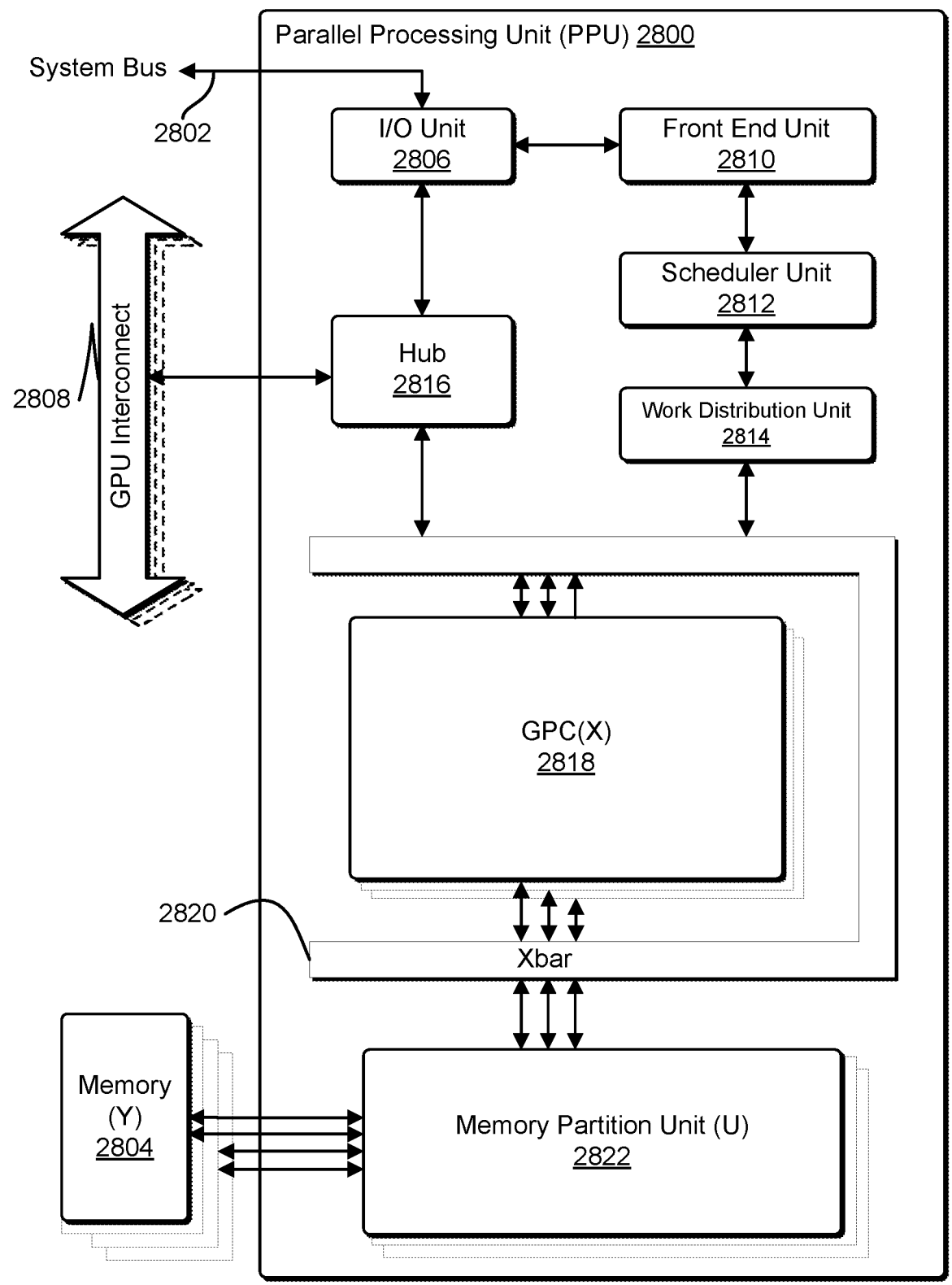
FIG. 28 illustrates a PPU, in accordance with at least one embodiment.

FIG. 28 illustrates a parallel processing unit ("PPU") 2800, in accordance with at least one embodiment. In at least one embodiment, PPU 2800 is configured with machine-readable code that, if executed by PPU 2800, causes PPU 2800 to perform some or all of processes and techniques described herein. In at least one embodiment, PPU 2800 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2800. In at least one embodiment, PPU 2800 is a GPU configured to implement a graphics rendering pipeline for processing three-dimensional ("3D") graphics data in order to generate two-dimensional ("2D") image data for display on a display device such as an LCD device. In at least one embodiment, PPU 2800 is utilized to perform computations such as linear algebra operations and machine-learning operations. FIG. 28 illustrates an example parallel processor for illustrative purposes only and should be construed as a non-limiting example of a processor architecture that may be implemented in at least one embodiment.

In at least one embodiment, one or more PPUs 2800 are configured to accelerate High Performance Computing ("HPC"), data center, and machine learning applications. In at least one embodiment, one or more PPUs 2800 are configured to accelerate CUDA programs. In at least one embodiment, PPU 2800 includes, without limitation, an I/O unit 2806, a front-end unit 2810, a scheduler unit 2812, a work distribution unit 2814, a hub 2816, a crossbar ("Xbar") 2820, one or more general processing clusters ("GPCs") 2818, and one or more partition units ("memory partition units") 2822. In at least one embodiment, PPU 2800 is connected to a host processor or other PPUs 2800 via one or more high-speed GPU interconnects ("GPU interconnects") 2808. In at least one embodiment, PPU 2800 is connected to a host processor or other peripheral devices via a system bus or interconnect 2802. In at least one embodiment, PPU 2800 is connected to a local memory comprising one or more memory devices ("memory") 2804. In at least one embodiment, memory devices 2804 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2808 may refer to a wire-based multi-lane communications link that is used by systems to scale and include one or more PPUs 2800 combined with one or more CPUs, supports cache coherence between PPUs 2800 and CPUs, and CPU mastering. In at least one embodiment, data and/or commands are transmitted by high-speed GPU interconnect 2808 through hub 2816 to/from other units of PPU 2800 such as one or more copy engines, video encoders, video decoders, power management units, and other components which may not be explicitly illustrated in FIG. 28.

In at least one embodiment, I/O unit 2806 is configured to transmit and receive communications (e.g., commands, data) from a host processor (not illustrated in FIG. 28) over system bus 2802. In at least one embodiment, I/O unit 2806 communicates with host processor directly via system bus 2802 or through one or more intermediate devices such as a memory bridge. In at least one embodiment, I/O unit 2806 may communicate with one or more other processors, such as one or more of PPUs 2800 via system bus 2802. In at least one embodiment, I/O unit 2806 implements a PCIe interface for communications over a PCIe bus. In at least one embodiment, I/O unit 2806 implements interfaces for communicating with external devices.

In at least one embodiment, I/O unit 2806 decodes packets received via system bus 2802. In at least one embodiment, at least some packets represent commands configured to cause PPU 2800 to perform various operations. In at least one embodiment, I/O unit 2806 transmits decoded commands to various other units of PPU 2800 as specified by commands. In at least one embodiment, commands are transmitted to front-end unit 2810 and/or transmitted to hub 2816 or other units of PPU 2800 such as one or more copy engines, a video encoder, a video decoder, a power management unit, etc. (not explicitly illustrated in FIG. 28). In at least one embodiment, I/O unit 2806 is configured to route communications between and among various logical units of PPU 2800.

In at least one embodiment, a program executed by host processor encodes a command stream in a buffer that provides workloads to PPU 2800 for processing. In at least one embodiment, a workload comprises instructions and data to be processed by those instructions. In at least one embodiment, buffer is a region in a memory that is accessible (e.g., read/write) by both a host processor and PPU 2800—a host interface unit may be configured to access buffer in a system memory connected to system bus 2802 via memory requests transmitted over system bus 2802 by I/O unit 2806. In at least one embodiment, a host processor writes a command stream to a buffer and then transmits a pointer to the start of the command stream to PPU 2800 such that front-end unit 2810 receives pointers to one or more command streams and manages one or more command streams, reading commands from command streams and forwarding commands to various units of PPU 2800.

In at least one embodiment, front-end unit 2810 is coupled to scheduler unit 2812 that configures various GPCs 2818 to process tasks defined by one or more command streams. In at least one embodiment, scheduler unit 2812 is configured to track state information related to various tasks managed by scheduler unit 2812 where state information may indicate which of GPCs 2818 a task is assigned to, whether task is active or inactive, a priority level associated with task, and so forth. In at least one embodiment, scheduler unit 2812 manages execution of a plurality of tasks on one or more of GPCs 2818.

In at least one embodiment, scheduler unit 2812 is coupled to work distribution unit 2814 that is configured to dispatch tasks for execution on GPCs 2818. In at least one embodiment, work distribution unit 2814 tracks a number of scheduled tasks received from scheduler unit 2812 and work distribution unit 2814 manages a pending task pool and an active task pool for each of GPCs 2818. In at least one embodiment, pending task pool comprises a number of slots (e.g., 32 slots) that contain tasks assigned to be processed by a particular GPC 2818; active task pool may comprise a number of slots (e.g., 4 slots) for tasks that are actively being processed by GPCs 2818 such that as one of GPCs 2818 completes execution of a task, that task is evicted from active task pool for GPC 2818 and one of other tasks from pending task pool is selected and scheduled for execution on GPC 2818. In at least one embodiment, if an active task is idle on GPC 2818, such as while waiting for a data dependency to be resolved, then the active task is evicted from GPC 2818 and returned to a pending task pool while another task in the pending task pool is selected and scheduled for execution on GPC 2818.

In at least one embodiment, work distribution unit 2814 communicates with one or more GPCs 2818 via XBar 2820. In at least one embodiment, XBar 2820 is an interconnect network that couples many units of PPU 2800 to other units of PPU 2800 and can be configured to couple work distribution unit 2814 to a particular GPC 2818. In at least one embodiment, one or more other units of PPU 2800 may also be connected to XBar 2820 via hub 2816.

In at least one embodiment, tasks are managed by scheduler unit 2812 and dispatched to one of GPCs 2818 by work distribution unit 2814. GPC 2818 is configured to process task and generate results. In at least one embodiment, results may be consumed by other tasks within GPC 2818, routed to a different GPC 2818 via XBar 2820, or stored in memory 2804. In at least one embodiment, results can be written to memory 2804 via partition units 2822, which implement a memory interface for reading and writing data to/from memory 2804. In at least one embodiment, results can be transmitted to another PPU 2804 or CPU via high-speed GPU interconnect 2808. In at least one embodiment, PPU 2800 includes, without limitation, a number U of partition units 2822 that is equal to number of separate and distinct memory devices 2804 coupled to PPU 2800.

In at least one embodiment, a host processor executes a driver kernel that implements an application programming interface ("API") that enables one or more applications executing on host processor to schedule operations for execution on PPU 2800. In at least one embodiment, multiple compute applications are simultaneously executed by PPU 2800 and PPU 2800 provides isolation, quality of service ("QoS"), and independent address spaces for multiple compute applications. In at least one embodiment, an application generates instructions (e.g., in the form of API calls) that cause a driver kernel to generate one or more tasks for execution by PPU 2800 and the driver kernel outputs tasks to one or more streams being processed by PPU 2800. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 29:
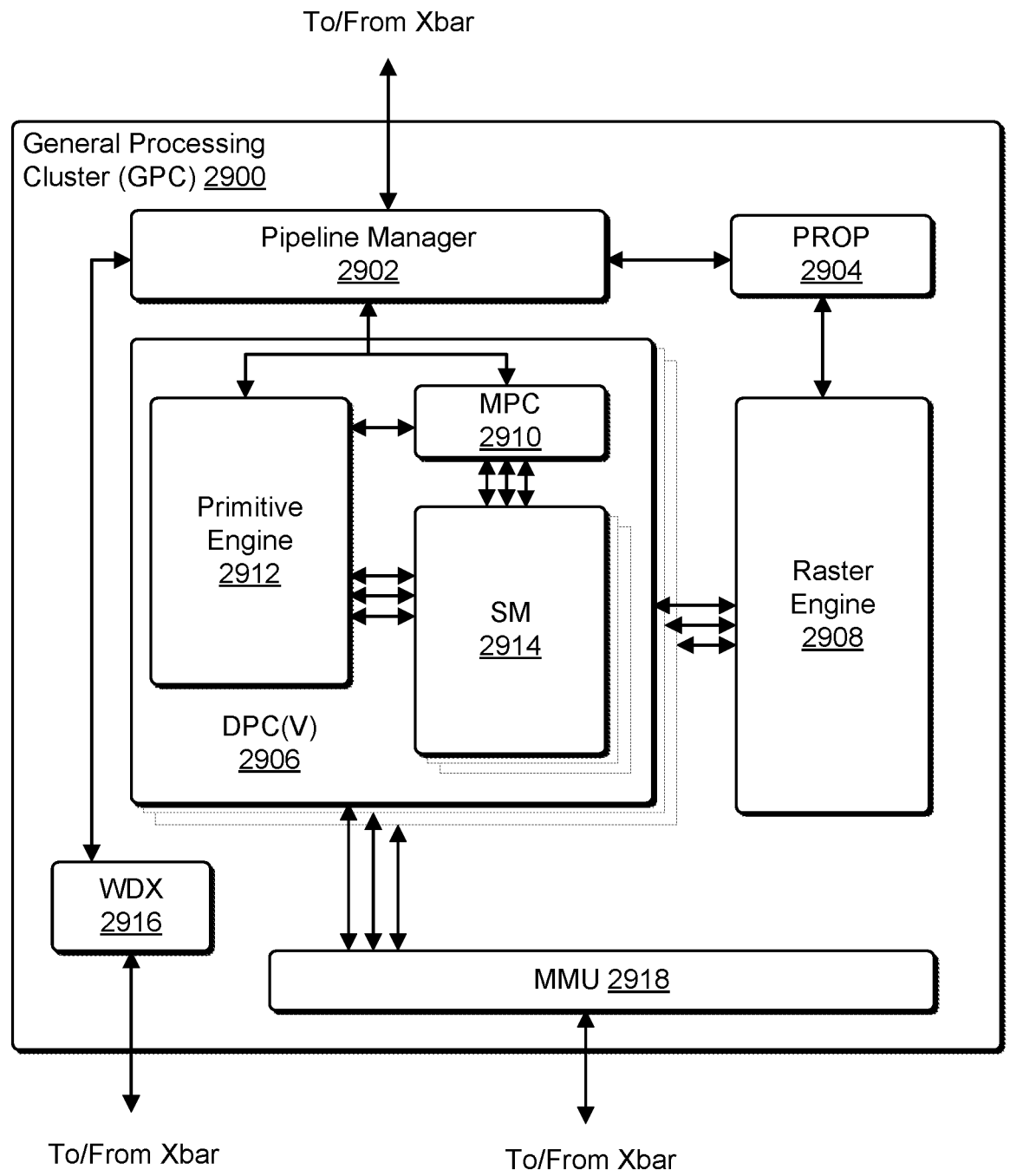
FIG. 29 illustrates a GPC, in accordance with at least one embodiment.

FIG. 29 illustrates a GPC 2900, in accordance with at least one embodiment. In at least one embodiment, GPC 2900 is GPC 2818 of FIG. 28. In at least one embodiment, each GPC 2900 includes, without limitation, a number of hardware units for processing tasks and each GPC 2900 includes, without limitation, a pipeline manager 2902, a pre-raster operations unit ("PROP") 2904, a raster engine 2908, a work distribution crossbar ("WDX") 2916, an MMU 2918, one or more Data Processing Clusters ("DPCs") 2906, and any suitable combination of parts.

In at least one embodiment, operation of GPC 2900 is controlled by pipeline manager 2902. In at least one embodiment, pipeline manager 2902 manages configuration of one or more DPCs 2906 for processing tasks allocated to GPC 2900. In at least one embodiment, pipeline manager 2902 configures at least one of one or more DPCs 2906 to implement at least a portion of a graphics rendering pipeline. In at least one embodiment, DPC 2906 is configured to execute a vertex shader program on a programmable streaming multiprocessor ("SM") 2914. In at least one embodiment, pipeline manager 2902 is configured to route packets received from a work distribution unit to appropriate logical units within GPC 2900 and, in at least one embodiment, some packets may be routed to fixed function hardware units in PROP 2904 and/or raster engine 2908 while other packets may be routed to DPCs 2906 for processing by a primitive engine 2912 or SM 2914. In at least one embodiment, pipeline manager 2902 configures at least one of DPCs 2906 to implement a computing pipeline. In at least one embodiment, pipeline manager 2902 configures at least one of DPCs 2906 to execute at least a portion of a CUDA program.

In at least one embodiment, PROP unit 2904 is configured to route data generated by raster engine 2908 and DPCs 2906 to a Raster Operations ("ROP") unit in a partition unit, such as memory partition unit 2822 described in more detail above in conjunction with FIG. 28. In at least one embodiment, PROP unit 2904 is configured to perform optimizations for color blending, organize pixel data, perform address translations, and more. In at least one embodiment, raster engine 2908 includes, without limitation, a number of fixed function hardware units configured to perform various raster operations and, in at least one embodiment, raster engine 2908 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 2908 comprises fragments to be processed by any suitable entity such as by a fragment shader implemented within DPC 2906.

In at least one embodiment, each DPC 2906 included in GPC 2900 comprise, without limitation, an M-Pipe Controller ("MPC") 2910; primitive engine 2912; one or more SMs 2914; and any suitable combination thereof. In at least one embodiment, MPC 2910 controls operation of DPC 2906, routing packets received from pipeline manager 2902 to appropriate units in DPC 2906. In at least one embodiment, packets associated with a vertex are routed to primitive engine 2912, which is configured to fetch vertex attributes associated with vertex from memory; in contrast, packets associated with a shader program may be transmitted to SM 2914.

In at least one embodiment, SM 2914 comprises, without limitation, a programmable streaming processor that is configured to process tasks represented by a number of threads. In at least one embodiment, SM 2914 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 2914 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 2914 is described in more detail in conjunction with FIG. 30.

In at least one embodiment, MMU 2918 provides an interface between GPC 2900 and a memory partition unit (e.g., partition unit 2822 of FIG. 28) and MMU 2918 provides translation of virtual addresses into physical addresses, memory protection, and arbitration of memory requests. In at least one embodiment, MMU 2918 provides one or more translation lookaside buffers (TLBs) for performing translation of virtual addresses into physical addresses in memory.

Figure 30:
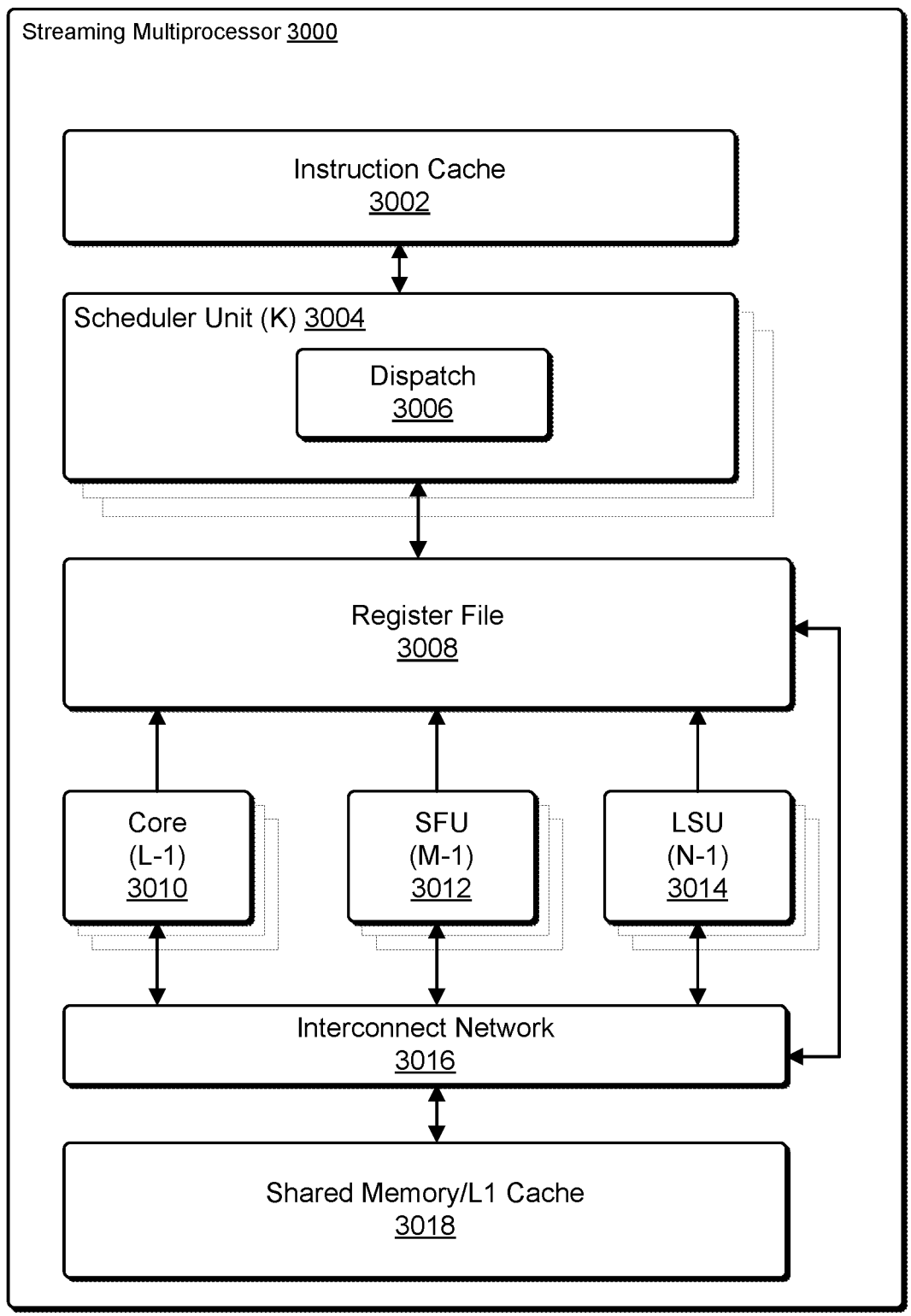
FIG. 30 illustrates a streaming multiprocessor, in accordance with at least one embodiment.

FIG. 30 illustrates a streaming multiprocessor ("SM") 3000, in accordance with at least one embodiment. In at least one embodiment, SM 3000 is SM 2914 of FIG. 29. In at least one embodiment, SM 3000 includes, without limitation, an instruction cache 3002; one or more scheduler units 3004; a register file 3008; one or more processing cores ("cores") 3010; one or more special function units ("SFUs") 3012; one or more LSUs 3014; an interconnect network 3016; a shared memory/L1 cache 3018; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 3000. In at least one embodiment, scheduler unit 3004 receives tasks from a work distribution unit and manages instruction scheduling for one or more thread blocks assigned to SM 3000. In at least one embodiment, scheduler unit 3004 schedules thread blocks for execution as warps of parallel threads, wherein each thread block is allocated at least one warp. In at least one embodiment, each warp executes threads. In at least one embodiment, scheduler unit 3004 manages a plurality of different thread blocks, allocating warps to different thread blocks and then dispatching instructions from a plurality of different cooperative groups to various functional units (e.g., processing cores 3010, SFUs 3012, and LSUs 3014) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 3006 is configured to transmit instructions to one or more of functional units and scheduler unit 3004 includes, without limitation, two dispatch units 3006 that enable two different instructions from same warp to be dispatched during each clock cycle. In at least one embodiment, each scheduler unit 3004 includes a single dispatch unit 3006 or additional dispatch units 3006.

In at least one embodiment, each SM 3000, in at least one embodiment, includes, without limitation, register file 3008 that provides a set of registers for functional units of SM 3000. In at least one embodiment, register file 3008 is divided between each of the functional units such that each functional unit is allocated a dedicated portion of register file 3008. In at least one embodiment, register file 3008 is divided between different warps being executed by SM 3000 and register file 3008 provides temporary storage for operands connected to data paths of functional units. In at least one embodiment, each SM 3000 comprises, without limitation, a plurality of L processing cores 3010. In at least one embodiment, SM 3000 includes, without limitation, a large number (e.g., 128 or more) of distinct processing cores 3010. In at least one embodiment, each processing core 3010 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3010 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 3010. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point a30ition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 3000 comprises, without limitation, M SFUs 3012 that perform special functions (e.g., attribute evaluation, reciprocal square root, and like). In at least one embodiment, SFUs 3012 include, without limitation, a tree traversal unit configured to traverse a hierarchical tree data structure. In at least one embodiment, SFUs 3012 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3000. In at least one embodiment, texture maps are stored in shared memory/L1 cache 3018. In at least one embodiment, texture units implement texture operations such as filtering operations using mip-maps (e.g., texture maps of varying levels of detail). In at least one embodiment, each SM 3000 includes, without limitation, two texture units.

In at least one embodiment, each SM 3000 comprises, without limitation, N LSUs 3014 that implement load and store operations between shared memory/L1 cache 3018 and register file 3008. In at least one embodiment, each SM 3000 includes, without limitation, interconnect network 3016 that connects each of the functional units to register file 3008 and LSU 3014 to register file 3008 and shared memory/L1 cache 3018. In at least one embodiment, interconnect network 3016 is a crossbar that can be configured to connect any of the functional units to any of the registers in register file 3008 and connect LSUs 3014 to register file 3008 and memory locations in shared memory/L1 cache 3018.

In at least one embodiment, shared memory/L1 cache 3018 is an array of on-chip memory that allows for data storage and communication between SM 3000 and a primitive engine and between threads in SM 3000. In at least one embodiment, shared memory/L1 cache 3018 comprises, without limitation, 128 KB of storage capacity and is in a path from SM 3000 to a partition unit. In at least one embodiment, shared memory/L1 cache 3018 is used to cache reads and writes. In at least one embodiment, one or more of shared memory/L1 cache 3018, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 3018 enables shared memory/L1 cache 3018 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 3000 to execute a program and perform calculations, shared memory/L1 cache 3018 to communicate between threads, and LSU 3014 to read and write global memory through shared memory/L1 cache 3018 and a memory partition unit. In at least one embodiment, when configured for general purpose parallel computation, SM 3000 writes commands that scheduler unit 3004 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following FIGS. set forth, without limitation, exemplary software constructs for implementing at least one embodiment.

Figure 31:
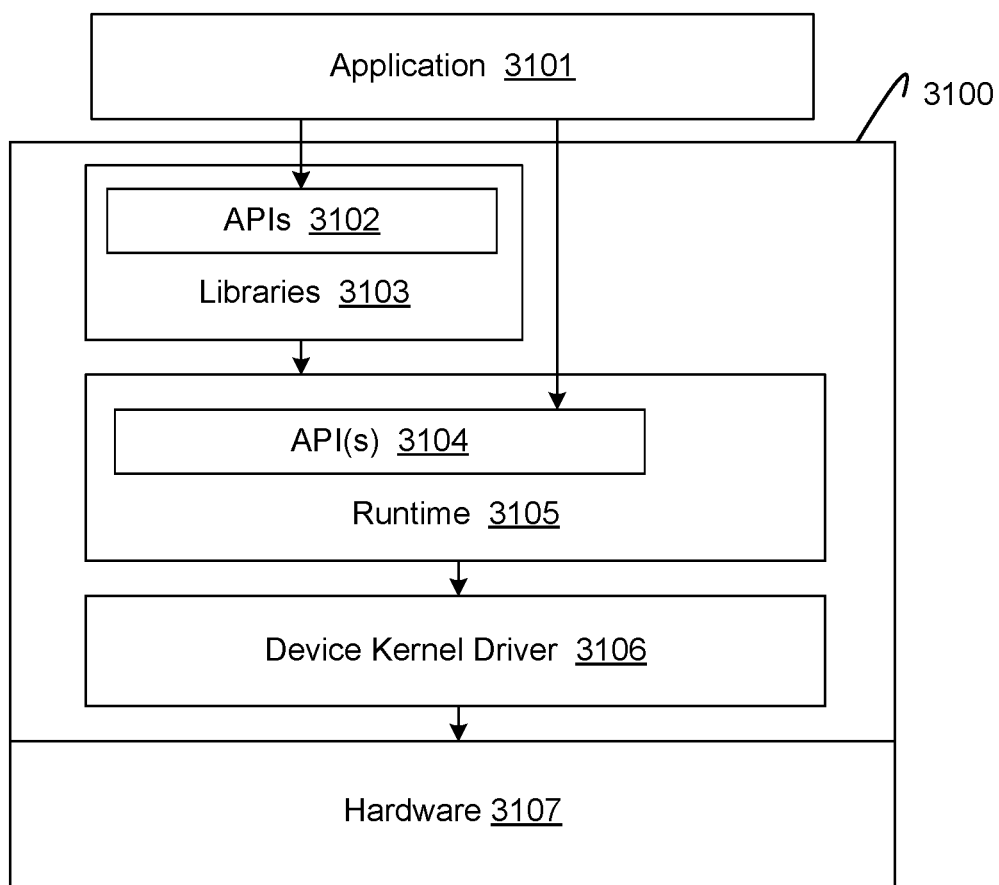
FIG. 31 illustrates a software stack of a programming platform, in accordance with at least one embodiment.

FIG. 31 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 3100 of a programming platform provides an execution environment for an application 3101. In at least one embodiment, application 3101 may include any computer software capable of being launched on software stack 3100. In at least one embodiment, application 3101 may include, but is not limited to, an artificial intelligence ("AI")/machine learning ("ML") application, a high performance computing ("HPC") application, a virtual desktop infrastructure ("VDI"), or a data center workload.

In at least one embodiment, application 3101 and software stack 3100 run on hardware 3107. Hardware 3107 may include one or more GPUs, CPUs, FPGAs, AI engines, and/or other types of compute devices that support a programming platform, in at least one embodiment. In at least one embodiment, such as with CUDA, software stack 3100 may be vendor specific and compatible with only devices from particular vendor(s). In at least one embodiment, such as in with OpenCL, software stack 3100 may be used with devices from different vendors. In at least one embodiment, hardware 3107 includes a host connected to one more devices that can be accessed to perform computational tasks via application programming interface ("API") calls. A device within hardware 3107 may include, but is not limited to, a GPU, FPGA, AI engine, or other compute device (but may also include a CPU) and its memory, as opposed to a host within hardware 3107 that may include, but is not limited to, a CPU (but may also include a compute device) and its memory, in at least one embodiment.

In at least one embodiment, software stack 3100 of a programming platform includes, without limitation, a number of libraries 3103, a runtime 3105, and a device kernel driver 3106. Each of libraries 3103 may include data and programming code that can be used by computer programs and leveraged during software development, in at least one embodiment. In at least one embodiment, libraries 3103 may include, but are not limited to, pre-written code and subroutines, classes, values, type specifications, configuration data, documentation, help data, and/or message templates. In at least one embodiment, libraries 3103 include functions that are optimized for execution on one or more types of devices. In at least one embodiment, libraries 3103 may include, but are not limited to, functions for performing mathematical, deep learning, and/or other types of operations on devices. In at least one embodiment, libraries 3103 are associated with corresponding APIs 3102, which may include one or more APIs, that expose functions implemented in libraries 3103.

In at least one embodiment, application 3101 is written as source code that is compiled into executable code, as discussed in greater detail below in conjunction with FIGS. 36-38. Executable code of application 3101 may run, at least in part, on an execution environment provided by software stack 3100, in at least one embodiment. In at least one embodiment, during execution of application 3101, code may be reached that needs to run on a device, as opposed to a host. In such a case, runtime 3105 may be called to load and launch requisite code on the device, in at least one embodiment. In at least one embodiment, runtime 3105 may include any technically feasible runtime system that is able to support execution of application S01.

In at least one embodiment, runtime 3105 is implemented as one or more runtime libraries associated with corresponding APIs, which are shown as API(s) 3104. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3104 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3106 is configured to facilitate communication with an underlying device. In at least one embodiment, device kernel driver 3106 may provide low-level functionalities upon which APIs, such as API(s) 3104, and/or other software relies. In at least one embodiment, device kernel driver 3106 may be configured to compile intermediate representation ("IR") code into binary code at runtime. For CUDA, device kernel driver 3106 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3106 to compile IR code at runtime.

Figure 32:
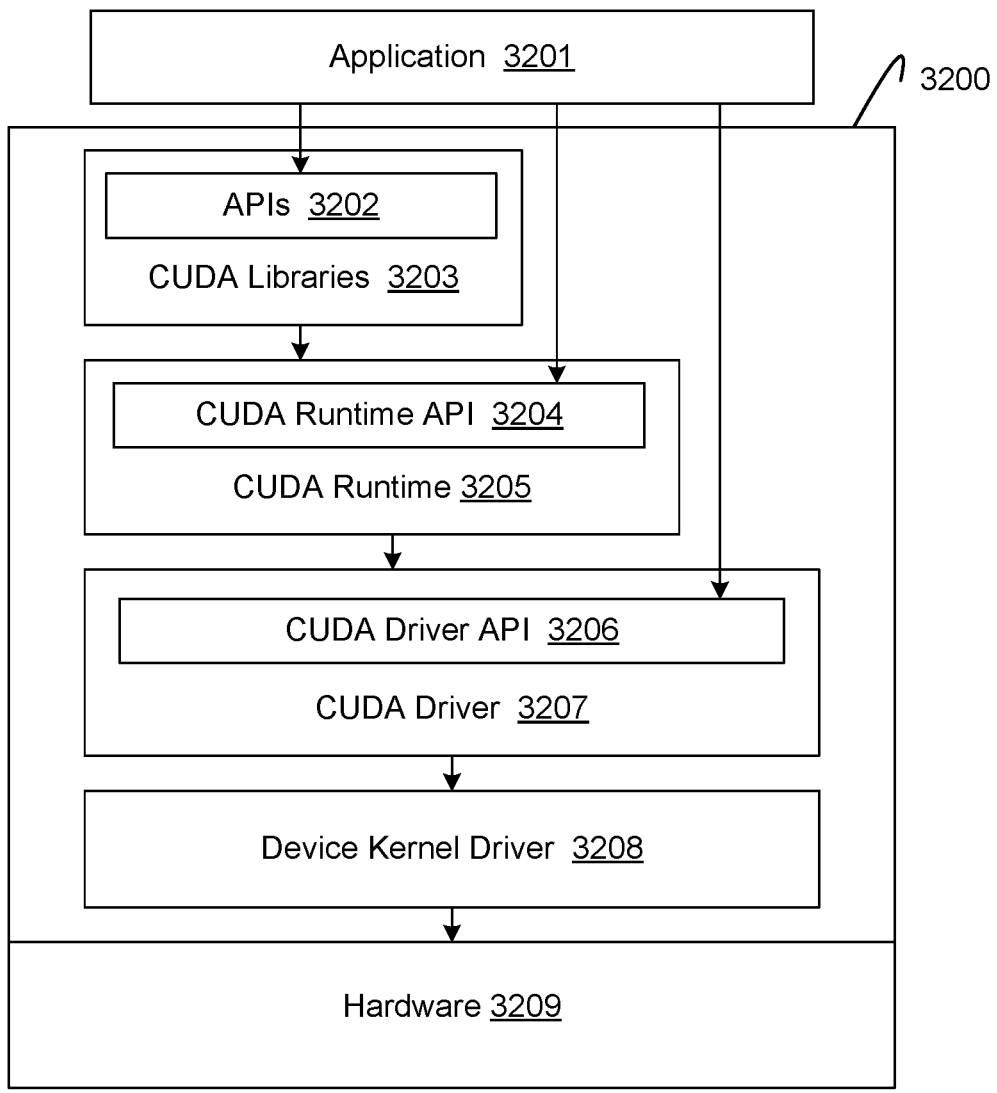
FIG. 32 illustrates a CUDA implementation of a software stack of FIG. 31, in accordance with at least one embodiment.

FIG. 32 illustrates a CUDA implementation of software stack 3100 of FIG. 31, in accordance with at least one embodiment. In at least one embodiment, a CUDA software stack 3200, on which an application 3201 may be launched, includes CUDA libraries 3203, a CUDA runtime 3205, a CUDA driver 3207, and a device kernel driver 3208. In at least one embodiment, CUDA software stack 3200 executes on hardware 3209, which may include a GPU that supports CUDA and is developed by NVIDIA Corporation of Santa Clara, Calif.

In at least one embodiment, application 3201, CUDA runtime 3205, and device kernel driver 3208 may perform similar functionalities as application 3101, runtime 3105, and device kernel driver 3106, respectively, which are described above in conjunction with FIG. 31. In at least one embodiment, CUDA driver 3207 includes a library (libcuda.so) that implements a CUDA driver API 3206. Similar to a CUDA runtime API 3204 implemented by a CUDA runtime library (cudart), CUDA driver API 3206 may, without limitation, expose functions for memory management, execution control, device management, error handling, synchronization, and/or graphics interoperability, among other things, in at least one embodiment. In at least one embodiment, CUDA driver API 3206 differs from CUDA runtime API 3204 in that CUDA runtime API 3204 simplifies device code management by providing implicit initialization, context (analogous to a process) management, and module (analogous to dynamically loaded libraries) management. In contrast to high-level CUDA runtime API 3204, CUDA driver API 3206 is a low-level API providing more fine-grained control of the device, particularly with respect to contexts and module loading, in at least one embodiment. In at least one embodiment, CUDA driver API 3206 may expose functions for context management that are not exposed by CUDA runtime API 3204. In at least one embodiment, CUDA driver API 3206 is also language-independent and supports, e.g., OpenCL in addition to CUDA runtime API 3204. Further, in at least one embodiment, development libraries, including CUDA runtime 3205, may be considered as separate from driver components, including user-mode CUDA driver 3207 and kernel-mode device driver 3208 (also sometimes referred to as a "display" driver).

In at least one embodiment, CUDA libraries 3203 may include, but are not limited to, mathematical libraries, deep learning libraries, parallel algorithm libraries, and/or signal/image/video processing libraries, which parallel computing applications such as application 3201 may utilize. In at least one embodiment, CUDA libraries 3203 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 3203 may include deep learning libraries such as a cuDNN library of primitives for deep neural networks and a TensorRT platform for high-performance deep learning inference, among others.

Figure 33:
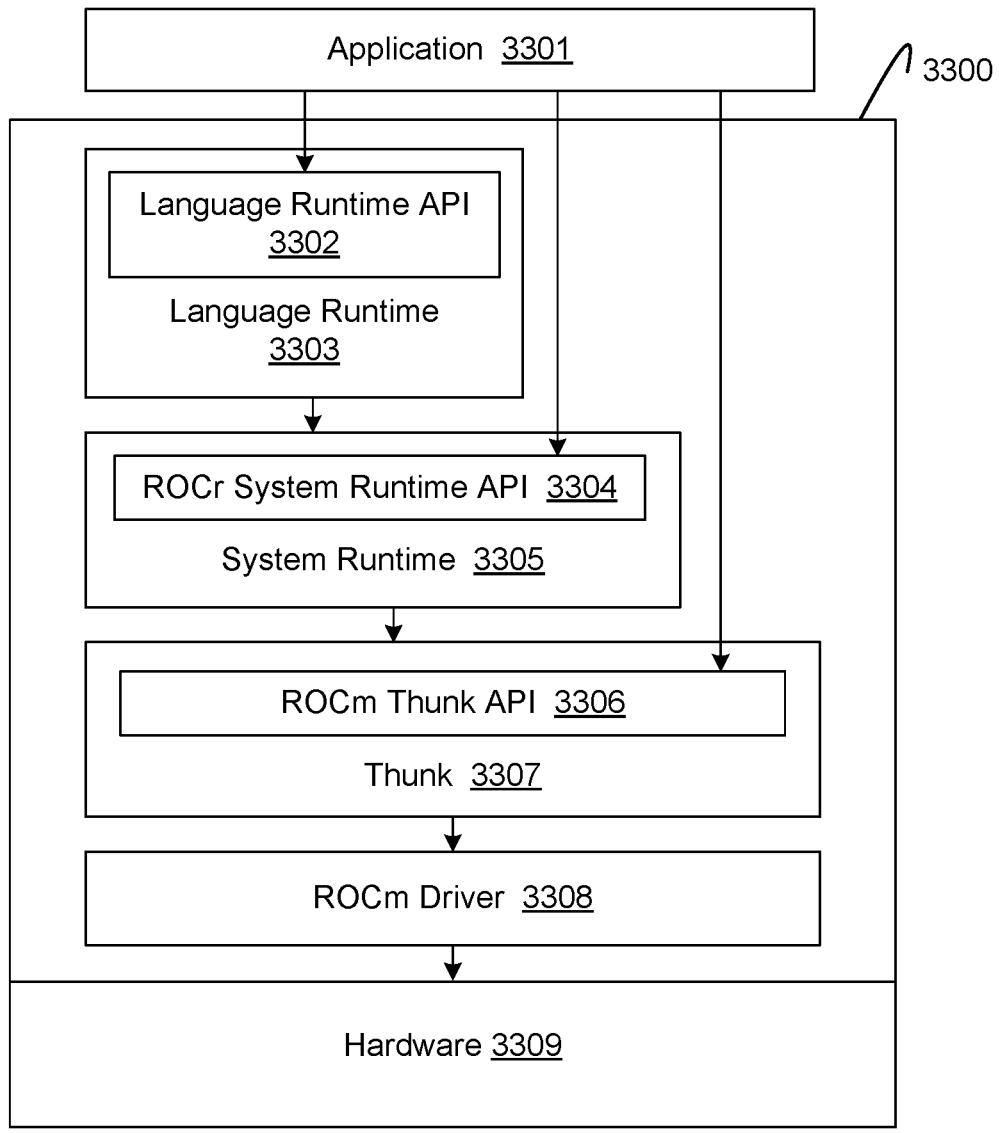
FIG. 33 illustrates a ROCm implementation of a software stack of FIG. 31, in accordance with at least one embodiment.

FIG. 33 illustrates a ROCm implementation of software stack 3100 of FIG. 31, in accordance with at least one embodiment. In at least one embodiment, a ROCm software stack 3300, on which an application 3301 may be launched, includes a language runtime 3303, a system runtime 3305, a thunk 3307, and a ROCm kernel driver 3308. In at least one embodiment, ROCm software stack 3300 executes on hardware 3309, which may include a GPU that supports ROCm and is developed by AMD Corporation of Santa Clara, Calif.

In at least one embodiment, application 3301 may perform similar functionalities as application 3101 discussed above in conjunction with FIG. 31. In addition, language runtime 3303 and system runtime 3305 may perform similar functionalities as runtime 3105 discussed above in conjunction with FIG. 31, in at least one embodiment. In at least one embodiment, language runtime 3303 and system runtime 3305 differ in that system runtime 3305 is a language-independent runtime that implements a ROCr system runtime API 3304 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3305, language runtime 3303 is an implementation of a language-specific runtime API 3302 layered on top of ROCr system runtime API 3304, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 3204 discussed above in conjunction with FIG. 32, such as functions for memory management, execution control, device management, error handling, and synchronization, among other things.

In at least one embodiment, thunk (ROCt) 3307 is an interface 3306 that can be used to interact with underlying ROCm driver 3308. In at least one embodiment, ROCm driver 3308 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 3106 discussed above in conjunction with FIG. 31. In at least one embodiment, HSA kernel driver is a driver permitting different types of processors to share system resources more effectively via hardware features.

In at least one embodiment, various libraries (not shown) may be included in ROCm software stack 3300 above language runtime 3303 and provide functionality similarity to CUDA libraries 3203, discussed above in conjunction with FIG. 32. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 34:
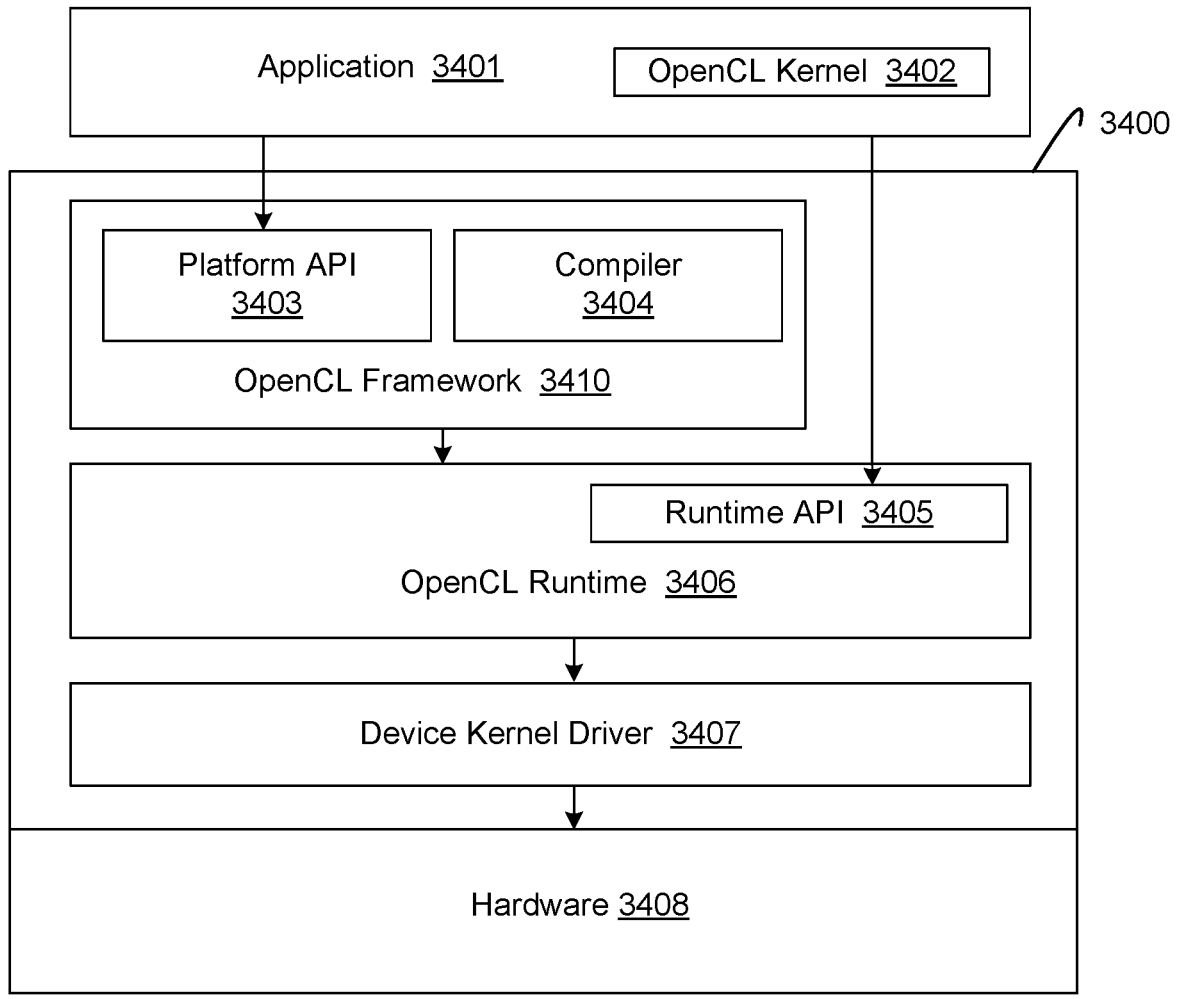
FIG. 34 illustrates an OpenCL implementation of a software stack of FIG. 31, in accordance with at least one embodiment.

FIG. 34 illustrates an OpenCL implementation of software stack 3100 of FIG. 31, in accordance with at least one embodiment. In at least one embodiment, an OpenCL software stack 3400, on which an application 3401 may be launched, includes an OpenCL framework 3410, an OpenCL runtime 3406, and a driver 3407. In at least one embodiment, OpenCL software stack 3400 executes on hardware 3209 that is not vendor-specific. As OpenCL is supported by devices developed by different vendors, specific OpenCL drivers may be required to interoperate with hardware from such vendors, in at least one embodiment.

In at least one embodiment, application 3401, OpenCL runtime 3406, device kernel driver 3407, and hardware 3408 may perform similar functionalities as application 3101, runtime 3105, device kernel driver 3106, and hardware 3107, respectively, that are discussed above in conjunction with FIG. 31. In at least one embodiment, application 3401 further includes an OpenCL kernel 3402 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3403 and runtime API 3405. In at least one embodiment, runtime API 3405 uses contexts to manage execution of kernels on devices. In at least one embodiment, each identified device may be associated with a respective context, which runtime API 3405 may use to manage command queues, program objects, and kernel objects, share memory objects, among other things, for that device. In at least one embodiment, platform API 3403 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3404 is also included in OpenCL frame-work 3410. Source code may be compiled offline prior to executing an application or online during execution of an application, in at least one embodiment. In contrast to CUDA and ROCm, OpenCL applications in at least one embodiment may be compiled online by compiler 3404, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

Figure 35:
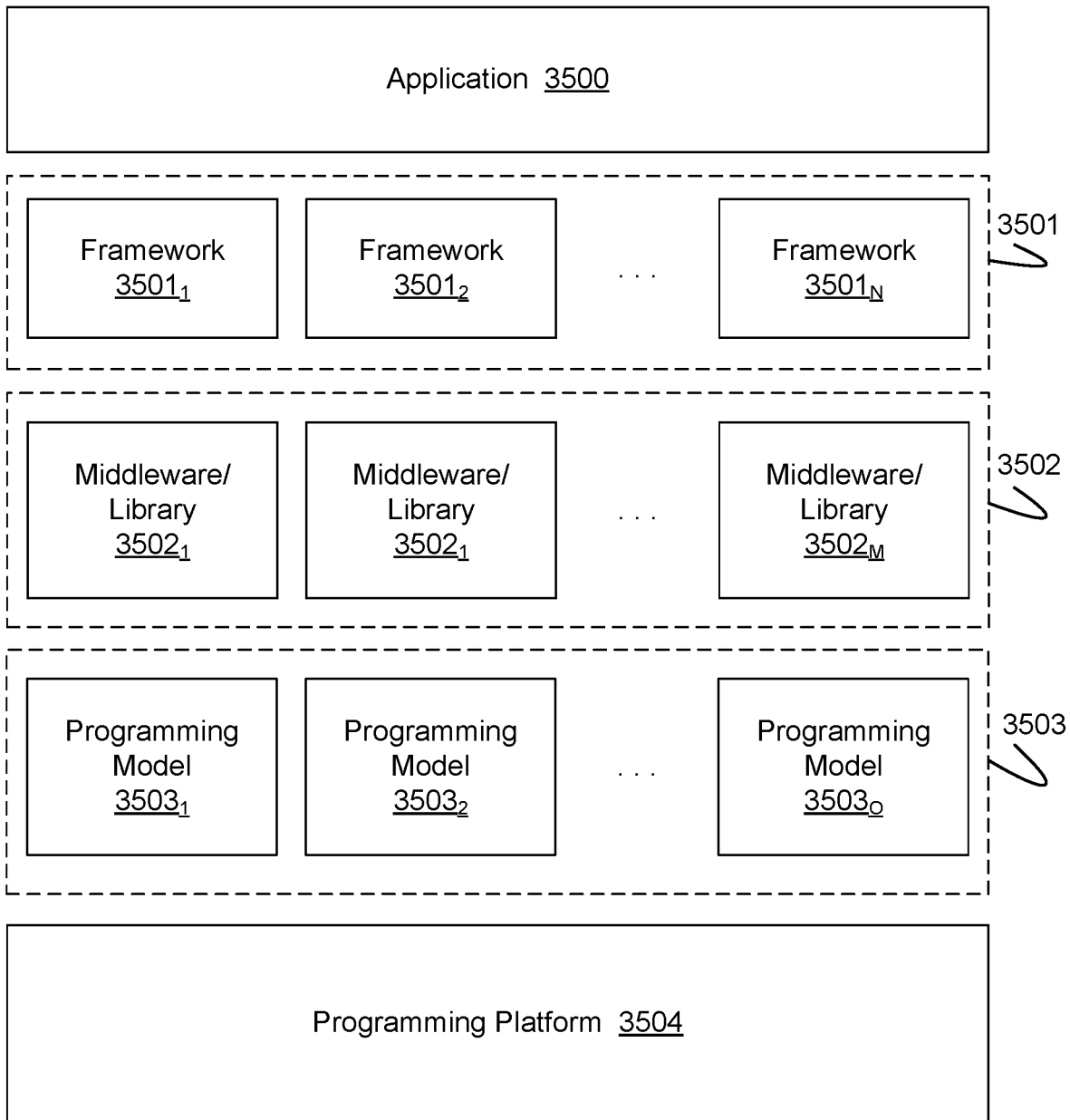
FIG. 35 illustrates software that is supported by a programming platform, in accordance with at least one embodiment.

FIG. 35 illustrates software that is supported by a programming platform, in accordance with at least one embodiment. In at least one embodiment, a programming platform 3504 is configured to support various programming models 3503, middlewares and/or libraries 3502, and frameworks 3501 that an application 3500 may rely upon. In at least one embodiment, application 3500 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDIA Developer Data Loading Library ("DALI") CUDA libraries to provide accelerated computing on underlying hardware.

In at least one embodiment, programming platform 3504 may be one of a CUDA, ROCm, or OpenCL platform described above in conjunction with FIG. 32, FIG. 33, and FIG. 34, respectively. In at least one embodiment, programming platform 3504 supports multiple programming models 3503, which are abstractions of an underlying computing system permitting expressions of algorithms and data structures. Programming models 3503 may expose features of underlying hardware in order to improve performance, in at least one embodiment. In at least one embodiment, programming models 3503 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 3502 provide implementations of abstractions of programming models 3504. In at least one embodiment, such libraries include data and programming code that may be used by computer programs and leveraged during software development. In at least one embodiment, such middlewares include software that provides services to applications beyond those available from programming platform 3504. In at least one embodiment, libraries and/or middlewares 3502 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 3502 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 3501 depend on libraries and/or middlewares 3502. In at least one embodiment, each of application frameworks 3501 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 36:
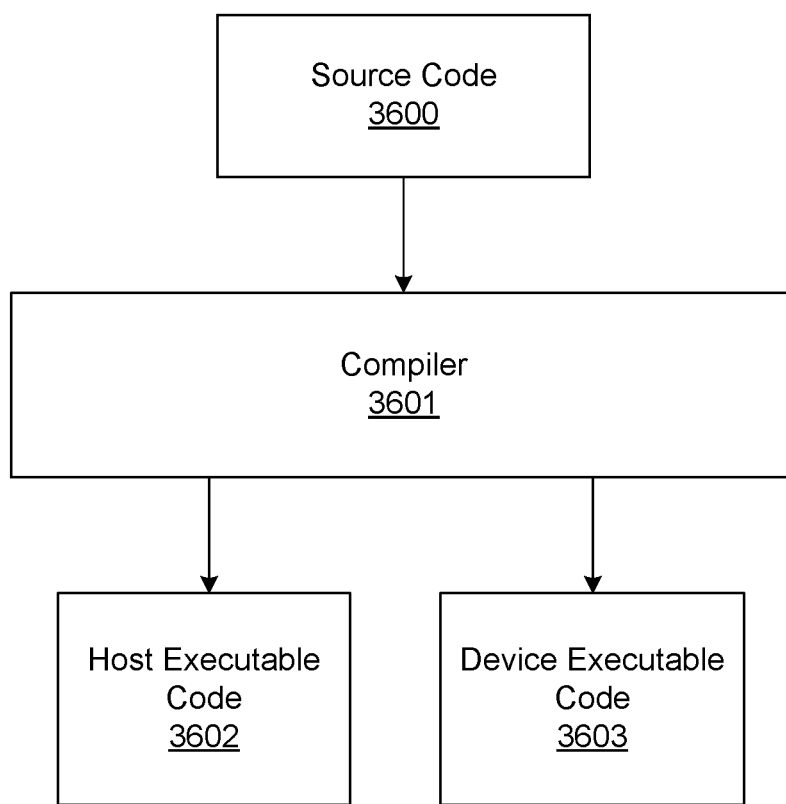
FIG. 36 illustrates compiling code to execute on programming platforms of FIGS. 31-34, in accordance with at least one embodiment.

FIG. 36 illustrates compiling code to execute on one of programming platforms of FIGS. 31-34, in accordance with at least one embodiment. In at least one embodiment, a compiler 3601 receives source code 3600 that includes both host code as well as device code. In at least one embodiment, complier 3601 is configured to convert source code 3600 into host executable code 3602 for execution on a host and device executable code 3603 for execution on a device. In at least one embodiment, source code 3600 may either be compiled offline prior to execution of an application, or online during execution of an application.

In at least one embodiment, source code 3600 may include code in any programming language supported by compiler 3601, such as C++, C, Fortran, etc. In at least one embodiment, source code 3600 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 3600 may include multiple source code files, rather than a single-source file, into which host code and device code are separated.

In at least one embodiment, compiler 3601 is configured to compile source code 3600 into host executable code 3602 for execution on a host and device executable code 3603 for execution on a device. In at least one embodiment, compiler 3601 performs operations including parsing source code 3600 into an abstract system tree (AST), performing optimizations, and generating executable code. In at least one embodiment in which source code 3600 includes a single-source file, compiler 3601 may separate device code from host code in such a single-source file, compile device code and host code into device executable code 3603 and host executable code 3602, respectively, and link device executable code 3603 and host executable code 3602 together in a single file, as discussed in greater detail below with respect to FIG. 37.

In at least one embodiment, host executable code 3602 and device executable code 3603 may be in any suitable format, such as binary code and/or IR code. In the case of CUDA, host executable code 3602 may include native object code and device executable code 3603 may include code in PTX intermediate representation, in at least one embodiment. In the case of ROCm, both host executable code 3602 and device executable code 3603 may include target binary code, in at least one embodiment.

Figure 37:
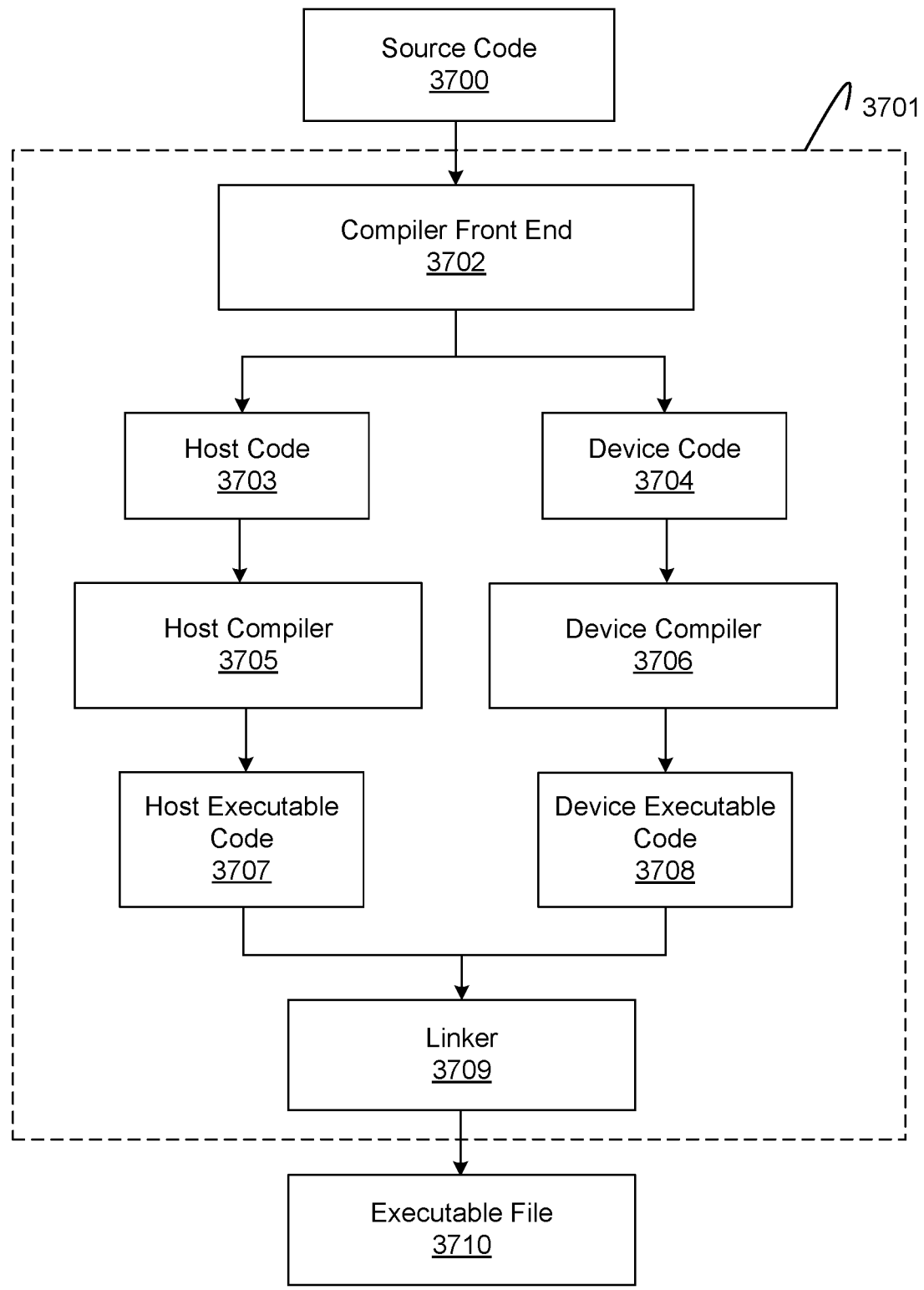
FIG. 37 illustrates in greater detail compiling code to execute on programming platforms of FIGS. 31-34, in accordance with at least one embodiment.

FIG. 37 is a more detailed illustration of compiling code to execute on one of programming platforms of FIGS. 31-34, in accordance with at least one embodiment. In at least one embodiment, a compiler 3701 is configured to receive source code 3700, compile source code 3700, and output an executable file 3710. In at least one embodiment, source code 3700 is a single-source file, such as a .cu file, a .hip.cpp file, or a file in another format, that includes both host and device code. In at least one embodiment, compiler 3701 may be, but is not limited to, an NVIDIA CUDA compiler ("NVCC") for compiling CUDA code in .cu files, or a HCC compiler for compiling HIP code in .hip.cpp files.

In at least one embodiment, compiler 3701 includes a compiler front end 3702, a host compiler 3705, a device compiler 3706, and a linker 3709. In at least one embodiment, compiler front end 3702 is configured to separate device code 3704 from host code 3703 in source code 3700. Device code 3704 is compiled by device compiler 3706 into device executable code 3708, which as described may include binary code or IR code, in at least one embodiment. Separately, host code 3703 is compiled by host compiler 3705 into host executable code 3707, in at least one embodiment. For NVCC, host compiler 3705 may be, but is not limited to, a general purpose C/C++ compiler that outputs native object code, while device compiler 3706 may be, but is not limited to, a Low Level Virtual Machine ("LLVM")-based compiler that forks a LLVM compiler infrastructure and outputs PTX code or binary code, in at least one embodiment. For HCC, both host compiler 3705 and device compiler 3706 may be, but are not limited to, LLVM-based compilers that output target binary code, in at least one embodiment.

Subsequent to compiling source code 3700 into host executable code 3707 and device executable code 3708, linker 3709 links host and device executable code 3707 and 3708 together in executable file 3710, in at least one embodiment. In at least one embodiment, native object code for a host and PTX or binary code for a device may be linked together in an Executable and Linkable Format ("ELF") file, which is a container format used to store object code.

Figure 38:
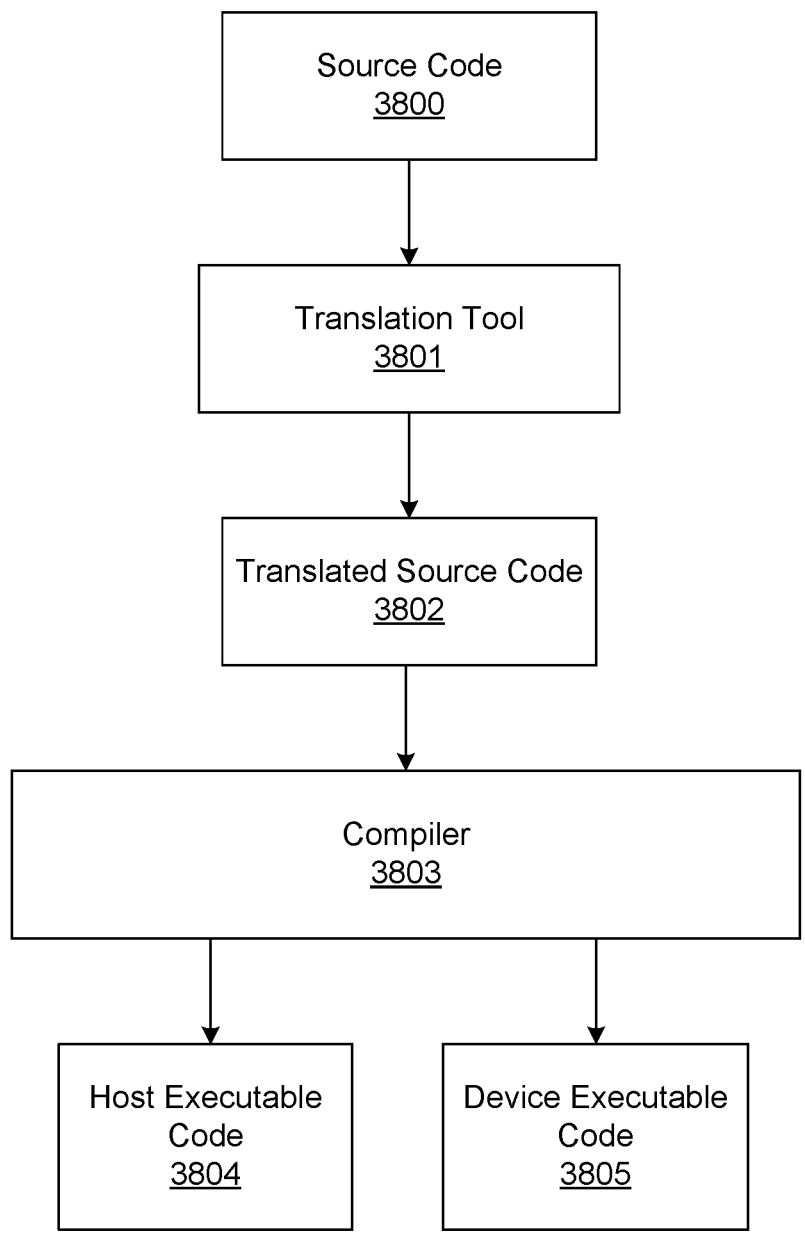
FIG. 38 illustrates translating source code prior to compiling source code, in accordance with at least one embodiment.

FIG. 38 illustrates translating source code prior to compiling source code, in accordance with at least one embodiment. In at least one embodiment, source code 3800 is passed through a translation tool 3801, which translates source code 3800 into translated source code 3802. In at least one embodiment, a compiler 3803 is used to compile translated source code 3802 into host executable code 3804 and device executable code 3805 in a process that is similar to compilation of source code 3600 by compiler 3601 into host executable code 3602 and device executable 3603, as discussed above in conjunction with FIG. 36.

In at least one embodiment, a translation performed by translation tool 3801 is used to port source 3800 for execution in a different environment than that in which it was originally intended to run. In at least one embodiment, translation tool 3801 may include, but is not limited to, a HIP translator that is used to "hipify" CUDA code intended for a CUDA platform into HIP code that can be compiled and executed on a ROCm platform. In at least one embodiment, translation of source code 3800 may include parsing source code 3800 and converting calls to API(s) provided by one programming model (e.g., CUDA) into corresponding calls to API(s) provided by another programming model (e.g., HIP), as discussed in greater detail below in conjunction with FIGS. 39A-40. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 3801 may sometimes be incomplete, requiring additional, manual effort to fully port source code 3800.

Configuring GPUs for General-Purpose Computing

The following FIGS. set forth, without limitation, exemplary architectures for compiling and executing compute source code, in accordance with at least one embodiment.

Figure 39A:
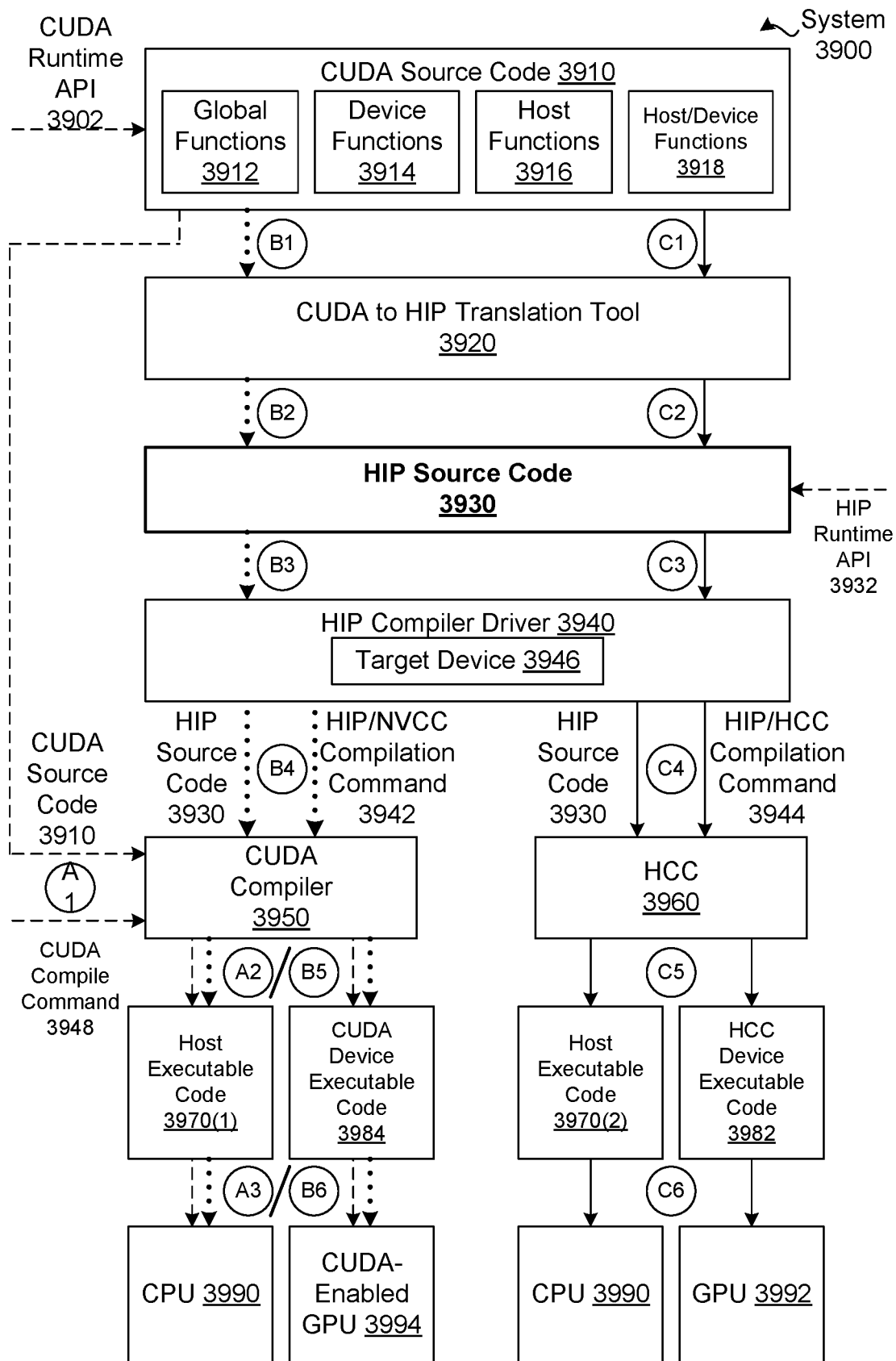
FIG. 39A illustrates a system configured to compile and execute CUDA source code using different types of processing units, in accordance with at least one embodiment.

FIG. 39A illustrates a system 3900 configured to compile and execute CUDA source code 3910 using different types of processing units, in accordance with at least one embodiment. In at least one embodiment, system 3900 includes, without limitation, CUDA source code 3910, a CUDA compiler 3950, host executable code 3970(1), host executable code 3970(2), CUDA device executable code 3984, a CPU 3990, a CUDA-enabled GPU 3994, a GPU 3992, a CUDA to HIP translation tool 3920, HIP source code 3930, a HIP compiler driver 3940, an HCC 3960, and HCC device executable code 3982.

In at least one embodiment, CUDA source code 3910 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 3990, GPU 39192, or another GPGPU, etc. In at least one embodiment, host code is source code that, after compilation, is executable on a host. In at least one embodiment, a host is a processor that is optimized for sequential instruction processing, such as CPU 3990.

In at least one embodiment, CUDA source code 3910 includes, without limitation, any number (including zero) of global functions 3912, any number (including zero) of device functions 3914, any number (including zero) of host functions 3916, and any number (including zero) of host/device functions 3918. In at least one embodiment, global functions 3912, device functions 3914, host functions 3916, and host/device functions 3918 may be mixed in CUDA source code 3910. In at least one embodiment, each of global functions 3912 is executable on a device and callable from a host. In at least one embodiment, one or more of global functions 3912 may therefore act as entry points to a device. In at least one embodiment, each of global functions 3912 is a kernel. In at least one embodiment and in a technique known as dynamic parallelism, one or more of global functions 3912 defines a kernel that is executable on a device and callable from such a device. In at least one embodiment, a kernel is executed N (where N is any positive integer) times in parallel by N different threads on a device during execution.

In at least one embodiment, each of device functions 3914 is executed on a device and callable from such a device only. In at least one embodiment, each of host functions 3916 is executed on a host and callable from such a host only. In at least one embodiment, each of host/device functions 3916 defines both a host version of a function that is executable on a host and callable from such a host only and a device version of the function that is executable on a device and callable from such a device only.

In at least one embodiment, CUDA source code 3910 may also include, without limitation, any number of calls to any number of functions that are defined via a CUDA runtime API 3902. In at least one embodiment, CUDA runtime API 3902 may include, without limitation, any number of functions that execute on a host to allocate and deallocate device memory, transfer data between host memory and device memory, manage systems with multiple devices, etc. In at least one embodiment, CUDA source code 3910 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 3902, a CUDA driver API, APIs for any number of CUDA libraries, etc. In at least one embodiment and relative to CUDA runtime API 3902, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 3950 compiles input CUDA code (e.g., CUDA source code 3910) to generate host executable code 3970(1) and CUDA device executable code 3984. In at least one embodiment, CUDA compiler 3950 is NVCC. In at least one embodiment, host executable code 3970(1) is a compiled version of host code included in input source code that is executable on CPU 3990. In at least one embodiment, CPU 3990 may be any processor that is optimized for sequential instruction processing.

In at least one embodiment, CUDA device executable code 3984 is a compiled version of device code included in input source code that is executable on CUDA-enabled GPU 3994. In at least one embodiment, CUDA device executable code 3984 includes, without limitation, binary code. In at least one embodiment, CUDA device executable code 3984 includes, without limitation, IR code, such as PTX code, that is further compiled at runtime into binary code for a specific target device (e.g., CUDA-enabled GPU 3994) by a device driver. In at least one embodiment, CUDA-enabled GPU 3994 may be any processor that is optimized for parallel instruction processing and that supports CUDA. In at least one embodiment, CUDA-enabled GPU 3994 is developed by NVIDIA Corporation of Santa Clara, Calif.

In at least one embodiment, CUDA to HIP translation tool 3920 is configured to translate CUDA source code 3910 to functionally similar HIP source code 3930. In a least one embodiment, HIP source code 3930 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 3912, but such a HIP programming language may lack support for dynamic parallelism and therefore global functions 3912 defined in HIP code may be callable from a host only.

In at least one embodiment, HIP source code 3930 includes, without limitation, any number (including zero) of global functions 3912, any number (including zero) of device functions 3914, any number (including zero) of host functions 3916, and any number (including zero) of host/device functions 3918. In at least one embodiment, HIP source code 3930 may also include any number of calls to any number of functions that are specified in a HIP runtime API 3932. In at least one embodiment, HIP runtime API 3932 includes, without limitation, functionally similar versions of a subset of functions included in CUDA runtime API 3902. In at least one embodiment, HIP source code 3930 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 3932, a HIP driver API, APIs for any number of HIP libraries, APIs for any number of ROCm libraries, etc.

In at least one embodiment, CUDA to HIP translation tool 3920 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 3920 converts any number of calls to functions specified in CUDA runtime API 3902 to any number of calls to functions specified in HIP runtime API 3932.

In at least one embodiment, CUDA to HIP translation tool 3920 is a tool known as hipify-perl that executes a text-based translation process. In at least one embodiment, CUDA to HIP translation tool 3920 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 3920.

In at least one embodiment, HIP compiler driver 3940 is a front end that determines a target device 3946 and then configures a compiler that is compatible with target device 3946 to compile HIP source code 3930. In at least one embodiment, target device 3946 is a processor that is optimized for parallel instruction processing. In at least one embodiment, HIP compiler driver 3940 may determine target device 3946 in any technically feasible fashion.

In at least one embodiment, if target device 3946 is compatible with CUDA (e.g., CUDA-enabled GPU 3994), then HIP compiler driver 3940 generates a HIP/NVCC compilation command 3942. In at least one embodiment and as described in greater detail in conjunction with FIG. 39B, HIP/NVCC compilation command 3942 configures CUDA compiler 3950 to compile HIP source code 3930 using, without limitation, a HIP to CUDA translation header and a CUDA runtime library. In at least one embodiment and in response to HIP/NVCC compilation command 3942, CUDA compiler 3950 generates host executable code 3970(1) and CUDA device executable code 3984.

In at least one embodiment, if target device 3946 is not compatible with CUDA, then HIP compiler driver 3940 generates a HIP/HCC compilation command 3944. In at least one embodiment and as described in greater detail in conjunction with FIG. 39C, HIP/HCC compilation command 3944 configures HCC 3960 to compile HIP source code 3930 using, without limitation, an HCC header and a HIP/HCC runtime library. In at least one embodiment and in response to HIP/HCC compilation command 3944, HCC 3960 generates host executable code 3970(2) and HCC device executable code 3982. In at least one embodiment, HCC device executable code 3982 is a compiled version of device code included in HIP source code 3930 that is executable on GPU 3992. In at least one embodiment, GPU 3992 may be any processor that is optimized for parallel instruction processing, is not compatible with CUDA, and is compatible with HCC. In at least one embodiment, GPU 3992 is developed by AMD Corporation of Santa Clara, Calif. In at least one embodiment GPU, 3992 is a non-CUDA-enabled GPU 3992.

For explanatory purposes only, three different flows that may be implemented in at least one embodiment to compile CUDA source code 3910 for execution on CPU 3990 and different devices are depicted in FIG. 39A. In at least one embodiment, a direct CUDA flow compiles CUDA source code 3910 for execution on CPU 3990 and CUDA-enabled GPU 3994 without translating CUDA source code 3910 to HIP source code 3930. In at least one embodiment, an indirect CUDA flow translates CUDA source code 3910 to HIP source code 3930 and then compiles HIP source code 3930 for execution on CPU 3990 and CUDA-enabled GPU 3994. In at least one embodiment, a CUDA/HCC flow translates CUDA source code 3910 to HIP source code 3930 and then compiles HIP source code 3930 for execution on CPU 3990 and GPU 3992.

A direct CUDA flow that may be implemented in at least one embodiment is depicted via dashed lines and a series of bubbles annotated A1-A3. In at least one embodiment and as depicted with bubble annotated A1, CUDA compiler 3950 receives CUDA source code 3910 and a CUDA compile command 3948 that configures CUDA compiler 3950 to compile CUDA source code 3910. In at least one embodiment, CUDA source code 3910 used in a direct CUDA flow is written in a CUDA programming language that is based on a programming language other than C++ (e.g., C, Fortran, Python, Java, etc.). In at least one embodiment and in response to CUDA compile command 3948, CUDA compiler 3950 generates host executable code 3970(1) and CUDA device executable code 3984 (depicted with bubble annotated A2). In at least one embodiment and as depicted with bubble annotated A3, host executable code 3970(1) and CUDA device executable code 3984 may be executed on, respectively, CPU 3990 and CUDA-enabled GPU 3994. In at least one embodiment, CUDA device executable code 3984 includes, without limitation, binary code. In at least one embodiment, CUDA device executable code 3984 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 3920 receives CUDA source code 3910. In at least one embodiment and as depicted with bubble annotated B2, CUDA to HIP translation tool 3920 translates CUDA source code 3910 to HIP source code 3930. In at least one embodiment and as depicted with bubble annotated B3, HIP compiler driver 3940 receives HIP source code 3930 and determines that target device 3946 is CUDA-enabled.

In at least one embodiment and as depicted with bubble annotated B4, HIP compiler driver 3940 generates HIP/NVCC compilation command 3942 and transmits both HIP/NVCC compilation command 3942 and HIP source code 3930 to CUDA compiler 3950. In at least one embodiment and as described in greater detail in conjunction with FIG. 39B, HIP/NVCC compilation command 3942 configures CUDA compiler 3950 to compile HIP source code 3930 using, without limitation, a HIP to CUDA translation header and a CUDA runtime library. In at least one embodiment and in response to HIP/NVCC compilation command 3942, CUDA compiler 3950 generates host executable code 3970(1) and CUDA device executable code 3984 (depicted with bubble annotated B5). In at least one embodiment and as depicted with bubble annotated B6, host executable code 3970(1) and CUDA device executable code 3984 may be executed on, respectively, CPU 3990 and CUDA-enabled GPU 3994. In at least one embodiment, CUDA device executable code 3984 includes, without limitation, binary code. In at least one embodiment, CUDA device executable code 3984 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 3920 receives CUDA source code 3910. In at least one embodiment and as depicted with bubble annotated C2, CUDA to HIP translation tool 3920 translates CUDA source code 3910 to HIP source code 3930. In at least one embodiment and as depicted with bubble annotated C3, HIP compiler driver 3940 receives HIP source code 3930 and determines that target device 3946 is not CUDA-enabled.

In at least one embodiment, HIP compiler driver 3940 generates HIP/HCC compilation command 3944 and transmits both HIP/HCC compilation command 3944 and HIP source code 3930 to HCC 3960 (depicted with bubble annotated C4). In at least one embodiment and as described in greater detail in conjunction with FIG. 39C, HIP/HCC compilation command 3944 configures HCC 3960 to compile HIP source code 3930 using, without limitation, an HCC header and a HIP/HCC runtime library. In at least one embodiment and in response to HIP/HCC compilation command 3944, HCC 3960 generates host executable code 3970(2) and HCC device executable code 3982 (depicted with bubble annotated C5). In at least one embodiment and as depicted with bubble annotated C6, host executable code 3970(2) and HCC device executable code 3982 may be executed on, respectively, CPU 3990 and GPU 3992.

In at least one embodiment, after CUDA source code 3910 is translated to HIP source code 3930, HIP compiler driver 3940 may subsequently be used to generate executable code for either CUDA-enabled GPU 3994 or GPU 3992 without re-executing CUDA to HIP translation tool 3920. In at least one embodiment, CUDA to HIP translation tool 3920 translates CUDA source code 3910 to HIP source code 3930 that is then stored in memory. In at least one embodiment, HIP compiler driver 3940 then configures HCC 3960 to generate host executable code 3970(2) and HCC device executable code 3982 based on HIP source code 3930. In at least one embodiment, HIP compiler driver 3940 subsequently configures CUDA compiler 3950 to generate host executable code 3970(1) and CUDA device executable code 3984 based on stored HIP source code 3930.

Figure 39B:
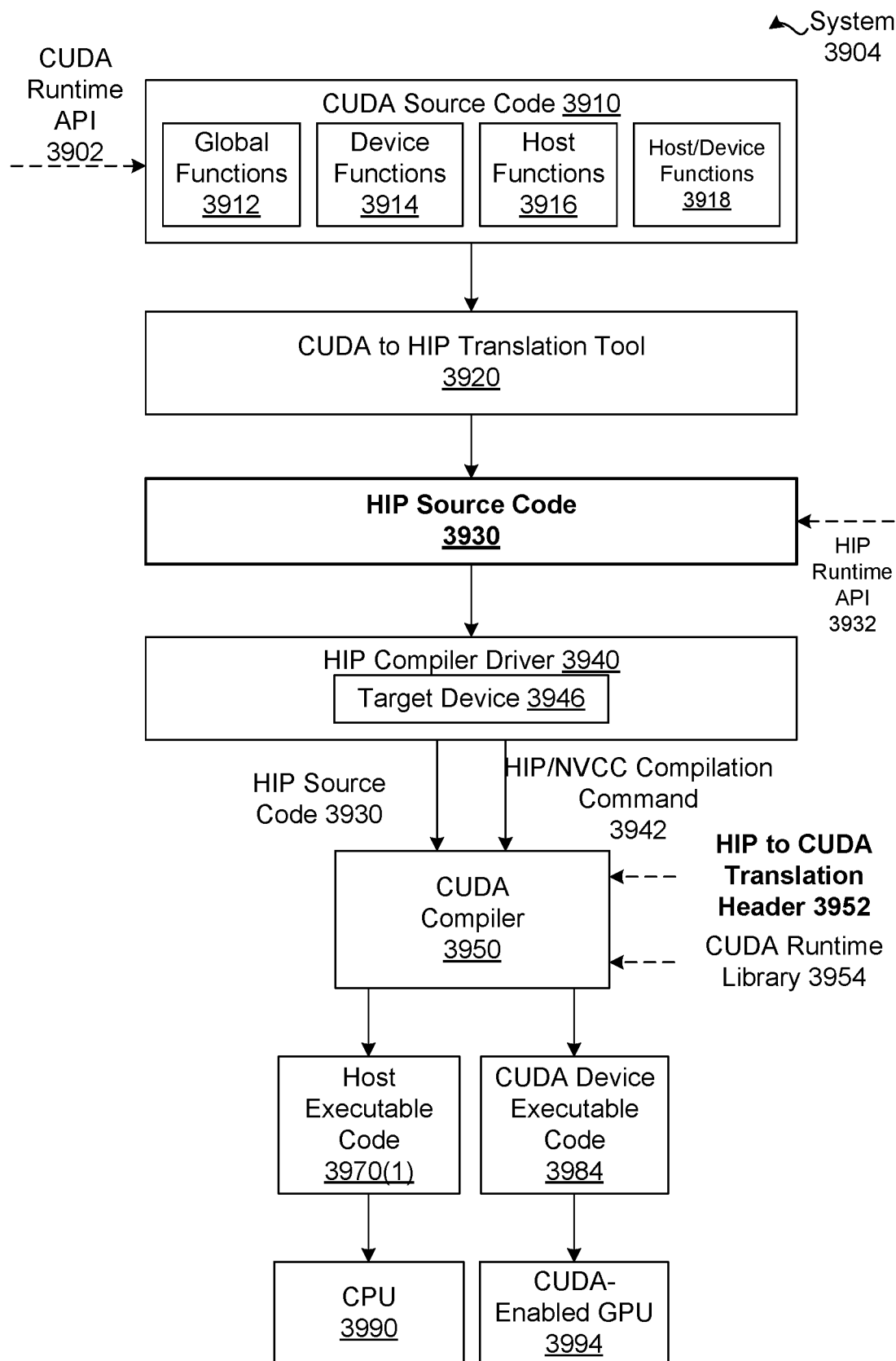
FIG. 39B illustrates a system configured to compile and execute CUDA source code of FIG. 39A using a CPU and a CUDA-enabled GPU, in accordance with at least one embodiment.

FIG. 39B illustrates a system 3904 configured to compile and execute CUDA source code 3910 of FIG. 39A using CPU 3990 and CUDA-enabled GPU 3994, in accordance with at least one embodiment. In at least one embodiment, system 3904 includes, without limitation, CUDA source code 3910, CUDA to HIP translation tool 3920, HIP source code 3930, HIP compiler driver 3940, CUDA compiler 3950, host executable code 3970(1), CUDA device executable code 3984, CPU 3990, and CUDA-enabled GPU 3994.

In at least one embodiment and as described previously herein in conjunction with FIG. 39A, CUDA source code 3910 includes, without limitation, any number (including zero) of global functions 3912, any number (including zero) of device functions 3914, any number (including zero) of host functions 3916, and any number (including zero) of host/device functions 3918. In at least one embodiment, CUDA source code 3910 also includes, without limitation, any number of calls to any number of functions that are specified in any number of CUDA APIs.

In at least one embodiment, CUDA to HIP translation tool 3920 translates CUDA source code 3910 to HIP source code 3930. In at least one embodiment, CUDA to HIP translation tool 3920 converts each kernel call in CUDA source code 3910 from a CUDA syntax to a HIP syntax and converts any number of other CUDA calls in CUDA source code 3910 to any number of other functionally similar HIP calls.

In at least one embodiment, HIP compiler driver 3940 determines that target device 3946 is CUDA-enabled and generates HIP/NVCC compilation command 3942. In at least one embodiment, HIP compiler driver 3940 then configures CUDA compiler 3950 via HIP/NVCC compilation command 3942 to compile HIP source code 3930. In at least one embodiment, HIP compiler driver 3940 provides access to a HIP to CUDA translation header 3952 as part of configuring CUDA compiler 3950. In at least one embodiment, HIP to CUDA translation header 3952 translates any number of mechanisms (e.g., functions) specified in any number of HIP APIs to any number of mechanisms specified in any number of CUDA APIs. In at least one embodiment, CUDA compiler 3950 uses HIP to CUDA translation header 3952 in conjunction with a CUDA runtime library 3954 corresponding to CUDA runtime API 3902 to generate host executable code 3970(1) and CUDA device executable code 3984. In at least one embodiment, host executable code 3970(1) and CUDA device executable code 3984 may then be executed on, respectively, CPU 3990 and CUDA-enabled GPU 3994. In at least one embodiment, CUDA device executable code 3984 includes, without limitation, binary code. In at least one embodiment, CUDA device executable code 3984 includes, without limitation, PTX code and is further compiled into binary code for a specific target device at runtime.

Figure 39C:
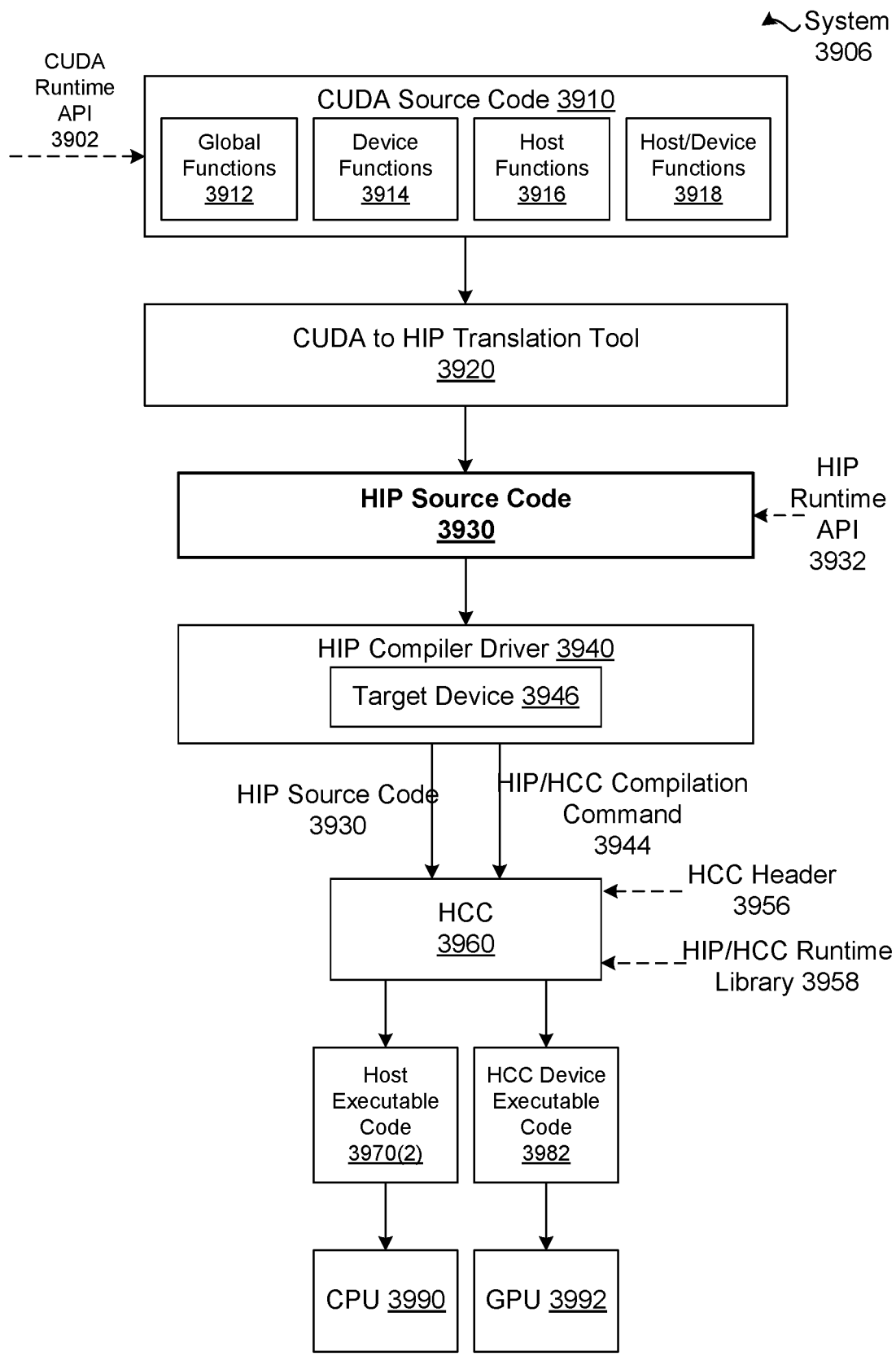
FIG. 39C illustrates a system configured to compile and execute CUDA source code of FIG. 39A using a CPU and a non-CUDA-enabled GPU, in accordance with at least one embodiment.

FIG. 39C illustrates a system 3906 configured to compile and execute CUDA source code 3910 of FIG. 39A using CPU 3990 and non-CUDA-enabled GPU 3992, in accordance with at least one embodiment. In at least one embodiment, system 3906 includes, without limitation, CUDA source code 3910, CUDA to HIP translation tool 3920, HIP source code 3930, HIP compiler driver 3940, HCC 3960, host executable code 3970(2), HCC device executable code 3982, CPU 3990, and GPU 3992.

In at least one embodiment and as described previously herein in conjunction with FIG. 39A, CUDA source code 3910 includes, without limitation, any number (including zero) of global functions 3912, any number (including zero) of device functions 3914, any number (including zero) of host functions 3916, and any number (including zero) of host/device functions 3918. In at least one embodiment, CUDA source code 3910 also includes, without limitation, any number of calls to any number of functions that are specified in any number of CUDA APIs.

In at least one embodiment, CUDA to HIP translation tool 3920 translates CUDA source code 3910 to HIP source code 3930. In at least one embodiment, CUDA to HIP translation tool 3920 converts each kernel call in CUDA source code 3910 from a CUDA syntax to a HIP syntax and converts any number of other CUDA calls in source code 3910 to any number of other functionally similar HIP calls.

In at least one embodiment, HIP compiler driver 3940 subsequently determines that target device 3946 is not CUDA-enabled and generates HIP/HCC compilation command 3944. In at least one embodiment, HIP compiler driver 3940 then configures HCC 3960 to execute HIP/HCC compilation command 3944 to compile HIP source code 3930. In at least one embodiment, HIP/HCC compilation command 3944 configures HCC 3960 to use, without limitation, a HIP/HCC runtime library 3958 and an HCC header 3956 to generate host executable code 3970(2) and HCC device executable code 3982. In at least one embodiment, HIP/HCC runtime library 3958 corresponds to HIP runtime API 3932. In at least one embodiment, HCC header 3956 includes, without limitation, any number and type of interoperability mechanisms for HIP and HCC. In at least one embodiment, host executable code 3970(2) and HCC device executable code 3982 may be executed on, respectively, CPU 3990 and GPU 3992.

Figure 40:
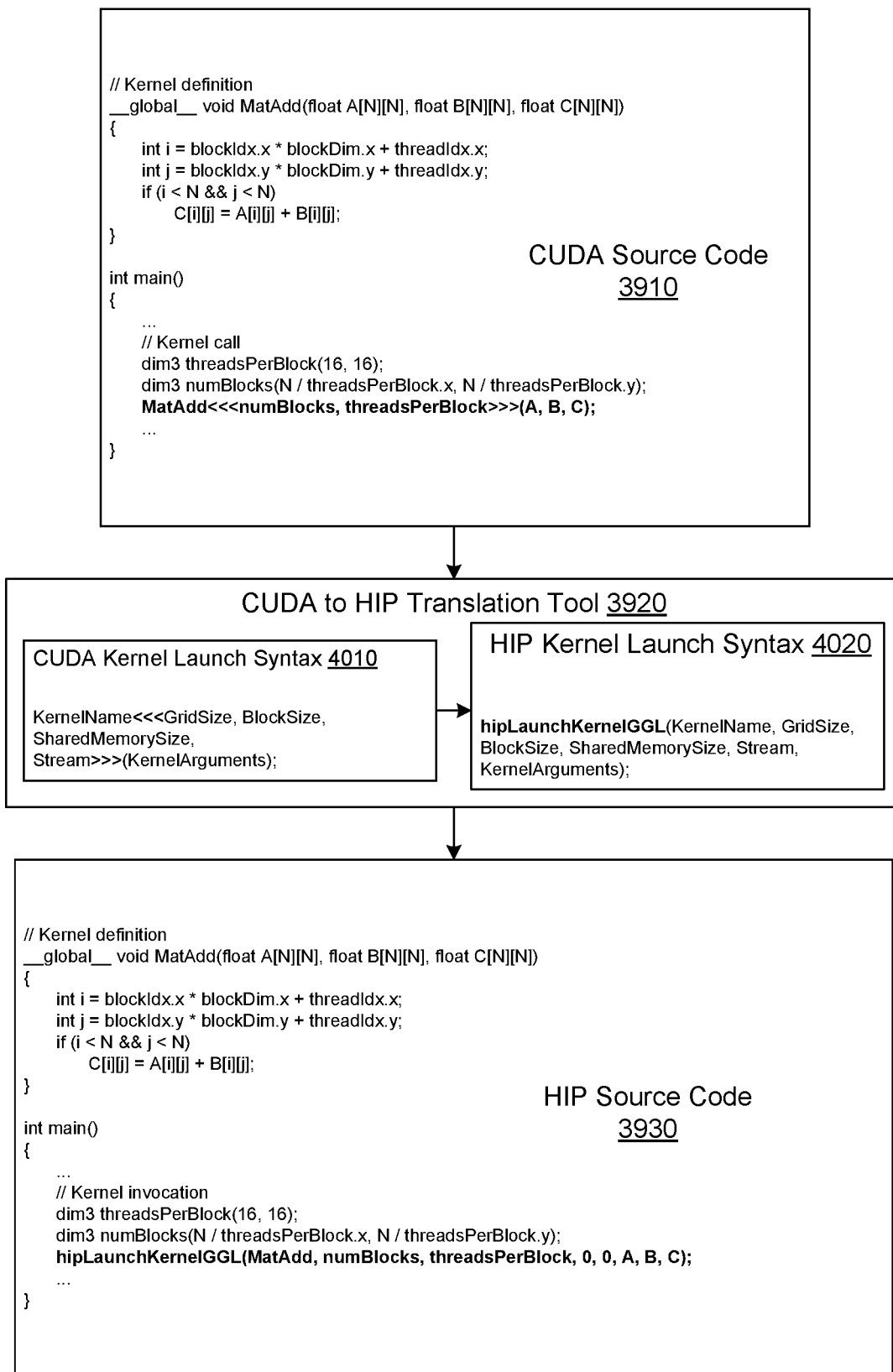
FIG. 40 illustrates an exemplary kernel translated by CUDA-to-HIP translation tool of FIG. 39C, in accordance with at least one embodiment.

FIG. 40 illustrates an exemplary kernel translated by CUDA-to-HIP translation tool 3920 of FIG. 39C, in accordance with at least one embodiment. In at least one embodiment, CUDA source code 3910 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 3910 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 4010. In at least one embodiment, CUDA kernel launch syntax 4010 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 4010 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 4010, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 4010, SharedMemorySize defaults to zero. In at least one embodiment and with respect to CUDA kernel launch syntax 4010, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 3910 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 4010, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 3910 to HIP source code 3930, CUDA to HIP translation tool 3920 translates each kernel call in CUDA source code 3910 from CUDA kernel launch syntax 4010 to a HIP kernel launch syntax 4020 and converts any number of other CUDA calls in source code 3910 to any number of other functionally similar HIP calls. In at least one embodiment, HIP kernel launch syntax 4020 is specified as "hipLaunchKernelGGL(KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 4020 as in CUDA kernel launch syntax 4010 (described previously herein). In at least one embodiment, arguments SharedMemorySize and Stream are required in HIP kernel launch syntax 4020 and are optional in CUDA kernel launch syntax 4010.

In at least one embodiment, a portion of HIP source code 3930 depicted in FIG. 40 is identical to a portion of CUDA source code 3910 depicted in FIG. 40 except for a kernel call that causes kernel MatAdd to execute on a device. In at least one embodiment, kernel MatAdd is defined in HIP source code 3930 with the same "_global_" declaration specifier with which kernel MatAdd is defined in CUDA source code 3910. In at least one embodiment, a kernel call in HIP source code 3930 is "hipLaunchKernelGGL(MatAdd, numBlocks, threadsPerBlock, 0, 0, A, B, C);", while a corresponding kernel call in CUDA source code 3910 is "MatAdd<<<numBlocks, threadsPerBlock>>>(A, B, C);".

Figure 41:
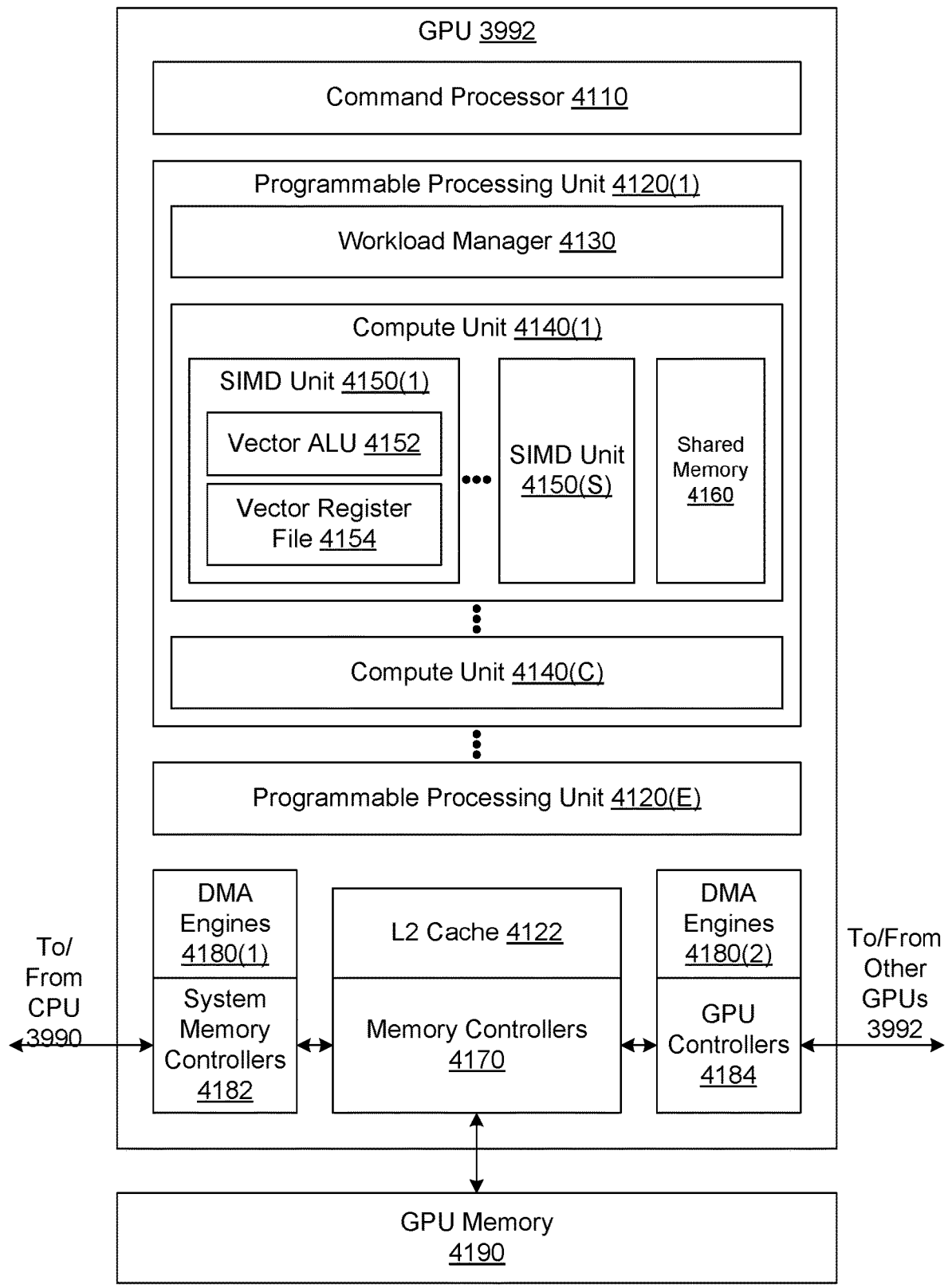
FIG. 41 illustrates non-CUDA-enabled GPU of FIG. 39C in greater detail, in accordance with at least one embodiment.

FIG. 41 illustrates non-CUDA-enabled GPU 3992 of FIG. 39C in greater detail, in accordance with at least one embodiment. In at least one embodiment, GPU 3992 is developed by AMD corporation of Santa Clara. In at least one embodiment, GPU 3992 can be configured to perform compute operations in a highly-parallel fashion. In at least one embodiment, GPU 3992 is configured to execute graphics pipeline operations such as draw commands, pixel operations, geometric computations, and other operations associated with rendering an image to a display. In at least one embodiment, GPU 3992 is configured to execute operations unrelated to graphics. In at least one embodiment, GPU 3992 is configured to execute both operations related to graphics and operations unrelated to graphics. In at least one embodiment, GPU 3992 can be configured to execute device code included in HIP source code 3930.

In at least one embodiment, GPU 3992 includes, without limitation, any number of programmable processing units 4120, a command processor 4110, an L2 cache 4122, memory controllers 4170, DMA engines 4180(1), system memory controllers 4182, DMA engines 4180(2), and GPU controllers 4184. In at least one embodiment, each programmable processing unit 4120 includes, without limitation, a workload manager 4130 and any number of compute units 4140. In at least one embodiment, command processor 4110 reads commands from one or more command queues (not shown) and distributes commands to workload managers 4130. In at least one embodiment, for each programmable processing unit 4120, associated workload manager 4130 distributes work to compute units 4140 included in programmable processing unit 4120. In at least one embodiment, each compute unit 4140 may execute any number of thread blocks, but each thread block executes on a single compute unit 4140. In at least one embodiment, a workgroup is a thread block.

In at least one embodiment, each compute unit 4140 includes, without limitation, any number of SIMD units 4150 and a shared memory 4160. In at least one embodiment, each SIMD unit 4150 implements a SIMD architecture and is configured to perform operations in parallel. In at least one embodiment, each SIMD unit 4150 includes, without limitation, a vector ALU 4152 and a vector register file 4154. In at least one embodiment, each SIMD unit 4150 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4160.

In at least one embodiment, programmable processing units 4120 are referred to as "shader engines." In at least one embodiment, each programmable processing unit 4120 includes, without limitation, any amount of dedicated graphics hardware in addition to compute units 4140. In at least one embodiment, each programmable processing unit 4120 includes, without limitation, any number (including zero) of geometry processors, any number (including zero) of rasterizers, any number (including zero) of render back ends, workload manager 4130, and any number of compute units 4140.

In at least one embodiment, compute units 4140 share L2 cache 4122. In at least one embodiment, L2 cache 4122 is partitioned. In at least one embodiment, a GPU memory 4190 is accessible by all compute units 4140 in GPU 3992. In at least one embodiment, memory controllers 4170 and system memory controllers 4182 facilitate data transfers between GPU 3992 and a host, and DMA engines 4180(1) enable asynchronous memory transfers between GPU 3992 and such a host. In at least one embodiment, memory controllers 4170 and GPU controllers 4184 facilitate data transfers between GPU 3992 and other GPUs 3992, and DMA engines 4180(2) enable asynchronous memory transfers between GPU 3992 and other GPUs 3992.

In at least one embodiment, GPU 3992 includes, without limitation, any amount and type of system interconnect that facilitates data and control transmissions across any number and type of directly or indirectly linked components that may be internal or external to GPU 3992. In at least one embodiment, GPU 3992 includes, without limitation, any number and type of I/O interfaces (e.g., PCIe) that are coupled to any number and type of peripheral devices. In at least one embodiment, GPU 3992 may include, without limitation, any number (including zero) of display engines and any number (including zero) of multimedia engines. In at least one embodiment, GPU 3992 implements a memory subsystem that includes, without limitation, any amount and type of memory controllers (e.g., memory controllers 4170 and system memory controllers 4182) and memory devices (e.g., shared memories 4160) that may be dedicated to one component or shared among multiple components. In at least one embodiment, GPU 3992 implements a cache subsystem that includes, without limitation, one or more cache memories (e.g., L2 cache 4122) that may each be private to or shared between any number of components (e.g., SIMD units 4150, compute units 4140, and programmable processing units 4120).

Figure 42:
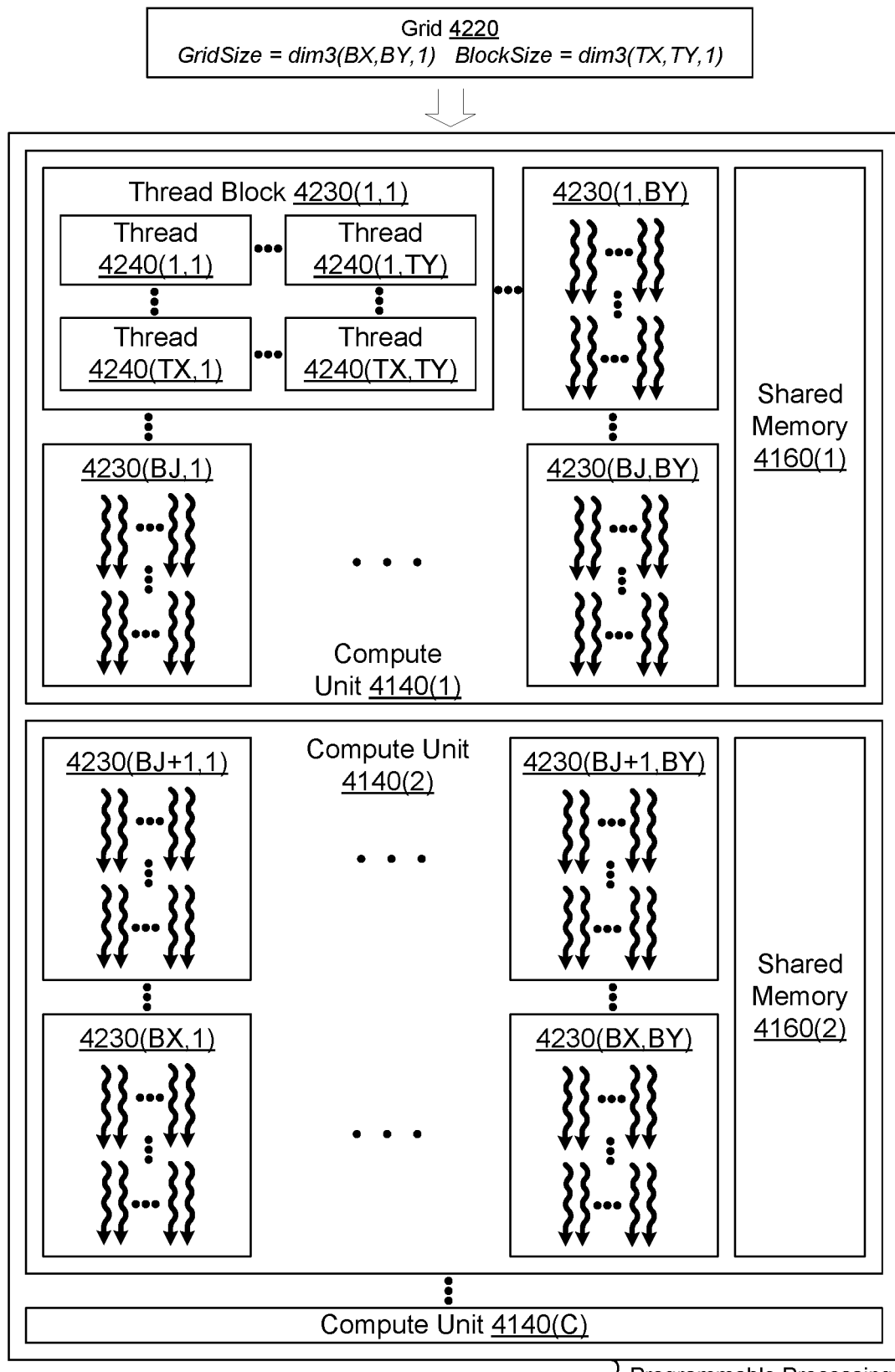
FIG. 42 illustrates how threads of an exemplary CUDA grid are mapped to different compute units of FIG. 41, in accordance with at least one embodiment.

FIG. 42 illustrates how threads of an exemplary CUDA grid 4220 are mapped to different compute units 4140 of FIG. 41, in accordance with at least one embodiment. In at least one embodiment and for explanatory purposes only, grid 4220 has a GridSize of BX by BY by 1 and a BlockSize of TX by TY by 1. In at least one embodiment, grid 4220 therefore includes, without limitation, (BX*BY) thread blocks 4230 and each thread block 4230 includes, without limitation, (TX*TY) threads 4240. Threads 4240 are depicted in FIG. 42 as squiggly arrows.

In at least one embodiment, grid 4220 is mapped to programmable processing unit 4120(1) that includes, without limitation, compute units 4140(1)-4140(C). In at least one embodiment and as shown, (BJ*BY) thread blocks 4230 are mapped to compute unit 4140(1), and the remaining thread blocks 4230 are mapped to compute unit 4140(2). In at least one embodiment, each thread block 4230 may include, without limitation, any number of warps, and each warp is mapped to a different SIMD unit 4150 of FIG. 41.

In at least one embodiment, warps in a given thread block 4230 may synchronize together and communicate through shared memory 4160 included in associated compute unit 4140. For example and in at least one embodiment, warps in thread block 4230(BJ,1) can synchronize together and communicate through shared memory 4160(1). For example and in at least one embodiment, warps in thread block 4230(BJ+1,1) can synchronize together and communicate through shared memory 4160(2).

Figure 43:
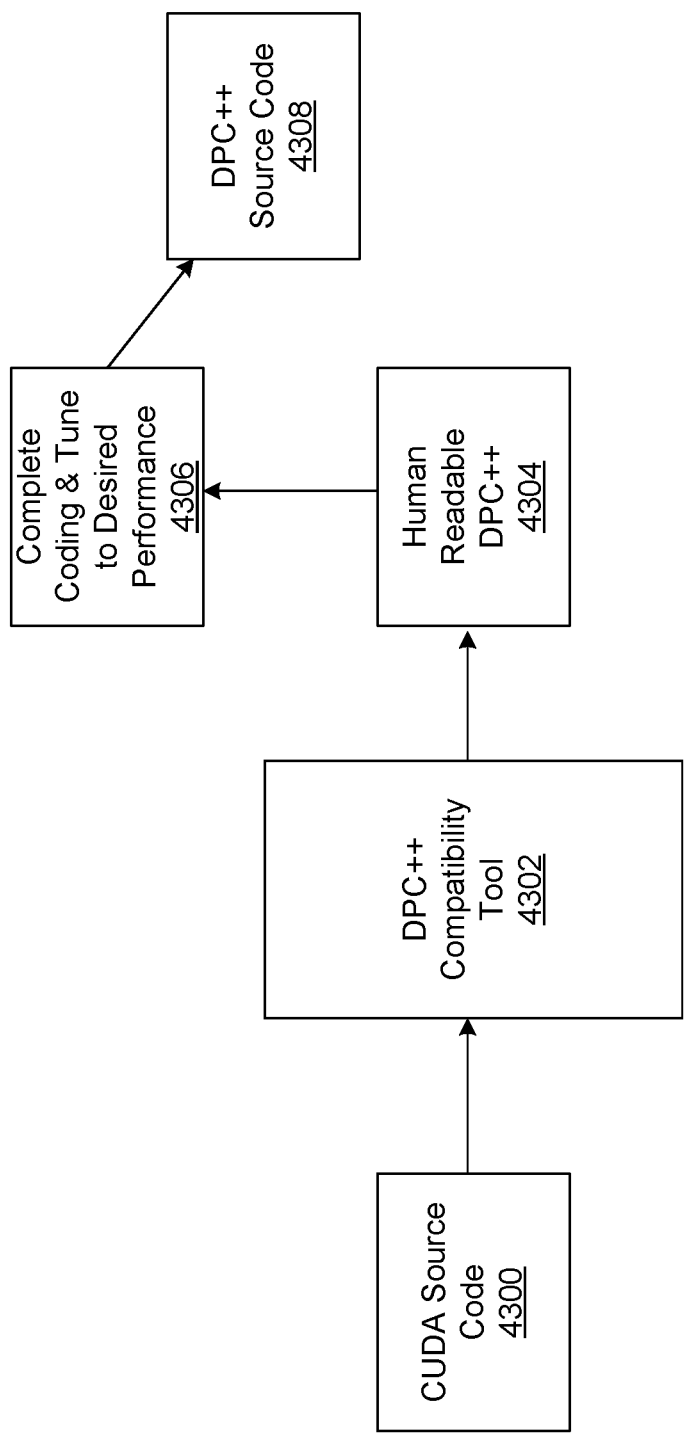
FIG. 43 illustrates how to migrate existing CUDA code to Data Parallel C++ code, in accordance with at least one embodiment.

FIG. 43 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 4300 is provided as an input to a DPC++ compatibility tool 4302 to generate human readable DPC++ 4304. In at least one embodiment, human readable DPC++ 4304 includes inline comments generated by DPC++ compatibility tool 4302 that guides a developer on how and/or where to modify DPC++ code to complete coding and tuning to desired performance 4306, thereby generating DPC++ source code 4308.

In at least one embodiment, CUDA source code 4300 is or includes a collection of human-readable source code in a CUDA programming language. In at least one embodiment, CUDA source code 4300 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 4300 described in connection with FIG. 43 may be in accordance with those discussed elsewhere in this document.

In at least one embodiment, DPC++ compatibility tool 4302 refers to an executable tool, program, application, or any other suitable type of tool that is used to facilitate migration of CUDA source code 4300 to DPC++ source code 4308. In at least one embodiment, DPC++ compatibility tool 4302 is a command-line-based code migration tool available as part of a DPC++ tool kit that is used to port existing CUDA sources to DPC++. In at least one embodiment, DPC++ compatibility tool 4302 converts some or all source code of a CUDA application from CUDA to DPC++ and generates a resulting file that is written at least partially in DPC++, referred to as human readable DPC++ 4304. In at least one embodiment, human readable DPC++ 4304 includes comments that are generated by DPC++ compatibility tool 4302 to indicate where user intervention may be necessary. In at least one embodiment, user intervention is necessary when CUDA source code 4300 calls a CUDA API that has no analogous DPC++ API; other examples where user intervention is required are discussed later in greater detail.

In at least one embodiment, a workflow for migrating CUDA source code 4300 (e.g., application or portion thereof) includes creating one or more compilation database files; migrating CUDA to DPC++ using a DPC++ compatibility tool 4302; completing migration and verifying correctness, thereby generating DPC++ source code 4308; and compiling DPC++ source code 4308 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 4302 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 4302 migrates CUDA code (e.g., applications) written in CUDA to DPC++ by generating DPC++ wherever possible. In at least one embodiment, DPC++ compatibility tool 4302 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 4302 to migrate CUDA code to DPC++. In at least one embodiment, non-CUDA C++ code and files are migrated as is. In at least one embodiment, DPC++ compatibility tool 4302 generates human readable DPC++ 4304 which may be DPC++ code that, as generated by DPC++ compatibility tool 4302, cannot be compiled by DPC++ compiler and requires additional plumbing for verifying portions of code that were not migrated correctly, and may involve manual intervention, such as by a developer. In at least one embodiment, DPC++ compatibility tool 4302 provides hints or tools embedded in code to help developers manually migrate additional code that could not be migrated automatically. In at least one embodiment, migration is a one-time activity for a source file, project, or application.

In at least one embodiment, DPC++ compatibility tool 43002 is able to successfully migrate all portions of CUDA code to DPC++ and there may simply be an optional step for manually verifying and tuning performance of DPC++ source code that was generated. In at least one embodiment, DPC++ compatibility tool 4302 directly generates DPC++ source code 4308 which is compiled by a DPC++ compiler without requiring or utilizing human intervention to modify DPC++ code generated by DPC++ compatibility tool 4302. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 4302. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[] global__ void VectorAddKernel(float* A, float* B, float* C)
{
   A[threadIdx.x] = threadIdx.x + 1.0f;
   B[threadIdx.x] = threadIdx.x + 1.0f;
   C[threadIdx.x] = A[threadIdx.x] + B[threadIdx.x];
}
int main( )
{
   float *d_A, *d_B, *d_C;
   cudaMalloc(&d_A, VECTOR_SIZE*sizeof(float));
   cudaMalloc(&d_B, VECTOR_SIZE*sizeof(float));
   cudaMalloc(&d_C, VECTOR_SIZE*sizeof(float));
   VectorAddKernel<<<1, VECTOR_SIZE>>>(d_A, d_B, d_C);
   float Result[VECTOR_SIZE] = { };
   cudaMemcpy(Result, d_C, VECTOR_SIZE*sizeof(float),
cudaMemcpyDeviceToHost);
   cudaFree(d_A);
   cudaFree(d_B);
   cudaFree(d_C);
   for (int i=0; i<VECTOR_SIZE; i++ {
      if (i % 16 == 0) {
         printf("\n");
      }
      printf("%f", Result[i]);
   }
   return 0;
}
```

In at least one embodiment and in connection with CUDA source file presented above, DPC++ compatibility tool 4302 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 4302 converts CUDA thread IDs used to index work elements to SYCL standard addressing for work elements via a local ID as part of migrating CUDA code to DPC++ code. In at least one embodiment, DPC++ code generated by DPC++ compatibility tool 4302 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 4302. In at least one embodiment, DPC++ compatibility tool 4302 modify CUDA APIs for memory setup and/or host calls to execute kernel on the acceleration device. In at least one embodiment and in connection with CUDA source file presented above, a corresponding human readable DPC++ 4304 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
                     sycl::nd_item<3> item_ct1)
{
  A[item_ct1.get_local_id(2)] = item_ct1.get_local_id(2) + 1.0f;
  B[item_ct1.get_local_id(2)] = item_ct1.get_local_id(2) + 1.0f;
  C[item_ct1.get_local_id(2)] =
      A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
                          dpct::get_current_device ( ),
                          dpct::get_default_context( ));
  d_B = (float *)sycl::malloc_device(VECTOR_SIZE * sizeof(float),
                          dpct::get_current_device( ),
                          dpct::get_default_context( ));
  d_C = (float *)sycl::malloc_device(VECTOR_SIZE * sizeof(float),
                          dpct::get_current_device( ),
                          dpct::get_default_context( ));
  dpct::get_default_queue_wait( ).submit([&](sycl::handler &cgh) {
    cgh.parallel_for(
        sycl::nd_range<3>(sycl::range<3>(1, 1, 1) *
                          sycl::range<3>(1, 1, VECTOR_SIZE) *
                          sycl::range<3>(1, 1, VECTOR_SIZE)),
        [=](sycl::nd_items<3> item_ct1) {
           VectorAddKernel(d_A, d_B, d_C, item_ct1);
        });
  });
  float Result[VECTOR_SIZE] = { };
  dpct::get_default_queue_wait( )
      .memcpy(Result, d_C, VECTOR_SIZE * sizeof(float))
      .wait( );
  sycl::free(d_A, dpct::get_default_context( ));
  sycl::free(d_B, dpct::get_default_context( ));
  sycl::free(d_C, dpct::get_default_context( ));
  for (int i=0; i<VECTOR_SIZE; i++ {
    if (i % 16 == 0) {
      printf("\n");
    }
    printf("%f", Result[i]);
  }
  return 0;
}
```

In at least one embodiment, human readable DPC++ 4304 refers to output generated by DPC++ compatibility tool 4302 and may be optimized in one manner or another. In at least one embodiment, human readable DPC++ 4304 generated by DPC++ compatibility tool 4302 can be manually edited by a developer after migration to make it more maintainable, performance, or other considerations. In at least one embodiment, DPC++ code generated by DPC++ compatibility tool 43002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 4302 replace uses of unified shared memory with accessors. In at least one embodiment, DPC++ compatibility tool 4302 has an option to change how it migrates CUDA code to DPC++ code. In at least one embodiment, DPC++ compatibility tool 4302 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 4302; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). Number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. Set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

At least one embodiment of the disclosure can be described in view of the following clauses:
1. A system, comprising:
   at least one processor;
   at least one memory comprising instructions that, in response to execution by the at least one processor, cause the system to at least:

select a set of lights from among a plurality of lights associated with a virtual scene, the set of lights selected based, at least in part, on a first one or more random factors;

select, based at least in part on a second one or more random factors, a subset of lights from the set of lights, the subset of lights to be used to generate a frame of graphics, wherein the subset of lights is selected so that data indicative of the subset has a total size less than memory predicted to be available in a processor cache; and render a pixel of the frame of graphics based, at least in part, on the subset of lights.

2. The system of clause 1, the at least one memory comprising further instructions that, in response to execution by the at least one processor, cause the system to at least:

select an additional set of lights to use to generate an additional frame of graphics, the additional set of lights selected from among the plurality of lights associated with the virtual scene.

3. The system of clauses 1 or 2, the at least one memory comprising further instructions that, in response to execution by the at least one processor, cause the system to at least:

render a second pixel of the frame of graphics using a second subset of lights selected from the set of lights.

4. The system of any of clauses 1-3, wherein the pixel is one of a plurality of pixels in a first tile of the frame of graphics, and wherein pixels in a second tile are rendered using a different subset of lights.

5. The system of any of clauses 1-4, the at least one memory comprising further instructions that, in response to execution by the at least one processor, cause the system to at least:

render a plurality of tiles of the frame of graphics using the subset of lights, the plurality of tiles non-contiguous in the frame of graphics, the plurality of tiles rendered consecutively to preserve residency of the subset of lights in the processor cache.

6. The system of any of clauses 1-5, the at least one memory comprising further instructions that, in response to execution by the at least one processor, cause the system to at least:

shuffle one or more lights from the subset of lights into an additional subset of lights; and use the additional subset of lights to render an additional pixel of the frame of graphics.

7. The system of any of clauses 1-6, wherein the subset of lights is selected to have a total size that is less than an amount of processor cache memory available during rendering of the frame of graphics.

8. The system of any of clauses 1-7, wherein the first one or more random factors are weighted to favor selection of lights based, at least in part, on intensity of a selected light.

9. A method, comprising:

selecting, based at least in part on a first one or more random factors, a set of lights from a plurality of lights associated with a virtual scene;

generating a frame of graphics using lights from the set of lights, by at least:

selecting, based at least in part on a second one or more random factors, a subset of lights from the set of lights; and rendering a pixel of the frame of graphics based, at least in part, on the subset of lights.

10. The method of clause 9, further comprising:

generating an additional frame of graphics using an additional set of lights, the additional set of lights selected from among the plurality of lights associated with the virtual scene.

11. The method of clauses 9 or 10, further comprising:

rendering a second pixel of the frame of graphics using a second subset of lights selected from the set of lights.

12. The method of any of clauses 9-11, further comprising:

rendering pixels in different tiles of the frame of graphics using a different subset of lights.

13. The method of any of clauses 9-12, further comprising:

rendering a plurality of tiles of the frame of graphics using the subset of lights, the plurality of tiles non-contiguous in the frame of graphics and rendered consecutively.

14. The method of any of clauses 9-13, further comprising:

selecting the subset of lights to have a size less than a processor cache size.

15. The method of any of clauses 9-14, further comprising:

generating an additional subset of lights based, at least in part, on randomly selecting at least a portion of the subset of lights for inclusion in the additional subset of lights; and generating an additional tile of the frame of graphics using the additional subset of lights.

16. The method of any of clauses 9-15, further comprising:

generating an additional subset of lights by at least replacing a portion of the subset of lights with one or more additional lights selected from the set of lights.

17. A non-transitory computer-readable storage medium comprising instructions that, in response to execution by at least one processor of a computing device, cause the computing device to at least:

select a set of lights from among lights associated with a virtual scene, the set of lights selected at least partially at random, wherein a frame of graphics is to be rendered based, at least in part, on the set of lights; and generate a portion of the frame of graphics using a subset of lights from the set of lights, the subset of lights selected at least partially at random from the set of lights, wherein a pixel of the portion of the frame of graphics is rendered based at least in part on the subset of lights.

18. The non-transitory computer-readable storage medium of clause 17, comprising further instructions that, in response to execution by at least one processor of the computing device, cause the computing device to at least:

generate an additional frame of graphics using an additional set of lights, the additional set of lights selected from among the lights associated with the virtual scene.

19. The non-transitory computer-readable storage medium of clauses 17 or 18, comprising further instructions that, in response to execution by at least one processor of the computing device, cause the computing device to at least:

render pixels in different portions of the frame of graphics using a different subset of lights.

20. The non-transitory computer-readable storage medium of any of clauses 17-19, comprising further instructions that, in response to execution by at least one processor of the computing device, cause the computing device to at least:
render a plurality of portions of the frame of graphics using the subset of lights, the plurality of portions rendered consecutively.

21. The non-transitory computer-readable storage medium of any of clauses 17-20, comprising further instructions that, in response to execution by at least one processor of the computing device, cause the computing device to at least:
generate an additional subset of lights based, at least in part, on selecting one or more lights from the subset of lights.

22. The non-transitory computer-readable storage medium of any of clauses 17-21, wherein a majority of lights in the subset of lights remain resident in a processor cache during rendering of one or more portions of the frame of graphics.

23. The non-transitory computer-readable storage medium of any of clauses 17-22, wherein the set of lights and subset of lights are selected based, at least in part, on at least one of intensity of a selected light or distance to the selected light.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:
1. A system, comprising:
at least one processor; and
at least one memory comprising instructions that, in response to execution by the at least one processor, cause the system to at least:
select a set of light sources from among a plurality of light sources associated with a virtual scene, the set of light sources selected based, at least in part, on a first one or more random factors;
select, based at least in part on a second one or more random factors, a subset of light sources from the set of light sources, the subset of light sources to be used to generate a frame of graphics, wherein the subset of light sources is selected so that data indicative of the subset has a total size less than memory predicted to be available in a processor cache; and
render a pixel of the frame of graphics based, at least in part, on the subset of light sources.

2. The system of claim 1, the at least one memory comprising further instructions that, in response to execution by the at least one processor, cause the system to at least:
select an additional set of light sources to use to generate an additional frame of graphics, the additional set of light sources selected from among the plurality of light sources associated with the virtual scene.

3. The system of claim 1, the at least one memory comprising further instructions that, in response to execution by the at least one processor, cause the system to at least:
 render a second pixel of the frame of graphics using a second subset of light sources selected from the set of light sources.

4. The system of claim 1, wherein the pixel is one of a plurality of pixels in a first tile of the frame of graphics, and wherein pixels in a second tile are rendered using a different subset of light sources.

5. The system of claim 1, the at least one memory comprising further instructions that, in response to execution by the at least one processor, cause the system to at least:
 render a plurality of tiles of the frame of graphics using the subset of light sources, the plurality of tiles non-contiguous in the frame of graphics, the plurality of tiles rendered consecutively to preserve residency of the subset of light sources in the processor cache.

6. The system of claim 1, the at least one memory comprising further instructions that, in response to execution by the at least one processor, cause the system to at least:
 shuffle one or more light sources from the subset of light sources into an additional subset of light sources; and
 use the additional subset of light sources to render an additional pixel of the frame of graphics.

7. The system of claim 1, wherein the subset of light sources is selected to have a total size that is less than an amount of processor cache memory available during rendering of the frame of graphics.

8. The system of claim 1, wherein the first one or more random factors are weighted to favor selection of light sources based, at least in part, on intensity of a selected light.

9. A method, comprising:
 selecting, based at least in part on a first one or more random factors, a set of light sources from a plurality of light sources associated with a virtual scene; and
 generating a frame of graphics using light sources from the set of light sources, by at least:
  selecting, based at least in part on a second one or more random factors, a subset of light sources from the set of light sources; and
  rendering a pixel of the frame of graphics based, at least in part, on the subset of light sources.

10. The method of claim 9, further comprising:
 generating an additional frame of graphics using an additional set of light sources, the additional set of light sources selected from among the plurality of light sources associated with the virtual scene.

11. The method of claim 9, further comprising:
 rendering a second pixel of the frame of graphics using a second subset of light sources selected from the set of light sources.

12. The method of claim 9, further comprising:
 rendering pixels in different tiles of the frame of graphics using a different subset of light sources.

13. The method of claim 9, further comprising:
 rendering a plurality of tiles of the frame of graphics using the subset of light sources, the plurality of tiles non-contiguous in the frame of graphics and rendered consecutively.

14. The method of claim 9, further comprising:
 selecting the subset of light sources to have a size less than a processor cache size.

15. The method of claim 9, further comprising:
 generating an additional subset of light sources based, at least in part, on randomly selecting at least a portion of the subset of light sources for inclusion in the additional subset of light sources; and
 generating an additional tile of the frame of graphics using the additional subset of light sources.

16. The method of claim 9, further comprising:
 generating an additional subset of light sources by at least replacing a portion of the subset of light sources with one or more additional light sources selected from the set of light sources.

17. A non-transitory computer-readable storage medium comprising instructions that, in response to execution by at least one processor of a computing device, cause the computing device to at least:
 select a set of light sources from among light sources associated with a virtual scene, the set of light sources selected at least partially at random, wherein a frame of graphics is to be rendered based, at least in part, on the set of light sources; and
 generate a portion of the frame of graphics using a subset of light sources from the set of light sources, the subset of light sources selected at least partially at random from the set of light sources, wherein a pixel of the portion of the frame of graphics is rendered based at least in part on the subset of light sources.

18. The non-transitory computer-readable storage medium of claim 17, comprising further instructions that, in response to execution by at least one processor of the computing device, cause the computing device to at least:
 generate an additional frame of graphics using an additional set of light sources, the additional set of light sources selected from among the light sources associated with the virtual scene.

19. The non-transitory computer-readable storage medium of claim 17, comprising further instructions that, in response to execution by at least one processor of the computing device, cause the computing device to at least:
 render pixels in different portions of the frame of graphics using a different subset of light sources.

20. The non-transitory computer-readable storage medium of claim 17, comprising further instructions that, in response to execution by at least one processor of the computing device, cause the computing device to at least:
 render a plurality of portions of the frame of graphics using the subset of light sources, the plurality of portions rendered consecutively.

21. The non-transitory computer-readable storage medium of claim 17, comprising further instructions that, in response to execution by at least one processor of the computing device, cause the computing device to at least:
 generate an additional subset of light sources based, at least in part, on selecting one or more light sources from the subset of light sources.

22. The non-transitory computer-readable storage medium of claim 17, wherein a majority of lights in the subset of light sources remain resident in a processor cache during rendering of one or more portions of the frame of graphics.

23. The non-transitory computer-readable storage medium of claim 17, wherein the set of light sources and subset of light sources are selected based, at least in part, on at least one of intensity of a selected light source or distance to the selected light source.

* * * * *